US012417681B1

(12) United States Patent
McDaniel et al.

(10) Patent No.: US 12,417,681 B1
(45) Date of Patent: Sep. 16, 2025

(54) DETECTING INTERACTIONS WITH STORAGE UNITS BASED ON RFID SIGNALS AND AUXILIARY SIGNALS

(71) Applicant: Amazon Technologies, Inc., Seattle, WA (US)

(72) Inventors: Aaron M. McDaniel, Seattle, WA (US); Nathan P. O'Neill, Snohomish, WA (US); Nirmal Doshi, Bothell, WA (US); Yuxing Tang, Bothell, WA (US); Robert Jerome Colwill, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/658,788

(22) Filed: May 8, 2024

Related U.S. Application Data

(63) Continuation of application No. 18/059,144, filed on Nov. 28, 2022, now Pat. No. 12,002,337, which is a continuation of application No. 17/118,417, filed on Dec. 10, 2020, now Pat. No. 11,514,766.

(51) Int. Cl.
*G08B 13/14* (2006.01)
*G08B 13/24* (2006.01)

(52) U.S. Cl.
CPC ..... *G08B 13/1472* (2013.01); *G08B 13/2417* (2013.01); *G08B 13/246* (2013.01); *G08B 13/248* (2013.01); *G08B 13/2485* (2013.01)

(58) Field of Classification Search
CPC ............ G08B 13/1472; G08B 13/2417; G08B 13/246; G08B 13/248; G08B 13/2485
See application file for complete search history.

(56) References Cited

U.S. PATENT DOCUMENTS

| | | | | |
|---|---|---|---|---|
| 5,671,362 | A * | 9/1997 | Cowe ........................ | G07F 7/00 340/568.1 |
| 7,225,980 | B2 | 6/2007 | Ku et al. | |
| 7,949,568 | B2 | 5/2011 | Fano et al. | |
| 8,009,864 | B2 | 8/2011 | Linaker et al. | |
| 8,175,925 | B1 | 5/2012 | Rouaix | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Curtis J King
(74) *Attorney, Agent, or Firm* — Athorus, PLLC

(57) ABSTRACT

Storage units including platforms that are outfitted with RFID antennas and auxiliary sensors detect changes in loading on the platforms based on changes in loading determined by the auxiliary sensors or changes in signals received by the RFID antennas. The platforms include surfaces for receiving items tagged with RFID transmitters thereon, such as items of common types and variable weights. An interaction involving the placement of an item on the platform, or the removal of the item from the platform, is detected by the auxiliary sensors. The energization of an RFID field is triggered in response to the detected interaction, and an item is identified where an RFID signal transmitted by the item is present at one time and absent at another time.

20 Claims, 30 Drawing Sheets

(56) References Cited

U.S. PATENT DOCUMENTS 8,189,855 B2 * 5/2012 Opalach ............... G06Q 10/087 382/209
8,423,431 B1 4/2013 Rouaix et al.
8,630,924 B2 * 1/2014 Groenevelt .......... G06Q 10/087 283/79
8,688,598 B1 4/2014 Shakes et al.
8,695,878 B2 * 4/2014 Burnside .............. G06Q 10/087 235/487
9,473,747 B2 10/2016 Kobres et al.
10,001,402 B1 * 6/2018 Gyori ..................... G01G 21/28
10,007,892 B1 6/2018 Hahn et al.
10,064,502 B1 * 9/2018 Gyori ........................ A47F 5/16
10,108,157 B1 10/2018 Raghavan et al.
10,121,121 B1 * 11/2018 De Bonet .............. A47B 57/34
10,198,710 B1 * 2/2019 Hahn ................. G01G 19/4144
10,262,294 B1 4/2019 Hahn et al.
10,318,917 B1 6/2019 Goldstein et al.
10,332,089 B1 6/2019 Asmi et al.
10,332,183 B1 6/2019 Dogan et al.
10,438,277 B1 10/2019 Jiang et al.
10,489,743 B2 11/2019 Aepli
10,535,146 B1 * 1/2020 Buibas .................... G06T 17/00
10,614,415 B1 4/2020 Bonet et al.
10,769,450 B1 9/2020 Krishnamurthy et al.
10,783,762 B1 9/2020 Paul et al.
10,922,541 B2 * 2/2021 Shiraishi ................ G08B 25/00
11,087,275 B2 8/2021 Tripathi
11,106,941 B2 * 8/2021 Buibas .................... G06F 3/011
11,144,877 B2 10/2021 Tineo
11,263,613 B2 * 3/2022 Motoki ................... H04W 4/35
11,397,914 B2 7/2022 Johnson et al.
11,501,454 B2 11/2022 Mirza et al.
11,928,823 B2 * 3/2024 Calvarese ............. G06T 7/0004
11,933,661 B2 * 3/2024 Yadai ..................... G01G 21/23
2002/0070862 A1 6/2002 Francis et al.
2002/0093426 A1 7/2002 Jackson et al.
2003/0001726 A1 1/2003 Moore
2003/0002712 A1 1/2003 Steenburgh et al.
2004/0181467 A1 9/2004 Raiyani et al.
2005/0093690 A1 5/2005 Miglionico
2005/0171854 A1 * 8/2005 Lyon .................... G06Q 20/209 705/24
2006/0071774 A1 4/2006 Brown et al.
2007/0050271 A1 3/2007 Ufford et al.
2007/0069867 A1 * 3/2007 Fleisch ................ G06Q 10/087 340/309.16
2007/0090927 A1 4/2007 Potyrailo et al.
2007/0182555 A1 8/2007 Walker et al.
2008/0055087 A1 3/2008 Horii et al.
2008/0074268 A1 3/2008 Shafer
2008/0077511 A1 3/2008 Zimmerman
2008/0109114 A1 5/2008 Orita et al.
2008/0198015 A1 * 8/2008 Lawrence .............. G06K 7/087 340/572.4
2008/0284604 A1 11/2008 Rubinstein
2009/0027202 A1 1/2009 Copeland et al.
2009/0058644 A1 * 3/2009 French .................... A47F 3/002 340/568.2
2009/0072949 A1 3/2009 Fukuda et al.
2009/0107207 A1 * 4/2009 Yamazaki .............. G01G 21/22 73/1.13
2009/0121017 A1 5/2009 Cato et al.
2009/0153328 A1 6/2009 Otani et al.
2009/0207023 A1 8/2009 Kushida et al.
2009/0245573 A1 10/2009 Saptharishi et al.
2010/0007464 A1 1/2010 McTigue
2010/0019906 A1 1/2010 Kushida et al.
2010/0176922 A1 7/2010 Schwab et al.
2011/0011936 A1 1/2011 Morandi et al.
2011/0221577 A1 9/2011 Kuwako et al.
2011/0241831 A1 * 10/2011 Makiranta .............. G06Q 10/06 340/5.92
2012/0126982 A1 5/2012 Lee et al.
2012/0133488 A1 5/2012 Choi et al.
2012/0284132 A1 11/2012 Kim et al.
2012/0310757 A1 12/2012 Kim et al.
2013/0048724 A1 2/2013 Burnside et al.
2013/0076898 A1 3/2013 Philippe et al.
2013/0253700 A1 9/2013 Carson et al.
2014/0111333 A1 * 4/2014 Haas ...................... G08B 23/00 340/539.11
2014/0201042 A1 * 7/2014 Meyer .................. G06Q 10/087 705/28
2014/0224875 A1 8/2014 Slesinger et al.
2014/0279294 A1 9/2014 Field-Darragh et al.
2014/0316561 A1 10/2014 Tkachenko et al.
2014/0362223 A1 12/2014 LaCroix et al.
2015/0019391 A1 1/2015 Kumar et al.
2015/0073907 A1 3/2015 Purves et al.
2015/0083744 A1 3/2015 Vogler et al.
2015/0269516 A1 9/2015 Fukuda
2016/0048798 A1 * 2/2016 Meyer .................... G01G 19/42 705/28
2016/0153826 A1 * 6/2016 Oneid .................... G01G 21/22 177/211
2016/0187189 A1 * 6/2016 Camp .................. G06Q 10/087 705/27.1
2016/0253534 A1 9/2016 Hattori et al.
2016/0328767 A1 11/2016 Bonner et al.
2016/0328813 A1 11/2016 Montgomery et al.
2016/0342969 A1 * 11/2016 Perez Jacome .... G01G 19/4144
2017/0147969 A1 5/2017 Narsingh et al.
2017/0172315 A1 6/2017 Hay
2017/0220987 A1 8/2017 Sun et al.
2017/0228686 A1 8/2017 Rodriguez et al.
2017/0323162 A1 * 11/2017 Jones ..................... H04N 7/183
2017/0344937 A1 11/2017 Atchley et al.
2018/0010953 A1 * 1/2018 Jones ..................... G01G 9/005
2018/0082246 A1 * 3/2018 Jones ................... G06Q 10/087
2018/0137462 A1 5/2018 Zohar et al.
2018/0158017 A1 * 6/2018 Jones ..................... G01G 19/42
2018/0374328 A1 12/2018 Man
2019/0019385 A1 * 1/2019 Caution ............... G08B 13/248
2019/0034727 A1 1/2019 Chihara et al.
2019/0073576 A1 3/2019 D'Annunzio
2019/0108474 A1 4/2019 Tripathi
2019/0204897 A1 7/2019 Duron et al.
2019/0205821 A1 * 7/2019 Werner ............... G06F 18/2413
2020/0013002 A1 * 1/2020 Hayashi ................. G01G 23/18
2020/0019921 A1 * 1/2020 Buibas .................. G06T 19/003
2020/0279462 A1 * 9/2020 Gabara .................. G06Q 10/08
2020/0334835 A1 * 10/2020 Buibas ................... G06V 20/64
2020/0380701 A1 * 12/2020 Buibas ................. G06V 40/103
2021/0049772 A1 * 2/2021 Buibas ............... G06Q 30/0601
2021/0067744 A1 * 3/2021 Buibas .................... G06F 3/012
2021/0148751 A1 * 5/2021 Yadai ....................... G07G 3/00
2021/0158430 A1 * 5/2021 Buibas ..................... H04B 3/02
2021/0248889 A1 * 8/2021 Okamura ............. G06Q 20/208
2021/0262852 A1 * 8/2021 Xiang .................... G01G 23/37
2021/0342770 A1 11/2021 Li et al.
2022/0003592 A1 * 1/2022 Kobayashi ............. G01G 21/10
2022/0020253 A1 * 1/2022 Mei .......................... H01B 5/14
2022/0067642 A1 3/2022 Barton et al.
2022/0067689 A1 * 3/2022 Guack ..................... G06T 7/251
2022/0101296 A1 * 3/2022 Nakamura ............. B65G 1/137
2022/0230216 A1 * 7/2022 Buibas ................. G06V 10/454
2023/0168119 A1 6/2023 Winkler et al.

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

PLATFORM REPORTS WEIGHT OF ITEMS LABELED WITH RFID TAGS ON SHELF

PLATFORM REPORTS SIGNALS RECEIVED FROM RFID TAGS IN PRESENCE OF RF FIELDS

PLATFORM REPORTS CHANGE IN WEIGHT ON SHELF FOLLOWING REMOVAL OF ONE ITEM

PLATFORM REPORTS SIGNAL NOT RECEIVED FROM REMAINING RFID TAGS IN PRESENCE OF RFID FIELDS

ITEM BEARING RFID TAG ADDED TO INVENTORY AFTER PASSING THROUGH RF FIELD

ITEM BEARING RFID TAG REMOVED FROM INVENTORY AFTER PASSING THROUGH RF FIELD

DETECTING INTERACTIONS WITH STORAGE UNITS BASED ON RFID SIGNALS AND AUXILIARY SIGNALS

CROSS-REFERENCE TO RELATED APPLICATIONS

This application is a continuation of U.S. patent application Ser. No. 18/059,144, filed Nov. 28, 2022, which is a continuation of U.S. patent application Ser. No. 17/118,417, now U.S. Pat. No. 11,514,766, filed Dec. 10, 2020, the contents of each of which are incorporated by reference herein in their entireties.

BACKGROUND

Materials handling facilities such as warehouses or retail stores often store or display items on shelves. For example, a materials handling facility may include structural features such as walls, gondola racks or fixtures to which one or more shelves may be mounted or from which such shelves may be suspended, and available items may be disposed upon such shelves. Available items may remain on shelves on a temporary basis, until one or more of the items thereon is desired (e.g., in response to an order or a request from one or more users of the materials handling facility).

Storing items on shelves or other storage units provides a number of advantages to users of a materials handling facility. For example, an item having one or more flat surfaces may be stored individually or collectively (e.g., along with other like or identical items), by placing one or more of the flat surfaces of such items on a corresponding flat surface of a shelf or like element. Furthermore, items may be stored in random locations on a shelf, or in predetermined areas or spaces of the shelf that are set aside for items of a specific type, group or category.

Commercial processes have been enhanced by improvements in computer and networking technologies, and the development of smaller and more advanced sensors. Increases in processing power and network connectivity, and reductions in component size, have enabled computer-based systems and sensors to permeate various commercial processes. In bricks-and-mortar commerce, computer-based systems having one or more sensors, such as imaging devices (e.g., digital cameras), have been integrated into traditional retail establishments in order to aid in theft prevention or inventory tracking. Today, some storage units include load sensors that are provided within shelves or other flat surfaces, and are used to generate load signals that are commensurate with an extent of loading provided on such shelves or other surfaces. Where a shelf or another surface is dedicated to receiving and distributing items of a common kind or type, a change in loading on such shelves or other surfaces may be detected from changes in load signals generated by such sensors, and an item having a mass or weight consistent with the change in loading may be identified as having been involved in an interaction. Information or data regarding the interaction may be assigned to or associated with a customer or other actor within a vicinity of the shelf or other surface, and an inventory record of items on the shelf or other surface may be updated accordingly.

Currently, however, load sensors that are provided in association with shelves or other like surfaces are typically only able to generate load signals consistent with loading conditions, and are incapable of identifying or distinguishing between items placed thereon or removed therefrom. For this reason, such sensors may falsely indicate that an interaction has occurred where an item of one type is removed from a shelf or other surface associated with items of that type, but is neither returned to the shelf or other surface nor purchased by the customer, e.g., where the item is deposited in a different or alternate location. Likewise, such sensors may also fail to indicate that an interaction has occurred where an item is removed from a shelf or other surface associated with items of that type, and a different or an alternate object, e.g., a cellular telephone or other personal item, is placed on the shelf or other surface.

BRIΣF DESCRIPTION OF THE DRAWINGS

DETAILED DESCRIPTION

Figure 1A:
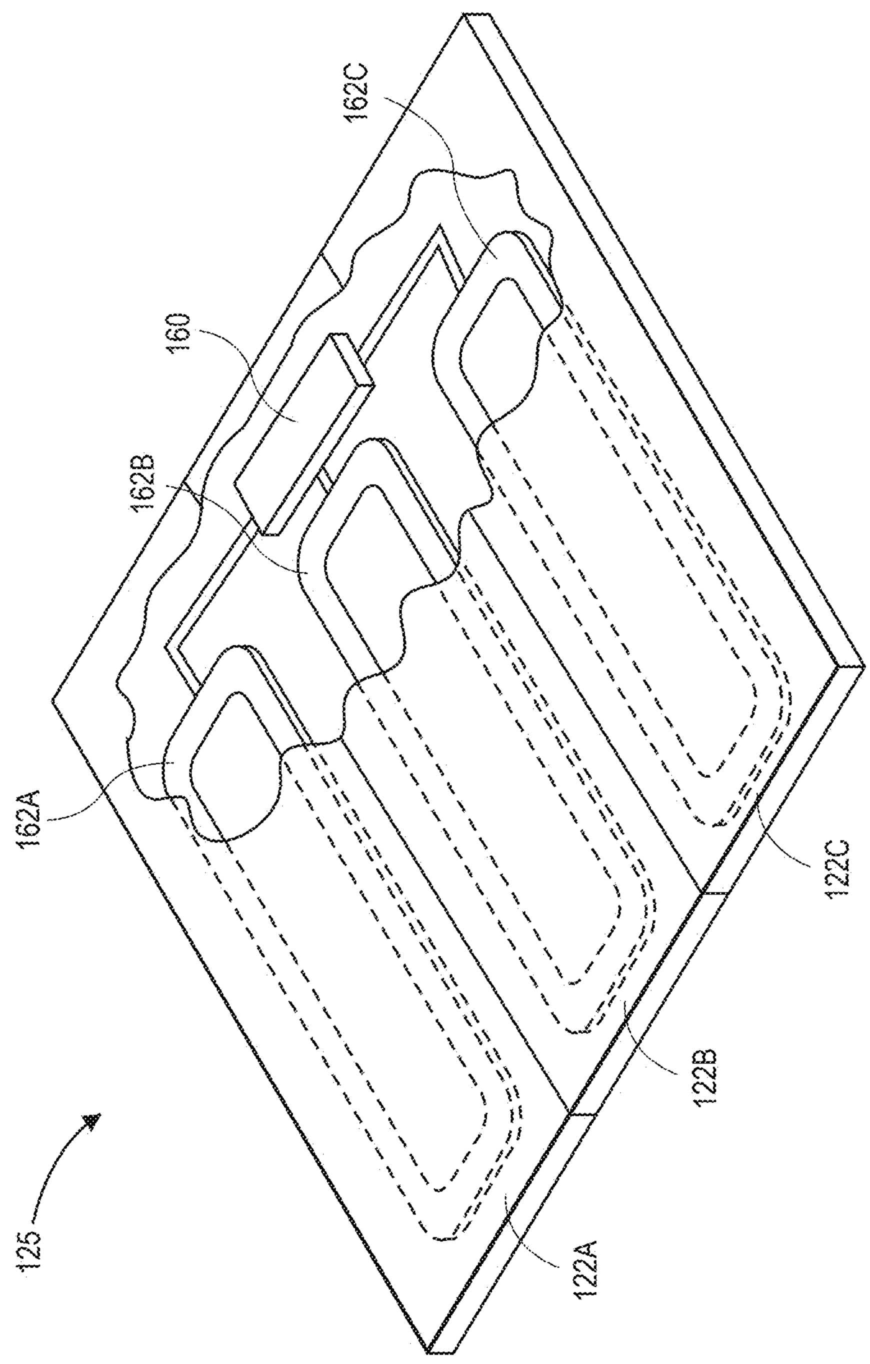
FIGS. 1A through 1I are views of components of one system for detecting interactions in accordance with implementations of the present disclosure.

As is set forth in greater detail below, the present disclosure is directed to systems and methods for detecting interactions with storage units (or storage systems) based on radiofrequency identification ("RFID") signals and auxiliary signals generated by one or more other sensors. More specifically, the systems and methods of the present disclosure are directed to storage units including shelves, tables, or other substantially planar surfaces for accommodating items, e.g., in inventory areas of a materials handling facility, that are outfitted with RFID antennas, RFID readers or other systems.

The RFID antennas of the present disclosure may be provided on or embedded within aspects of the storage units and configured to emit radiofrequency ("RF") fields or energy either continuously or at designated intervals or times. Items placed on such storage units may be outfitted, labeled or otherwise equipped with RFID transmitters or tags that are configured to transmit information or data regarding such items when the RFID transmitters or tags sense or are in the presence of electric or magnetic fields. The RFID antennas may receive RFID signals transmitted from any RFID transmitters or tags provided on the items placed on the storage units, and the RFID signals may be interpreted to identify the items with which each of the RFID transmitters is associated. In some implementations, an intensity level of the RF fields or energy emitted by RFID antennas of a shelf or other storage unit may be selected with a goal of only activating RFID transmitters or tags provided on items that are placed on a given shelf or other storage unit associated with the RFID antennas, and not on other shelves or other storage units.

The storage units of the present disclosure may also include one or more auxiliary sensors (or event sensors, trigger sensors, or event trigger sensors), which may include but need not be limited to load sensors (e.g., weight sensors), cameras, proximity sensors, motion sensors, time-of-flight sensors, or others. The auxiliary sensors may be configured or aligned to capture information or data regarding loading on a storage unit at any given time, and the information or data captured by the auxiliary sensors may be interpreted to determine whether or when an interaction with the storage unit has occurred.

Based on changes in loading on a storage unit, as indicated by variations in auxiliary signals generated by auxiliary sensors, and based on numbers and types of RFID signals received by RFID antennas, interactions with items on the storage unit may be detected and tracked. Moreover, the systems and methods of the present disclosure may be configured to operate in concert with one another, in order to reduce an amount of energy consumed by the systems and methods as a whole, or to support or confirm indications provided by one another. The systems and methods of the present disclosure are particularly useful in receiving and distributing items of a common type that are packaged or sold with variable weights or masses, such as meats, produce, beans, nuts, spices or grains, or other foods.

Referring to FIGS. 1A through 1I, views of components of one system for detecting interactions in accordance with implementations of the present disclosure are shown. As is shown in FIG. 1A, a platform 125 includes an RFID reader 160 and a plurality of RFID antennas 162A, 162B, 162C embedded therein. The platform 125 may be utilized to support any number of items of any type thereon, including but not limited to food products (e.g., prepared foods, baked goods, produce or the like), office products, consumer electronics, home and garden products, hardware or tools, or any other items. For example, as is shown in FIG. 1A, the platform 125 includes a plurality of discrete locations or regions 122A, 122B, 122C that may be designated or set aside for accommodating or storing one or more items of a discrete type. In some implementations, the locations or regions 122A, 122B, 122C may be demarcated with one or more lines, markings or other designations, as is shown in FIG. 1A. Alternatively, the locations or regions need not be demarcated or designated in any way.

The RFID reader 160 may include any type or number of components for causing the RFID antennas 162A, 162B, 162C to emit an RF field, and for interpreting RFID signals received by the RFID antennas 162A, 162B, 162C from any RFID transmitters that sense the RF field. Such components may include, but need not be limited to, one or more processors, transceivers, power supplies, memory components, or others. In some embodiments, components of the RFID reader 160 may be provided on a printed circuit board assembly that may be embedded within the platform 125, and electrically coupled with the RFID antennas 162A, 162B, 162C, e.g., by one or more connectors or conductors.

The RFID antennas 162A, 162B, 162C shown in FIG. 1A are substantially continuous components extending substantially across a width of the platform 125, in parallel with one another. Each of the RFID antennas 162A, 162B, 162C has a rounded rectangular or oval shape, and is associated with one of the locations or regions 122A, 122B, 122C of the platform 125. Each of the RFID antennas 162A, 162B, 162C is also electrically coupled with the RFID reader 160. In some implementations, the RFID antennas 162A, 162B, 162C may be placed atop the platform 125, and adhered thereto, e.g., by one or more tapes, glues or other adhesive agents. In some other implementations, the RFID antennas 162A, 162B, 162C may be embedded within the platform 125, or covered at least in part by an upper surface of the platform 125.

Figure 1B:
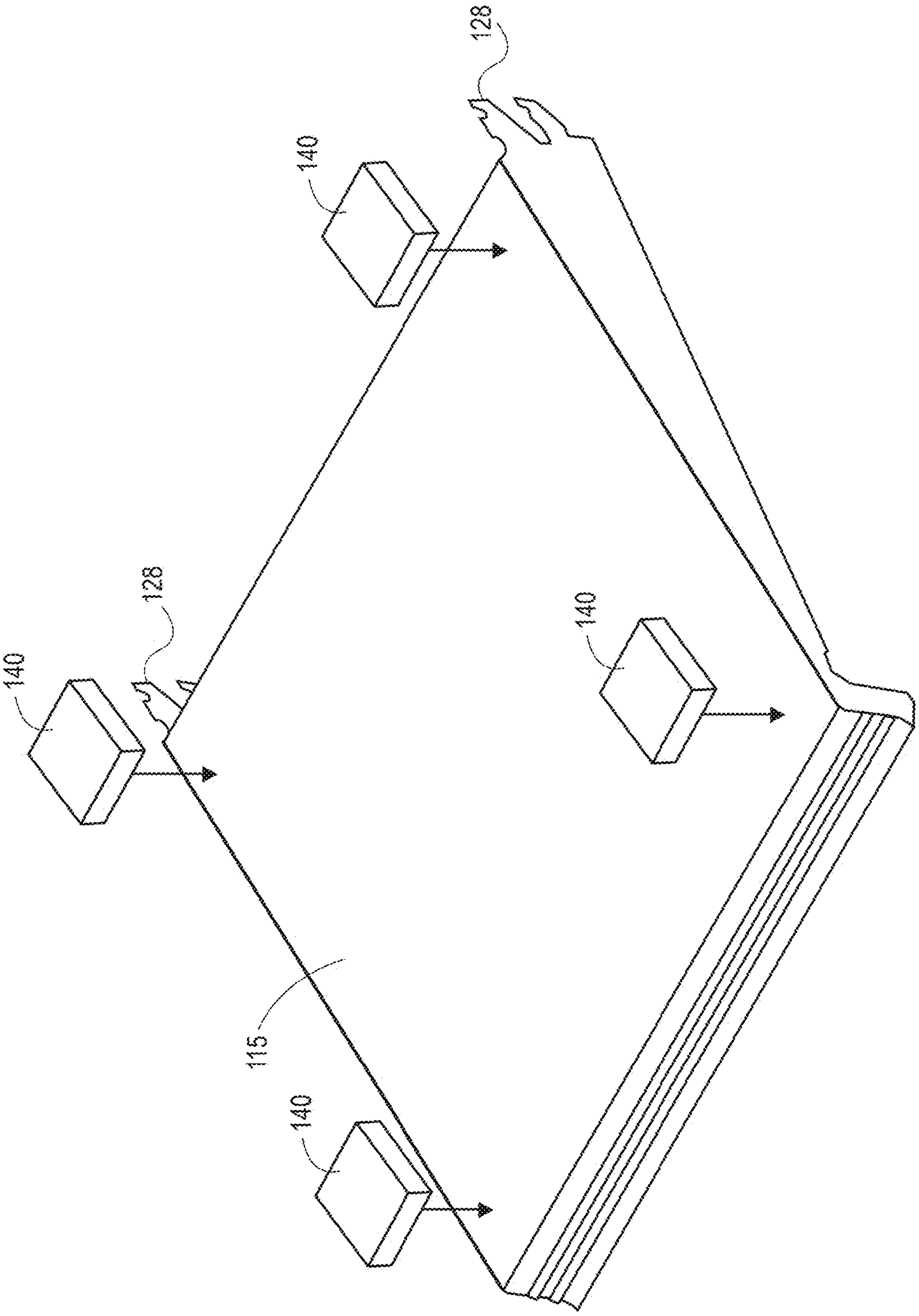

As is shown in FIG. 1B, a shelf 115 includes a pair of hooks 128 or other extensions for mounting the shelf 115 to a gondola rack or other like structure that are provided at a rear end of the shelf 115. The shelf 115 may be formed from any suitable materials (e.g., woods, metals, plastics, or others).

As is also shown in FIG. 1B, a plurality of load sensors 140 (e.g., auxiliary sensors) are placed on an upper surface of the shelf 115. The load sensors 140 may be any devices or systems for determining dead and/or live loading applied to the load sensors 140, e.g., by a platform or other object and any items thereon. For example, in some implementations, the load sensors 140 may include one or more capacitive sensors, force-sensing resistors, strain gages, load cells, piezoelectric sensors, inductive weight sensors, or any other type or form of device or system for generating load signals in response to loading on a platform or other surface, or unloading from the platform or other surface. Such signals may be used to determine a mass or weight of objects placed on or removed from a platform provided thereon, or to identify one or more of such objects based on such masses or weights. Moreover, where locations of the load sensors 140 with respect to the platform are known, the load signals may be further used to determine locations where items are placed on a platform or removed therefrom. For example, a mass or weight of an item may be determined as a sum of forces sensed by the load sensors 140, less an accounting for a mass or weight of a platform or other object on which the item rests. A location of an item on the platform may be determined based on sums of forces sensed by pairs of the load sensors 140, as well as distances between the pairs of the load sensors 140, according to standard equilibrium principles.

In some implementations, the load sensors 140 may each include one or more load cells or other systems, as well as one or more power supplies, circuit boards, transceivers or other systems or components, provided within housings that have any size or shape, and are formed from any suitable materials, including but not limited to molded plastics, rubbers, composites or other like materials. The load sensors 140 may be placed in any location on the shelf 115, and are preferably distributed evenly on the shelf 115, e.g., near corners of the shelf 115, and at common or similar distances from edges of the shelf 115. In some implementations, the load sensors 140 may be coupled to one another and to the RFID reader 160 or one or more components within the housing 165 in a wired or wireless manner, in order to permit the load sensors 140 to receive power from any power sources associated with the RFID reader 160, or to transfer information or data (e.g., load signals) therebetween.

Figure 1C:
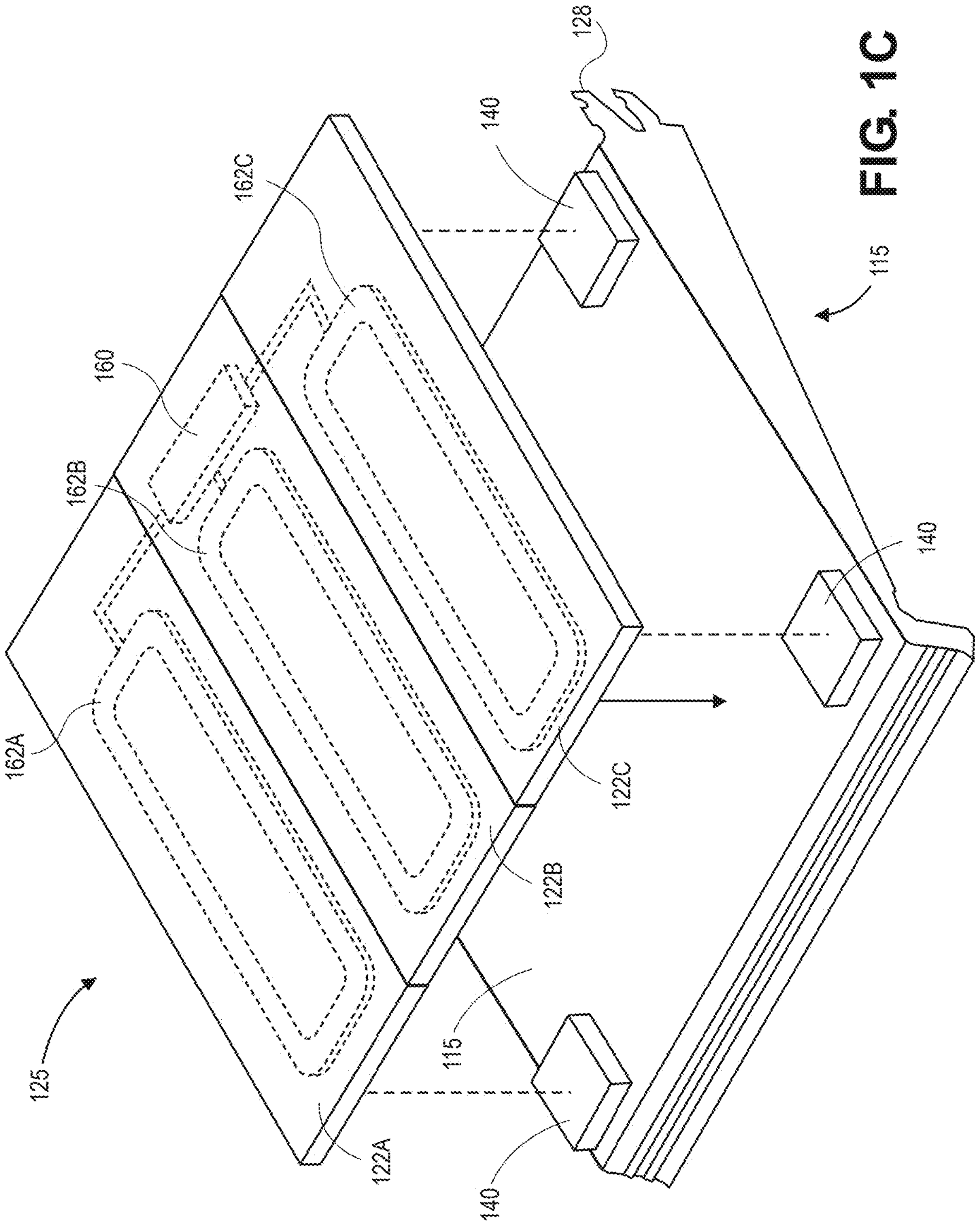
Figure 1D:
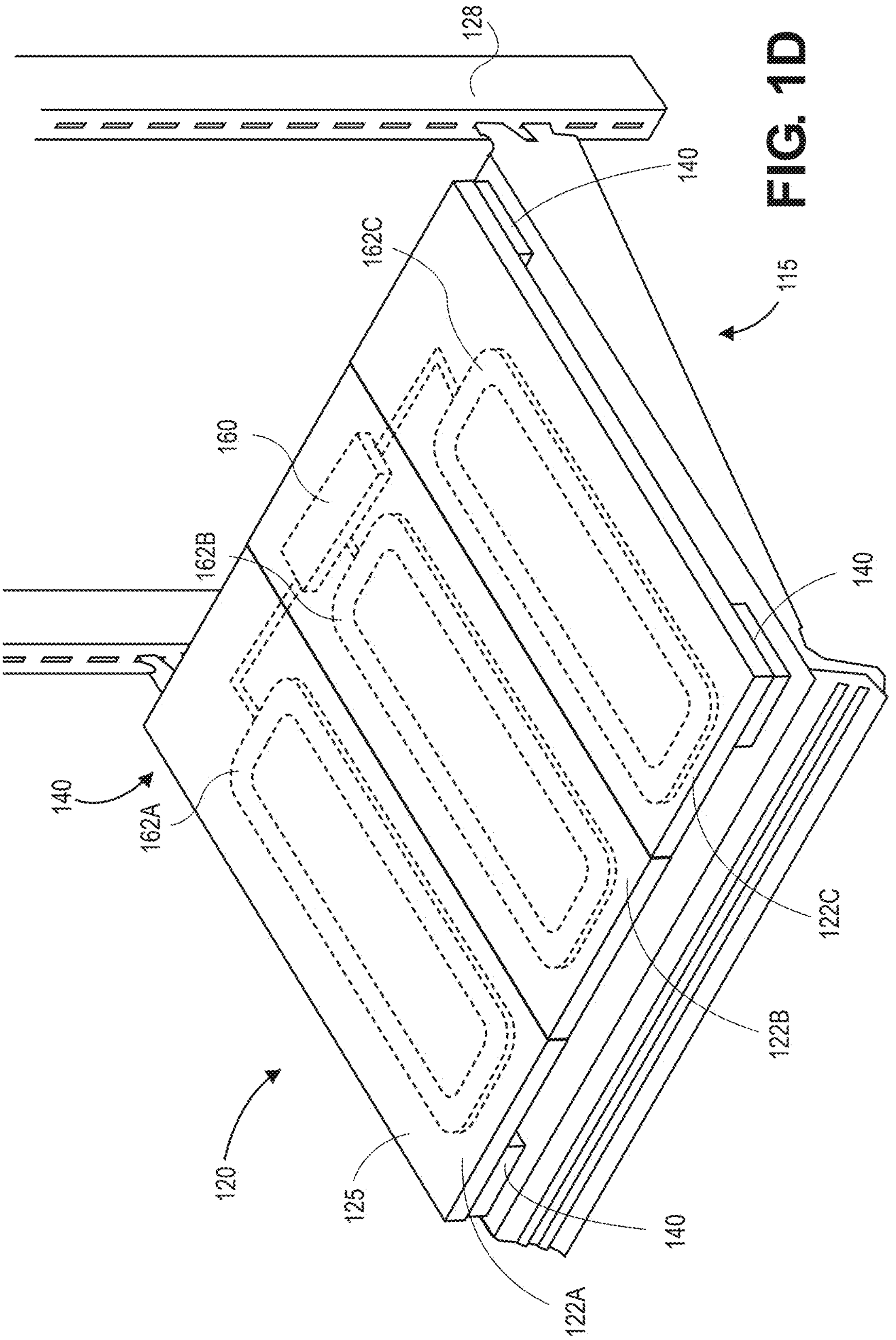

As is shown in FIG. 1C, the platform 125 may be placed onto the load sensors 140 on the shelf 115. As is shown in FIG. 1D, a storage unit 120 is formed with the platform 125 resting atop the load sensors 140 provided on the shelf 115. In some implementations, the storage unit 120 may further include any other auxiliary sensors, as alternatives or in addition to the load sensors 140.

The storage system 120 may be utilized in any space or facility that may be subject to any environmental conditions, such as periods of high or low levels of sunlight, high or low temperatures, high or low humidity levels, high or low barometric pressures, or the like. For example, the storage system 120 may be utilized in spaces that are refrigerated (e.g., within coolers, refrigerators or freezers), heated (e.g., within ovens or warming stations), or maintained at room temperature (or ambient temperatures), as well as spaces where moisture levels are selectively maintained, e.g., by misting or through the use of one or more humidifiers or dehumidifiers. In some implementations, the platform 125 or the shelf 115 may be formed from any suitable materials including but not limited to steel, plastics, acrylics or other sufficiently durable materials, and may but need not be treated with one or more substances (e.g., paints, powders, or the like). Likewise, in some implementations, the platform 125 or the shelf 115 may be partially or substantially translucent in order to permit the visual evaluation of any items disposed on the platform 125 or the shelf 115 from different angles or lines of sight.

In some implementations, any number of the storage units 120 may be installed on a gondola rack or other like structure, or on two or more of such gondola racks or structures. Each of such storage units 120 may independently generate and transmit load signals corresponding to masses or weights thereon, or radiate RF fields and capture RFID signals from any activated RFID transmitters (e.g., tags) thereon, and such load signals or RFID signals may be processed to determine changes in loading conditions accordingly.

Figure 1E:
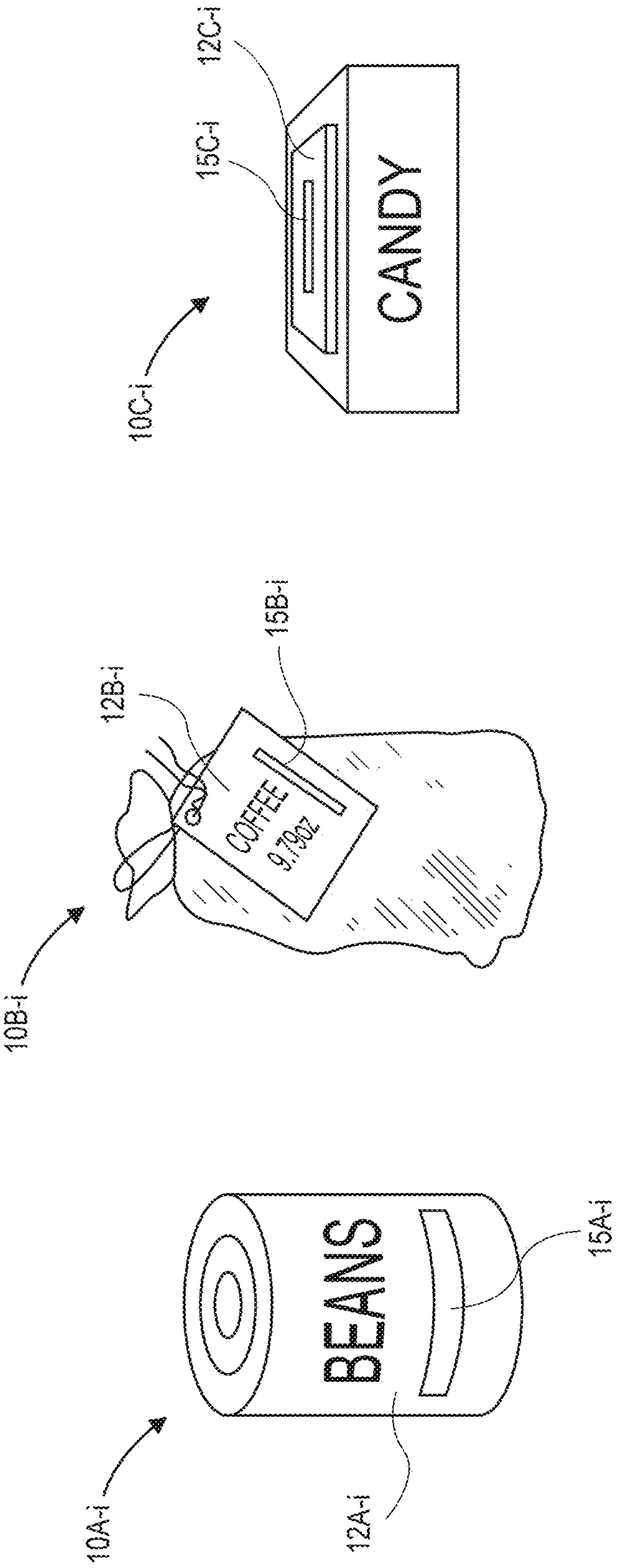

The storage units of the present disclosure may be utilized to receive or enable the distribution of items of any type or form that are outfitted, labeled or otherwise equipped with RFID transmitters or tags that are configured to transmit information or data regarding such items when the RFID transmitters or tags sense or are in the presence of electric or magnetic fields. For example, as is shown in FIG. 1E, an item 10A-i (viz., a can of vegetables) includes a label 12A-i including identifying information regarding the item 10A-i, e.g., a type or category of the item 10A-i, or a weight (or mass) or another attribute of the item 10A-i, printed thereon. Additionally, the label 12A-i further includes an RFID transmitter (or RFID tag) 15A-i that is programmed with information or data, e.g., on a microchip, and configured to transmit the information or data in the form of an RFID signal when the RFID transmitter 15A-i senses or is in the presence of an electric field or a magnetic field, such as a field emitted by one or more of the RFID antennas 162A, 162B, 162C.

Likewise, as is also shown in FIG. 1E, an item 10B-i (viz., a bag of coffee) includes a label 12B-i including identifying information regarding the item 10B-i, and an RFID transmitter (or RFID tag) 15B-i. The RFID transmitter 15B-i is programmed with information or data regarding the item 10B-i and configured to transmit the information or data in the form of an RFID signal when the RFID transmitter 15B-i senses an electric field or a magnetic field emitted by one or more of the RFID antennas 162A, 162B, 162C. An item 10C-i (viz., a box of candy) includes a label 12C-i including identifying information regarding the item 10C-i, and an RFID transmitter (or RFID tag) 15C-i. The RFID transmitter 15C-i is programmed with information or data regarding the item 10C-i and configured to transmit the information or data in the form of an RFID signal when the RFID transmitter 15C-i senses an electric field or a magnetic field emitted by one or more of the RFID antennas 162A, 162B, 162C.

Figure 1F:
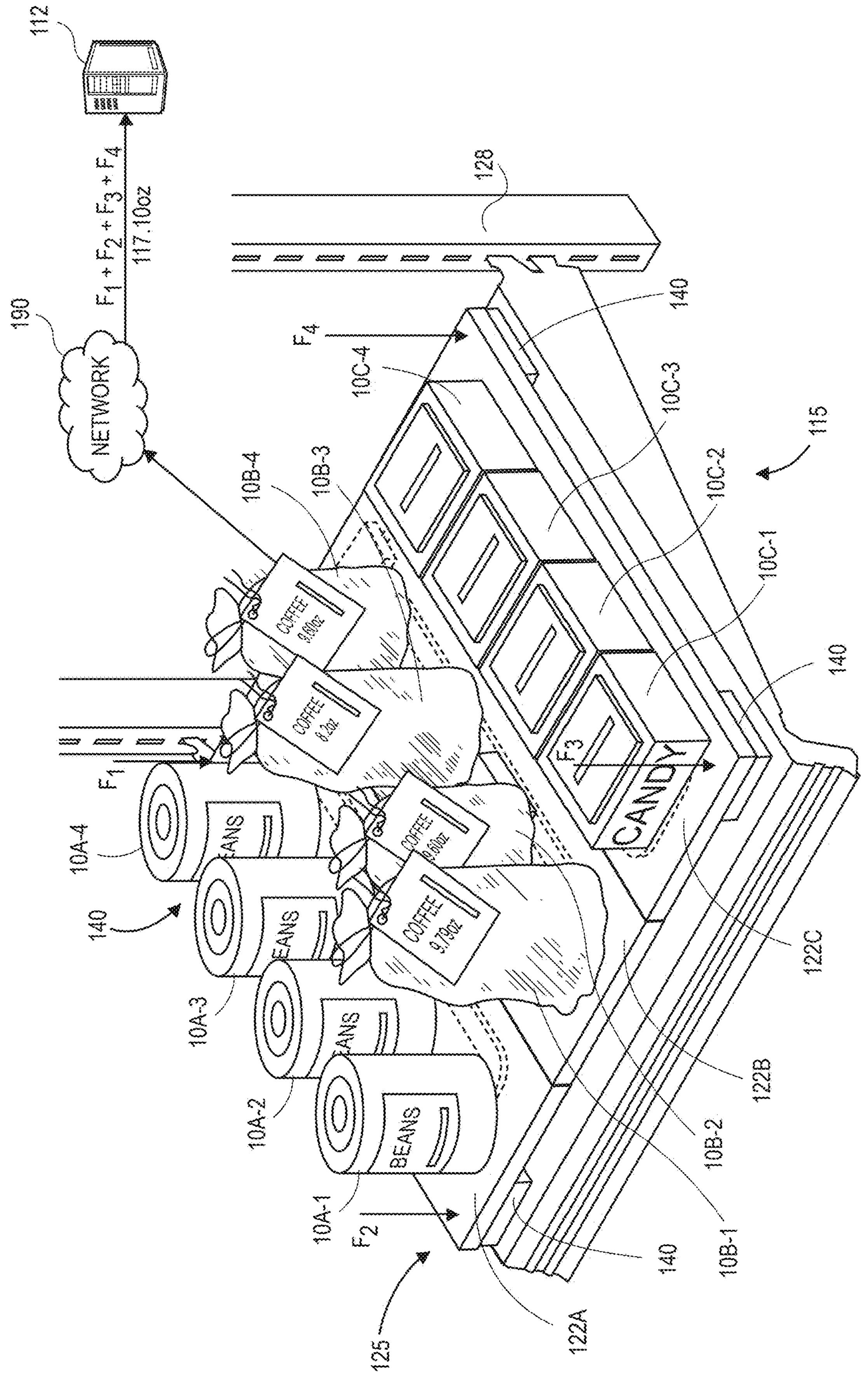

As is shown in FIG. 1F, a plurality of the items 10A-1 through 10A-4 of a common type of the item 10A-i (viz., cans of vegetables) shown in FIG. 1D are placed on the location 122A on the platform 125. Likewise, a plurality of the items 10B-1 through 10B-4 of a common type of the item 10B-i (viz., bags of coffee) shown in FIG. 1D are placed on the location 122B on the platform 125, and a plurality of the items 10C-1 through 10C-4 of a common type of the item 10C-i (viz., boxes of candy) shown in FIG. 1D are placed on the location 122C on the platform 125. As is shown in FIG. 1F, with the items 10A-1 through 10A-4, the items 10B-1 through 10B-4, and the items 10C-1 through 10C-4 placed on the platform 125, the load sensors 140 generate a plurality of load signals consistent with forces $F_1$, $F_2$, $F_3$, $F_4$ applied to each of the load sensors 140 by the weight of the items 10A-1 through 10A-4, the items 10B-1 through 10B-4, and the items 10C-1 through 10C-4. A net weight of the items 10A-1 through 10A-4, the items 10B-1 through 10B-4, and the items 10C-1 through 10C-4 on the platform 125, as determined from the load signals received from the load sensors 140, is transmitted by the RFID reader 160 of the platform 125 to a server 112 over a network 190. Alternatively, in some implementations, one or more of the load sensors 140 or any other auxiliary sensors (not shown) may be configured to independently communicate with the server 112 or any other external computer device or system over the network 190 or in any other manner.

Figure 1G:
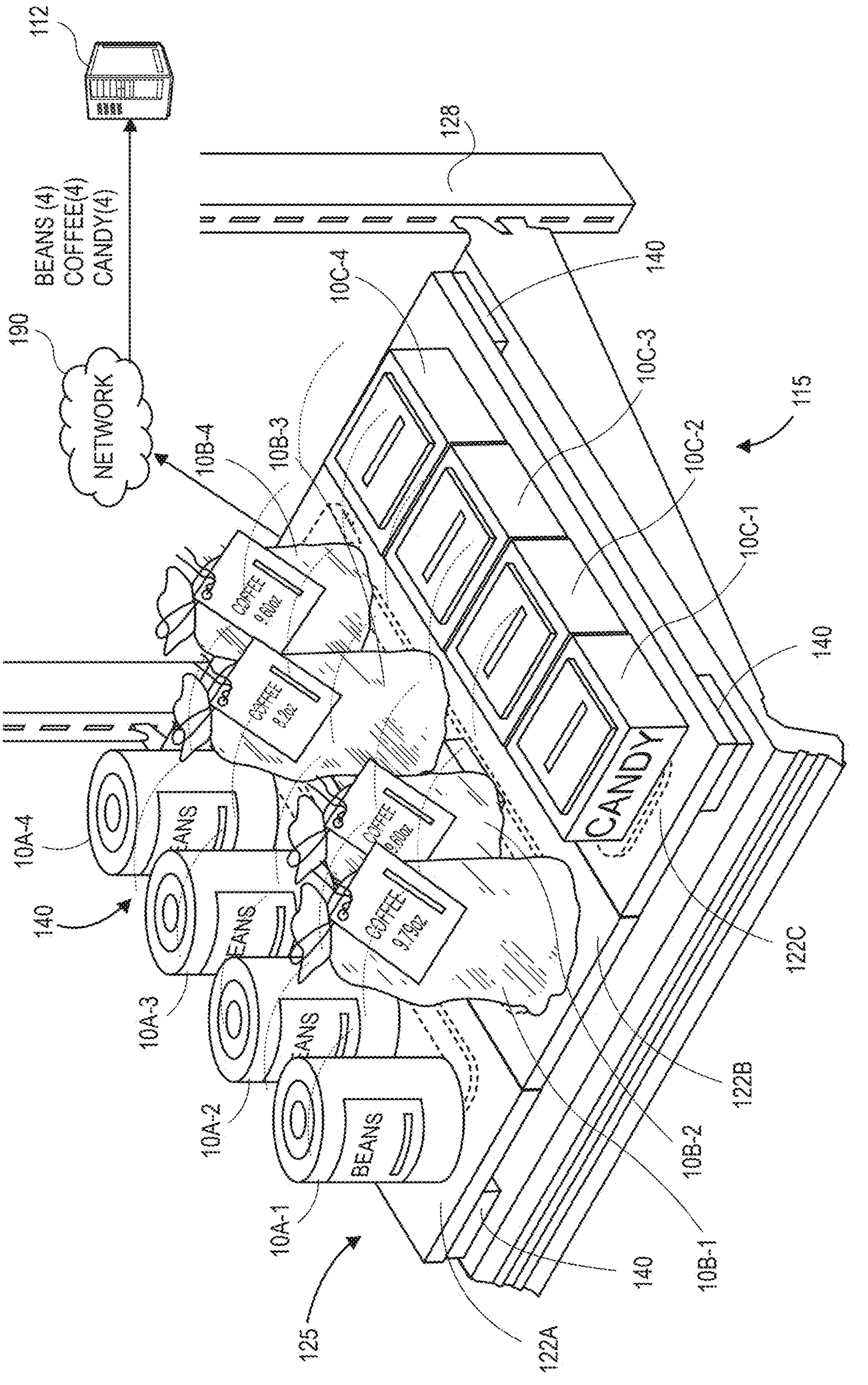

As is shown in FIG. 1G, the RFID reader 160 causes the RFID antennas 162A, 162B, 162C to emit a RF field. Upon sensing the RF field emitted by one or more of the RFID antennas 162A, 162B, 162C, the RFID transmitters associated with the items 10A-1 through 10A-4, the items 10B-1 through 10B-4, and the items 10C-1 through 10C-4 emit RFID signals that are received by one or more of the RFID antennas 162A, 162B, 162C and interpreted by the RFID reader 160. In some implementations, the RFID signals may include information or data that identify the specific one of the items 10A-1 through 10A-4, the items 10B-1 through 10B-4, and the items 10C-1 through 10C-4, or types or categories of the items 10A-1 through 10A-4, the items 10B-1 through 10B-4, and the items 10C-1 through 10C-4, viz., beans, coffee or candy. In some implementations, the RFID signals may include any type or form of other information or data, including but not limited to an item number (e.g., a Universal Product Code, or "UPC," an Electronic Product Code, or "EPC," a Stock Keeping Unit number, or "SKU," or a standard identification number, such as an "ASIN") or another identifier or attribute of an item, such as a mass or a weight of the item. The RFID reader 160 may transmit information or data summarizing or describing the RFID signals or the items 10A-1 through 10A-4, the items 10B-1 through 10B-4, and the items 10C-1 through 10C-4 to the server 112 over the network 190. Based on the net weight of the items 10A-1 through 10A-4, the items 10B-1 through 10B-4, and the items 10C-1 through 10C-4, and the RFID signals, a record identifying the items 10A-1 through 10A-4, the items 10B-1 through 10B-4, and the items 10C-1 through 10C-4 on the platform 125 may be stored on the server 112 and used for any purpose.

In some implementations, the emission of an RF field by the RFID antennas 162A, 162B, 162C may occur continuously, or at any regular or randomly scheduled time, or upon the occurrence of one or more events. For example, in some implementations, the RFID reader 160 may be programmed to cause the RFID antennas 162A, 162B, 162C to emit RF fields at regular intervals or times, or after a change in loading on the platform 125 is detected, such as based on a change in the load signals received from the load sensors 140.

Figure 1H:
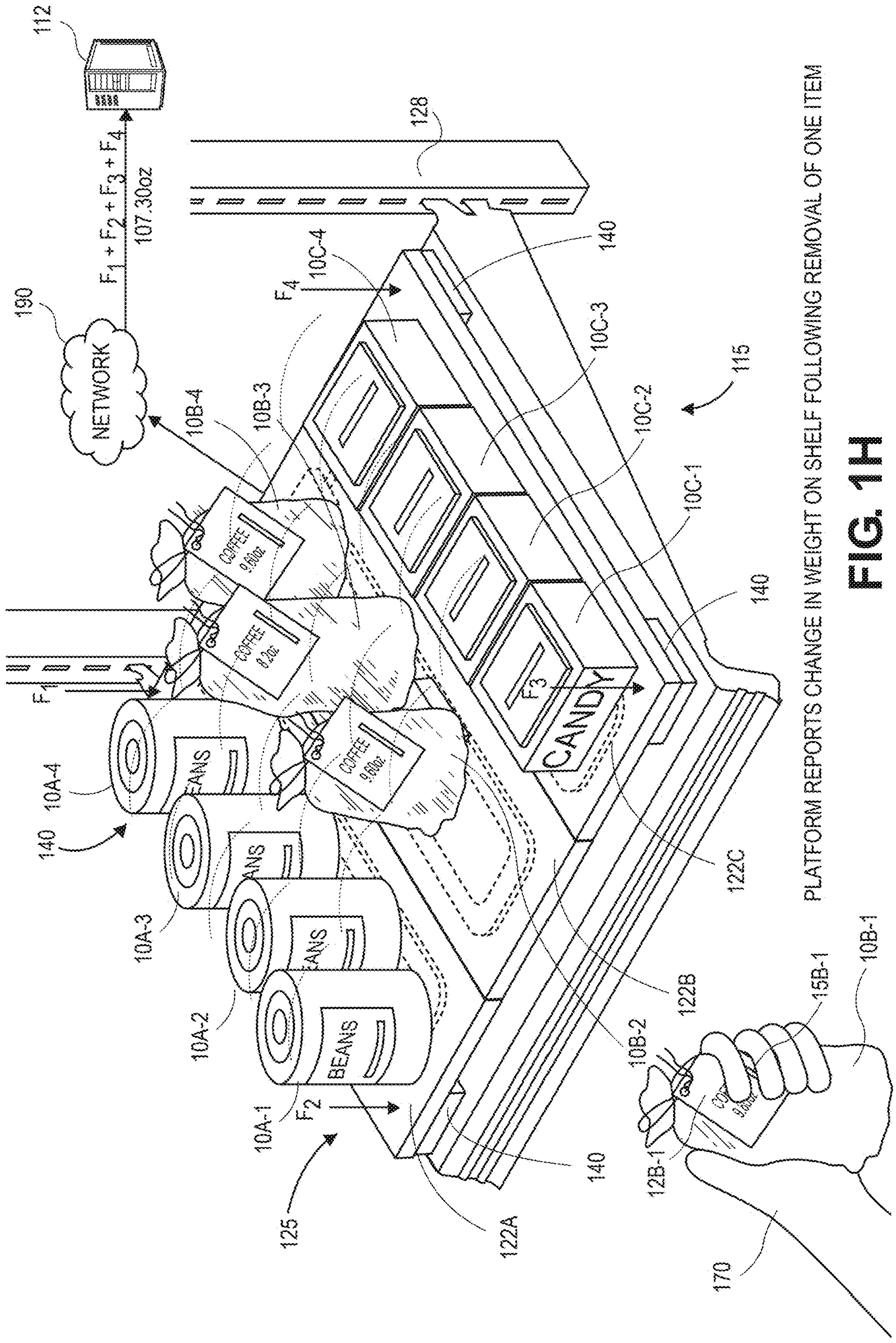

For example, as is shown in FIG. 1H, after a customer 170 retrieves an item 10B-1 having a label 12B-1 and an RFID transmitter 15B-1 from the platform 125, the load sensors 140 generate a plurality of load signals consistent with forces $F_1$, $F_2$, $F_3$, $F_4$ applied to the load sensors 140 by the weight of the items 10A-1 through 10A-4, the items 10B-2 through 10B-4, and the items 10C-1 through 10C-4, e.g., following the removal of the item 10B-1 therefrom. A net weight of the items 10A-1 through 10A-4, the items 10B-2 through 10B-4, and the items 10C-1 through 10C-4 on the platform 125, e.g., a sum of the forces $F_1$, $F_2$, $F_3$, $F_4$ as determined from such load signals, is transmitted by the RFID reader 160 to the server 112 over the network 190. Alternatively, or additionally, in some implementations, the RFID reader 160 may transmit information or data regarding a change in the loading on the platform 125, e.g., a difference in weight on the platform 125, as well as a time at which the change in loading on the platform is detected.

Figure 1I:
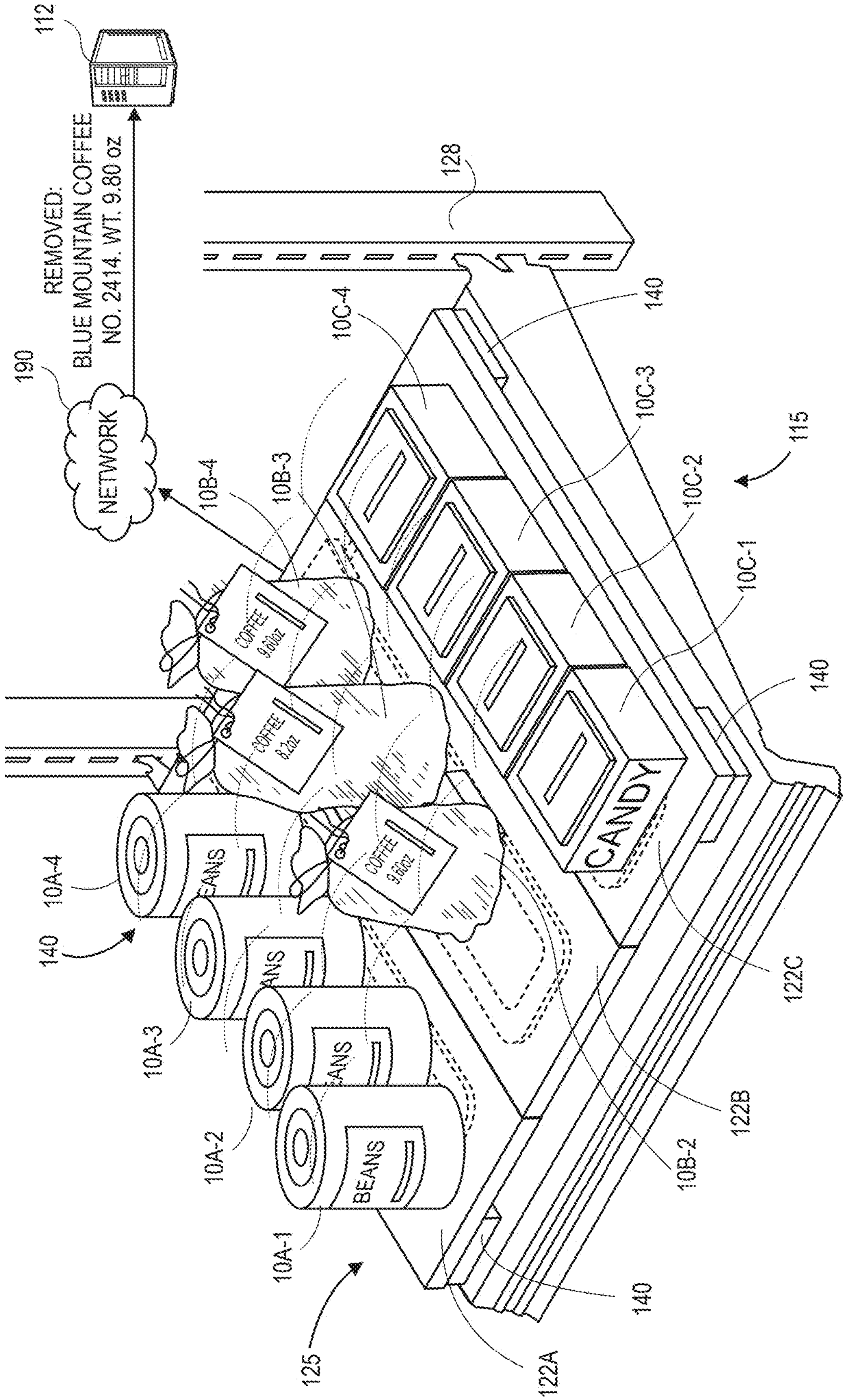

As is shown in FIG. 1I, the RFID reader 160 causes the RFID antennas 162A, 162B, 162C to emit an RF field. Upon sensing the RF field, each of the RFID transmitters associated with the items 10A-1 through 10A-4, the items 10B-2 through 10B-4, and the items 10C-1 through 10C-4 emits an RFID signal that is received by one or more of the RFID antennas 162A, 162B, 162C and interpreted by the RFID reader 160. Subsequently, the RFID reader 160 may transmit information or data identifying RFID signals that are no longer being received by the RFID reader 160, viz., the RFID signal transmitted by the RFID transmitter 15B-1 associated with the item 10B-1 that was removed from the platform 125, as shown in FIG. 1H.

Alternatively, or additionally, the RFID reader 160 may transmit information or data summarizing or describing the RFID signals that were received from the items 10A-1 through 10A-4, the items 10B-2 through 10B-4, and the items 10C-1 through 10C-4 to the server 112 over the network 190.

In some implementations, the information or data transmitted by the RFID reader 160 to the server 112 may identify a time associated with the change in loading on the platform 125 following the removal of the item 10B-1, as well as one of the locations 122A, 122B, 122C on the platform 125 where the change in loading was observed, along with the change in weight and any attributes of the item 10B-1. In some implementations, the information or data transmitted by the RFID reader 160 to the server 112 may include an indication that the weight on the platform 125 has changed, e.g., decreased, by an amount corresponding to the weight of the item 10B-1. In some implementations, the information or data transmitted by the RFID reader 160 to the server 112 may include an indication that an RFID signal that was previously transmitted by the RFID transmitter 15B-1 and received by the RFID reader 160 was then absent.

Based on the RFID signals received from the items 10A-1 through 10A-4, the items 10B-2 through 10B-4, and the items 10C-1 through 10C-4, and, optionally, the net weight of the items 10A-1 through 10A-4, the items 10B-2 through 10B-4, and the items 10C-1 through 10C-4, a record identifying the items 10A-1 through 10A-4, the items 10B-2 through 10B-4, and the items 10C-1 through 10C-4 on the platform 125 that is stored on the server 112 may be updated to reflect the removal of the item 10B-1 from the platform 125, as determined by the difference in weight on the platform 125 (e.g., an absolute value of the difference in weight), and the absence of the signal S4, and used for any purpose. Additionally, where the customer 170 may be identified, the removal of the item 10B-1 may be associated with the customer 170, such as by placing a record of the item 10B-1 in a virtual shopping cart or list associated with the customer 170, or by charging the customer 170 for a cost of the item 10B-1, which may be determined based on the weight of the item 10B-1 or the change in weight on the platform 125, and a unit rate for the item 10B-1, or for items of the type including the items 10B-1 through 10B-4.

Accordingly, the systems and methods of the present disclosure are directed to detecting interactions with storage units based on RFID signals and auxiliary signals received from one or more other sensors. In some implementations, a storage unit may include one or more shelves or other systems having platforms with RFID readers in communication with RFID antennas and one or more auxiliary sensors associated therewith. Where an actor (e.g., an associate, a customer, a user or a worker) executes an interaction with a storage unit involving the placement of an item bearing an RFID transmitter (or an RFID tag) on a platform of the present disclosure, and an RFID antenna associated with the platform emits an RF field therefrom, the auxiliary sensors may determine that a change in weight (e.g., an increase) has occurred as a result of the interaction, and an RFID reader associated with the platform receives an RFID signal from the RFID transmitter borne by the item that was not previously detected prior to the placement of the item on the platform. The placement of the item on the platform may be confirmed based on the RFID signal. In some implementations, the placement of the item on the platform may also be confirmed where the increase in weight is consistent with a weight of the item identified based on the RFID signal. Alternatively, any other type or form of auxiliary sensor (e.g., cameras, proximity sensors, motion sensors, time-of-flight sensors, or others) may be used to determine that an interaction has occurred.

Conversely, where an actor executes an interaction with a storage unit involving the removal of an item bearing an RFID transmitter (or an RFID tag) from a platform of the present disclosure, and an RFID antenna associated with the platform emits an RFID field therefrom, the auxiliary sensors may determine that a change in weight (e.g., a decrease) has occurred as a result of the interaction, and an RFID reader associated with the platform no longer receives an RFID signal from the RFID transmitter borne by the item that had previously been detected. The removal of the item from the platform may be confirmed based on the RFID signal. In some implementations, the placement of the item on the platform may also be confirmed where the decrease in weight is consistent with a weight of the item identified based on the RFID signal.

RFID refers to a wireless, non-contacting system for transferring data by way of radio frequency electromagnetic fields. In an RFID system, data transfers occur in the form of modulated signals transmitted between an RFID transmitter (or an RFID tag), which may include various communication components, logic or circuitry, and an RFID reader, which may include one or more RFID antennas or other like devices. Data stored within a microchip or other storage device associated with the RFID transmitter may be sent in an RFID signal to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID transmitter, which transmits information or data that may be stored in association with the RFID transmitter in one or more microchips or other storage devices.

RFID systems provide a number of advantages over many other systems for the short-range transfer of information or data. First, an RFID transmitter may be formed of components having remarkably small, compact shapes and sizes, and transmitters that are as thin as a sheet of paper or smaller than a grain of rice are quite common. Additionally, unlike a bar code (e.g., a one-dimensional bar code or a two-dimensional code, such as a "QR" code), an RFID transmitter need not be provided within a line of sight of an RFID reader in order to successfully transmit data, and may instead be concealed or embedded into many different types of objects of any size or shape. Next, an RFID transmitter may be programmed with a fixed set or packet of "read-only" data which may be transmitted to an RFID reader countless number of times in theory, or reprogrammed with modifiable sets of data that may be written and rewritten, as needed, based on the application in which the RFID transmitter is provided. Moreover, while an active RFID transmitter includes and utilizes a local power source, such as a battery, a passive RFID transmitter does not require any power in order to successfully transmit information or data to an RFID reader in an RFID signal, and may therefore transmit such data when power supplies are unavailable or in environments where providing power to the RFID transmitter is infeasible.

RFID signals may be transmitted from an RFID transmitter to an RFID reader in many different formats and at many different frequency levels. An RFID transmitter that transmits signals within low frequency (LF), medium frequency (MF) or high frequency (HF) levels (e.g., approximately 3 kilohertz to 30 megahertz, or 3 kHz-30 MHZ) may transfer relatively small-sized sets or packets of data over short ranges (e.g., between one and one hundred centimeters, or 1-100 cm). Other RFID transmitters may transmit signals at higher frequency levels, such as ultrahigh frequency (UHF) levels (e.g., approximately 860 to 960 megahertz, or 860-960 MHZ) or microwave levels (e.g., as high as 300 gigahertz, or 300 GHZ), including larger sets or packets of data at ranges of one meter (1 m) or longer.

A signal transmission from an RFID transmitter to an RFID reader may be achieved in any number of ways. An inductively coupled RFID transmitter is an RFID transmitter that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID transmitter may also include one or more coils. When the RFID transmitter passes within a particular range of the RFID reader, an electric current is generated within the coils of the RFID transmitter, thereby coupling the RFID reader and the RFID transmitter based on the magnetic flux passing through the respective sets of coils. The electric current passing through the coils of the RFID transmitter may then power internal circuits within the RFID transmitter, and cause an RFID signal to be transmitted from the RFID transmitter to the RFID reader accordingly. Thus, inductively coupled RFID transmitters are commonly used in powerless environments where a passive system for transmitting signals may be required.

Additionally, an RFID transmitter may be coupled by any number of other modes. For example, capacitively coupled RFID transmitters include coupling plates that are designed to correspond to a plate of an RFID reader. When the RFID transmitter is placed in sufficiently close proximity to the RFID reader, thereby causing the corresponding coupling plates of the RFID transmitter and the RFID reader to be aligned in parallel with one another and within a short range, a transfer of data from the RFID transmitter to the RFID reader is achieved. Unlike an inductively coupled RFID transmitter, which is powered by a magnetic field generated by an RFID reader, a capacitively coupled RFID transmitter is powered by an alternating electric field generated by an RFID reader. For this reason, capacitively coupled RFID transmitters usually have more limited operating ranges than inductively coupled RFID transmitters and are typically employed in near-field communication environments. Similarly, a backscatter-coupled RFID transmitter receives power emitted from an RFID antenna. A portion of the emissions from the RFID reader are received by a corresponding antenna of the RFID transmitter and may be filtered or rectified, as necessary, in order to trigger a transfer of data from the RFID transmitter to the RFID reader. Any type or mode of coupling between an active, semi-active (e.g., powered on a temporary basis or for limited purposes) or passive RFID transmitter and an RFID reader may be utilized in accordance with the present disclosure.

In addition to RFID transmitters which are automatically coupled with an RFID reader, some RFID transmitters, e.g., passive RFID transmitters, may be manually activated, or coupled upon a manual action by a human or machine in order to cause a transmission of an RFID signal from the RFID transmitter to one or more RFID readers. A manually activated RFID transmitter may include physical or virtual switches, or bioelectric features, that may close a circuit within the RFID transmitter on contact and thereby permit the RFID transmitter to transmit an RFID signal in the presence of an electric or magnetic field.

Currently, where a retail establishment or another materials handling facility offers items for sale in uniform quantities and with uniform weights and prices, sales of the items may be detected by tracking interactions involving single units of the items. Where items are available for purchase at a price per unit weight, such as prepackaged fresh meats or vegetables, prepared sandwiches or soups, dry stores, or others, however, a weight of a specific item must be determined in order to calculate a price of the item. Some retail establishments currently determine weights of items prior to packaging, and calculate prices for such items based on such weights, before printing labels bearing information regarding the items, such as prices of the items or bar codes linked to data regarding the items, and affixing the labels to the items. The bar codes may then be scanned by one or more scanners or cameras at a checkout station (e.g., a cash wrap), and the items may be purchased by customers.

In some implementations of the present disclosure, a platform may be associated with an RFID reader and one or more RFID antennas, one or more processors, and a transceiver configured to transmit and receive information or data. The RFID antennas may emit RF fields of various intensities toward areas above the platform, in order to activate any RFID transmitters (e.g., tags) provided on items on the platform within such fields, and to receive RFID signals from such RFID transmitters. The platform may transmit information or data regarding loading on the platform, or RFID signals received from RFID transmitters, as well as interactions involving items on the platform, including but not limited to times at which such interactions occurred, locations of the interactions, or other information regarding items involved in the interactions, including but not limited to identifiers of the items (e.g., UPC, EPC, SKU or ASIN numbers) or the RFID transmitters applied to such items. The platform may also be associated with one or more auxiliary sensors, such as load sensors (e.g., weight sensors), which may be provided beneath or within the platform, and may generate load signals consistent with forces applied to the load sensors by items on the platform. Alternatively, any other type or form of auxiliary sensor (e.g., cameras, proximity sensors, motion sensors, time-of-flight sensors, or others) may be used to determine that an interaction has occurred.

Associations between identifiers of items or other information or data that may be programmed into an RFID transmitter and item-specific information may be made when the items are prepared for packaging, weighed, and packaged. In some implementations, a label, a tag or another system including an RFID transmitter may be prepared (e.g., by a label printer) and applied to an item. When the item is placed on a platform having one or more RFID antennas thereon, and such antennas emit an RF field, the RFID antennas may receive an RFID signal from an RFID transmitter on the item, and an RFID reader may interpret the information or data to determine that the item is placed on the platform. When the item is removed from the platform, and the RFID antennas emit an RF field, the RFID reader may determine that the RFID signal previously received from the RFID transmitter on the item is absent, and determine, by the absence of the RFID signal, that the item is no longer on the platform. RFID readers may generate a set of data, e.g., a data structure, when the RFID readers determine that an event or interaction involving a taking of an item from a platform or a return of an item to the platform has occurred. The set of data (or data structure) may include a time at which the event or interaction is believed to have occurred, as well as a location of the event, or any other information or data specific to an item associated with the event or interaction.

RFID readers and/or RFID antennas of the present disclosure may take any form. For example, RFID readers and/or RFID antennas may be provided within platforms or other self-contained systems having housings, power sources, circuits or boards (e.g., printed circuit boards or assemblies) and transmitters and/or receivers for communicating with one another, or with one or more external computer systems. RFID antennas may be configured to emit RF fields continuously, or at pulsed intervals and durations, in order to conserve power. Such intervals or durations may be selected on any basis, such as an extent of available power or energy, a level of activity, or a desired level of accuracy or precision in detecting interactions.

Auxiliary sensors of the present disclosure may also take any form. For example, auxiliary sensors may be provided in self-contained systems having housings, power sources, circuits or boards (e.g., printed circuit boards or assemblies) and transmitters and/or receivers for communicating with one another, or with one or more external computer systems. In some implementations, auxiliary sensors may also be configured to transmit signals continuously, or at pulsed intervals and durations, in order to conserve power. Such intervals or durations may also be selected on any basis, such as an extent of available power or energy, a level of activity, or a desired level of accuracy or precision in detecting interactions.

In some implementations of the present disclosure, a plurality of auxiliary sensors may be provided within a platform. In some other implementations, a plurality of auxiliary sensors may be provided on or within a shelf, a table, or another substantially planar surface of an inventory location, and a platform may be placed on each of the auxiliary sensors, which may be configured to communicate with one another or with an external computer device over one or more networks, e.g., by Bluetooth®, Wireless Fidelity (or "Wi-Fi"), or in any other manner. Alternatively, a storage unit may be manufactured or assembled as an integral unit including the auxiliary sensors, one or more RFID antennas and an RFID reader in a platform or another loading surface, along with one or more of a processor, a transceiver, or one or more power sources.

Load sensors may generate electrical load signals indicative of the dead and/or live loading thereon, including masses or weights of the platform and any items accommodated thereon. The load sensors may include one or more capacitive sensors, force-sensing resistors, strain gauges, load cells, inductive weight sensors, or any other type or form of device or system for generating electrical load signals. Moreover, where locations of the load sensors with respect to a platform thereon are known, the electrical load signals may be further used to determine locations where items are placed on the platform or removed therefrom.

Load sensors may be provided in any spatial arrangement, and a platform that is placed thereon or includes such sensors may have any shape or size, in accordance with the present disclosure. Changes or variations in loading, as determined from such signals, may be used to calculate a mass or weight of one or more items that have been placed onto a storage system or removed therefrom, or a location at which the items have been placed thereon or removed therefrom, and a transaction associated with such items may be attributed to a customer accordingly.

Cameras may capture imaging data of a storage unit or areas around the storage unit, and may determine a status of loading on the storage unit, or detect one or more interactions with the storage unit, based on the imaging data and may generate one or more signals regarding the status of the loading on the storage unit or the one or more interactions with the storage unit accordingly. Proximity sensors or motion sensors may detect one or more actors within a vicinity of a storage unit, and may generate one or more signals indicating the presence of motion or the nearness of one or more objects to the storage unit accordingly. Any other type or form of sensor may be configured to generate one or more signals representing conditions of a storage unit, or a change in such conditions.

In accordance with implementations of the present disclosure, RFID signals received by RFID antennas and auxiliary signals received from auxiliary sensors may be used to separately determine whether an event or interaction has occurred, or to identify an item associated with the event or interaction, e.g., based on a change in loading on a platform determined from such signals, or the presence or absence of an RFID signal. Alternatively, or additionally, in some implementations, auxiliary signals may act as a primary (or main) source of information or data as to whether an event has occurred, and RFID signals may act as a secondary (or backup) source of information or data, or vice versa. In some implementations, the auxiliary signals and the RFID signals may be used together to reduce a number of "false positives," or events or interactions that are identified when neither a taking nor a return of an item has actually occurred, or a number of "false negatives," where a taking or a return of an item has occurred but is not identified as an event or an interaction with the platform.

For example, in some implementations, where an RFID signal identifying an item is no longer received by an RFID reader, thereby indicating that an event or an interaction involving a taking of the item has occurred, but a change in loading on the platform corresponding to a weight of the item is not indicated in auxiliary signals received from one or more sensors, the auxiliary signals may be relied upon to confirm that the taking of the item has not occurred, and a "false positive" may be avoided. Likewise, where an RFID signal identifying an item continues to be received by an RFID reader, thereby indicating that an event or an interaction involving a taking of the item has not occurred, but a reduction in loading on the platform corresponding to a weight of the item is indicated in auxiliary signals received from one or more sensors, the auxiliary signals may be relied upon to confirm that a taking of the item has actually occurred, such as when a label including an RFID transmitter has inadvertently been released from the item, and a "false negative" may be avoided.

In some implementations, a slot numbering pool size for an RFID reader may be adjusted based on a number of items that are determined to be provided on a shelf. Furthermore, in some implementations, a change in loading on a shelf, as detected from one or more auxiliary signals, may trigger the RFID reader to activate an RFID antenna and emit an RF field only when an actor (e.g., a customer) is interacting with the shelf. Moreover, where a storage unit includes a plurality of auxiliary sensors and a plurality of RFID antennas, auxiliary signals generated by the auxiliary sensors may be used to determine a location of an event or interaction involving an item on the shelf, and an RF antenna within a vicinity of that location may be selectively energized to emit an RF field for a brief duration, or for any duration, after the change in loading has terminated. For example, in some implementations, such as where a plurality of load sensors (or other auxiliary sensors) are provided in association with a platform having one or more RFID antennas, and a change in loading is detected by one or more of the load sensors, a load sensor that sensed the greatest change in loading on the platform may be identified. Since the change in loading most likely occurred within a vicinity of the load sensor that sensed the greatest change in loading on the platform, one or more RFID antennas closest to that load sensor may be energized in response to the change in loading, and other RFID antennas that are remote from that load sensor need not be energized. In this regard, electrical power consumed by the RFID antenna and/or the RFID reader during operation, and RF interference with the operation of adjacent devices or systems, may be reduced based on information or data captured by auxiliary sensors.

The operations of the RFID antennas, RFID readers and/or auxiliary sensors, or the processing of signals generated or information or data captured thereby, may be triggered, initiated, controlled or managed by one or more computer-based systems that may be provided in any physical location, or in one or more alternate or virtual locations, e.g., in a "cloud"-based environment. For example, in some implementations, a signal indicative of loading on a storage unit, or a change in loading, may be generated by an auxiliary sensor (e.g., a load sensor) and transmitted or otherwise provided to an RFID reader, or another system having one or more processors or other components. The signal may expressly instruct the RFID reader to energize one or more RFID antennas to emit RF fields. Alternatively, the RFID reader may interpret the signal received from the auxiliary sensor and make an independent determination as to whether the RFID antennas, or which of the RFID antennas, should be energized to emit RF fields. In some implementations, a single computer device or system (or multiple computer devices or systems) may receive auxiliary signals from auxiliary sensors, and determine whether the RFID antennas, or which of the RFID antennas, should be energized to emit RF fields. An RFID reader that receives RFID signals from items within such fields may transmit information or data regarding the items or the contents of the RFID signals to the computer device or system, which may then determine whether an event or interaction has occurred, and identify a location of the event or interaction, along with one or more items associated with the event or interaction.

Any number of implementations of the storage units disclosed herein may be utilized in tandem with one another, and may be configured to communicate with one or more external computer devices or systems regarding any number of items provided thereon. A storage unit may include or be associated with one or more RFID antennas and/or readers, along with any number of auxiliary sensors, which may be of the same type or kind, or of different or multiple types or kinds. For example, a storage unit may include one or more platforms or other surfaces upon which items may be placed, as well as RFID antennas and RFID readers on, within or near such platforms or other surfaces. Additionally, the storage unit may further include any number of auxiliary sensors that are provided beneath, over, adjacent to or within such platforms or other surfaces.

For example, in some embodiments, a platform may include a plurality of RFID antennas embedded therein, along with a plurality of load sensors provided underneath the platform, e.g., between the platform and a shelf, a table or another system. Additionally, the platform may also be within fields of view of one or more cameras, or within operational ranges of one or more proximity sensors, motion sensors, time-of-flight sensors, or other systems. The operation of the RFID antennas and/or the RFID readers may be initiated, activated, controlled or otherwise triggered by changes in loading or other activity involving the platform or items thereon, as determined from auxiliary signals generated by, or including information or data captured by, one or more of the auxiliary sensors. An addition of an item to a platform or other surface of a storage unit, or a removal of an item from the platform or other surface, may be determined based on changes or variations in loading or other activity involving the platform or the other surface, or items thereon, as sensed by auxiliary sensors collectively, or by changes or variations in the loading or other activity sensed by each of the auxiliary sensors individually, as well as by the presence or absence of RFID signals.

Where a platform or other surface having one or more items thereon is supported in equilibrium, a total weight of the items is determined by a net total load sensed by load sensors (e.g., a total load sensed by such sensors, less a weight of the platform). Additionally, where the platform is supported in equilibrium, individual loads sensed by load sensors may be used to determine a center of gravity of the loads. Thus, in accordance with the present disclosure, when each item is placed in a given location on a platform, the weight and the center of gravity (which corresponds to the given location) of the item may be determined based on individual load signals generated by each of the load sensors. In some implementations, a location of an item on a platform may be determined using a pair of load sensors disposed near opposite ends of the platform, and may thus be defined as a common line or line segment having a first distance from one of the load sensors and a second distance from another of the load sensors. In some other implementations, a location of an item may be determined using multiple pairs of load sensors, and may thus be defined as an intersection of two or more of such lines or line segments. Moreover, once a mass or a weight of an item is determined, the mass or weight may be compared to an index, record or look-up table associating items with their respective masses or weights, and used to identify the item that was placed at the location.

The load sensors of the present disclosure may be used to determine a mass or a weight of an item placed on a platform, and a location of the item, where the platform is mounted in association with the load sensors. Those of ordinary skill in the pertinent arts will recognize that an object in static equilibrium satisfies the following conditions. First, a vector sum of all external forces acting on the object must be zero. Second, a sum of torques due to all external forces acting on the object about any axis must also be zero. Accordingly, where one or more items are placed atop a storage system of the present disclosure or removed therefrom, a mass or a weight of an item disposed on the storage system may be identified by determining a sum of the forces sensed by each of the load sensors, and a location of the item on a shelf or another inventory location may be determined based on known distances between pairs of the load sensors. Where two or more pairs of load sensors provide support to a platform, a mass or a weight of an item disposed on the storage system may be identified by determining a sum of the forces sensed by each of the load sensors, and a location of the item may be determined based on known distances between each of any pair of the load sensors.

Those of ordinary skill in the pertinent art will further recognize that the term "weight" refers to a force applied to a given mass by acceleration due to gravity, or approximately 32 feet per second per second (32 $ft/s^2$), or 9.8 meters per second per second (9.8 $m/s^2$), which is substantially constant all over the planet Earth. Because weight is directly proportional to mass, the terms "weight" and "mass" may be used interchangeably throughout the present disclosure. Moreover, the terms "auxiliary sensor," "event sensor," "trigger sensor," "event trigger sensor," or like terms, may also be used interchangeably throughout the present disclosure.

Figure 2:
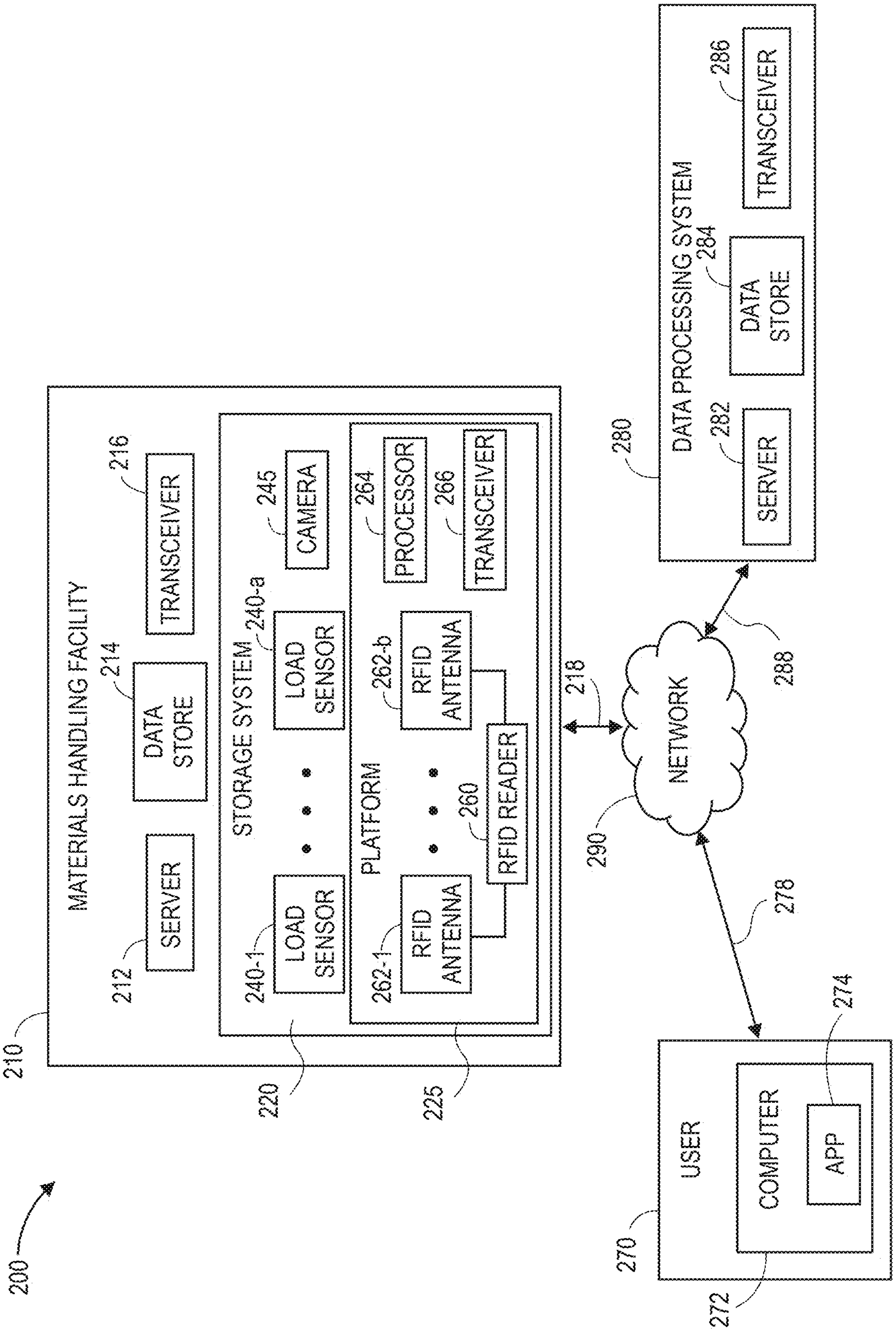
FIG. 2 is a block diagram of components of one system for detecting interactions in accordance with implementations of the present disclosure.

Referring to FIG. 2, a block diagram of components of one system for detecting interactions in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1I.

As is shown in FIG. 2, a system 200 includes a materials handling facility 210 having a storage system (or storage unit) 220, a user 270 and a data processing system 280 that are connected to one another across a network 290, which may include the Internet in whole or in part.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts or volumes that may not be inherently organized into countable units, and may instead be managed in terms of measurable quantities such as units of length, area, volume or weight, or other dimensional properties characterized by units of measurement.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first inventory location (e.g., a first inventory shelf or other storage unit) in an inventory area, moved a distance, and placed at a second inventory location (e.g., a second inventory shelf or other storage unit) in the inventory area.

As is shown in FIG. 2, the materials handling facility 210 includes a networked computer infrastructure for performing various computer-related functions associated with the receipt, storage, processing and distribution of such items, including one or more physical computer servers 212, data stores (e.g., databases) 214 and/or transceivers 216, that may be provided in the same physical location as the materials handling facility 210, or in one or more alternate or virtual locations, e.g., in a "cloud"-based environment. In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests. In some implementations, the servers 212, the data stores 214 and/or the transceivers 216 may be configured to execute one or more machine learning tools, systems or techniques.

The transceiver 216 may be configured to enable the materials handling facility 210 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the materials handling facility 210, or to one or more other computer devices or systems (e.g., other aerial vehicles, not shown) via the network 290. For example, in some implementations, the transceiver 216 may be configured to coordinate I/O traffic between the server 212 or the data store 214 and the user 270 or the data processing system 280. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the USB standard. In some other implementations, functions of the transceiver 216 may be split into two or more separate components, or integrated with the server 212.

The storage system 220 includes a platform 225 having an RFID reader 260, a plurality of RFID antennas 262-1 . . . **262-*b*, a processor 264 and a transceiver 266, as well as a plurality of load sensors 240-1 . . . 240-*a* and a camera 245**.

One or more components of the storage system 220 may be incorporated into or in association with any number of surfaces, such as the platform 225, for accommodating one or more inventory items thereon. The load sensors 240-1 . . . **240-*a* may be provided in association with one or more of such surfaces to detect loading thereon and to generate one or more electrical load signals consistent with forces associated with such loading. In some implementations, the storage system 220 may be provided in association with an inventory location such as a shelf, a table or another system having a surface for accommodating items thereon. In such implementations, the platform 225 may be placed atop the one or more load sensors 240-1 . . . 240-*a*, such as is shown in FIGS. 1A through 1I, thereby enabling the storage system 220 to be incorporated quickly, inexpensively and effectively into existing systems. Alternatively, the storage system 220 may be an integrated system that includes the platform 225 and the load sensors 240-1 . . . 240-*a* incorporated therein. Regardless of form, the platform 225 or other surfaces of the storage system 220 may be aligned horizontally, e.g., flat, or at any non-horizontal angle. Additionally, the storage system 220 may further include any additional structural components associated with the platform 225 or the load sensors 240-1 . . . 240-*a***, including but not limited to one or more of the walls or like barriers or surfaces that surround such surfaces in whole or in part.

The load sensors 240-1 . . . **240-*a* may be an auxiliary sensor, such as a device that is configured to generate and transfer electrical load signals corresponding to forces sensed from dead and live loads at respective points of the storage system 220, e.g., on one or more surfaces for accommodating items thereon, with such forces including a mass or a weight of a platform or other surface along with weights of one or more items placed thereon. In some implementations, the load sensors 240-1 . . . 240-*a* may be configured for placement beneath or in association with a platform or another surface for accommodating items thereon that is placed atop an existing storage system, e.g., an inventory location such as a shelf, a table or another surface. In some other implementations, one or more of the load sensors 240-1 . . . 240-*a* may be integral components of any other aspect of the storage system 220**, and mounted therein in association with a platform or other surface for accommodating items thereon.

Each of the load sensors 240-1 . . . **240-*a* may include one or more power sources, load cells, circuit boards or other components, which may be provided in a common housing of any size or shape. For example, the load sensors 240-1 . . . 240-*a* may include any type or form of battery, fuel cell or other system for generating power for supporting operations of the load sensors 240-1 . . . 240-*a*, such as a standard battery, e.g., a size AA battery, a size AAA battery, a size C battery, a size D battery, a coin-cell battery (e.g., a CR 2016, a CR 2025 or a CR 2032), or any other battery. In some implementations, each of the load sensors 240-1 . . . 240-*a* need not include an intrinsic power source, but may be electrically coupled to another component, e.g., the RFID reader 260 or another one of the load sensors 240-1 . . . 240-*a*, and may receive electrical power from the other component, such as according to a Power over Ethernet (or "PoE") or a Universal Serial Bus Type-C ("USB-C") standard or system. The load sensors 240-1 . . . 240-*a* may also include load cells or any other systems for generating electrical load signals corresponding to forces applied to the load sensors. In some implementations, the load cells may be strain-gage load cells, which may include conductive elements such as aluminum, copper and/or silicon provided in strings or grids that are configured to sense changes in electrical resistance in response to physical loading. In some other implementations, the load cells may include one or more capacitive sensors, force-sensing resistors, inductive weight sensors, or any other type or form of device or system for generating electrical load signals in response to loading thereon. The load sensors 240-1 . . . 240-*a* may further include one or more components for controlling operations of the load sensors 240-1 . . . 240-*a*** or for interpreting information or data captured thereby, such as converters, transistors, transducers, or any other components.

Additionally, each of the load sensors 240-1 . . . **240-*a* may be in communication with the RFID reader 260 by wired or wireless means, or with one or more external computer devices or systems, e.g., over the network 290**, in order to transmit or receive information in the form of digital or analog data by any wired or wireless technologies or protocols, or for any other purpose.

The camera 245 may be an auxiliary sensor such as an image device or any other form of optical recording devices that may be used to photograph or otherwise record imaging data of structures, facilities or items within the materials handling facility 210, or for any other purpose. The camera 245 may have diverse fields of view of the materials handling facility 210, or other scenes, that are configured to capture imaging data that may be processed to recognize and locate motion, locations and/or orientations of various actors within the materials handling facility 210. The camera 245 may be mounted in any specific location or orientation within the materials handling facility 210, e.g., above, below or alongside one or more inventory areas or stations for receiving or distributing items. Alternatively, the camera 245 may be provided in any open or enclosed environment or space in which any number of actors (e.g., humans, other animals or machines) may execute one or more poses, gestures or other actions within one or more of their fields of view.

The camera 245 may include one or more sensors, memory or storage components and processors, and such sensors, memory components or processors may further include one or more photosensitive surfaces, filters, chips, electrodes, clocks, boards, timers or any other relevant features (not shown). For example, the camera 245 may include one or more optical sensors, such as color sensors (or grayscale sensors or black-and-white sensors) and/or depth sensors, that are configured to capture visual imaging data (e.g., textures) or depth imaging data (e.g., ranges) to objects within one or more fields of view of the camera 245. Additionally, the camera 245 may include one or more processors, memory components or any other components (not shown) that may be required in order to capture, analyze and/or store imaging data captured from within the materials handling facility 210. For example, the camera 245 may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data.

The RFID reader 260 is any type of sensor or interrogator that may be provided for use in connection with signals transmitted from one or more active or passive RFID transmitters, including but not limited to transmitters associated with items placed on or in the storage system 220, or any other RFID transmitters that may be associated with the user 270 or other aspects of the materials handling facility 210.

The RFID reader 260 may include one or more components for transmitting or receiving signals, such as the RFID antennas 262-1 . . . **262-*b* that may be provided in association with a platform or other surface of the storage system 220, e.g., on the platform or embedded within the platform. The RFID reader 260 may further include any type or number of circuitry components for processing and controlling the operation of the RFID reader 260, such as by causing the activation of one or more of the RFID antennas 262-1 . . . 262-*b*, to emit RF fields therefrom, or interpreting any RFID signals received by the RFID antennas 262-1 . . . 262-*b*. Additionally, the RFID reader 260 or the RFID antennas 262-1 . . . 262-*b* may be formed within an integral unit of a platform or other surface of the storage system 220**, or above or below such a platform or surface, and operatively connected to one or more computer systems or networks by wired or wireless means.

According to some implementations, one or more of the RFID antennas 262-1 . . . **262-*b* associated with the RFID reader 260 may be configured to receive RFID signals from RFID transmitters that are located within operational ranges, e.g., approximately one inch (1") to six inches (6"), of one of the RFID antennas 262-1 . . . 262-*b*. The operational ranges of the RFID antennas 262-1 . . . 262-*b* may be determined by one or more factors including but not limited to the sensitivity or transmitting power of the RFID reader 260 or an intensity of an RF field emitted by one or more of the RFID antennas 262-1 . . . 262-*b*, as well as sizes of the RFID antennas 262-1 . . . 262-*b* with respect to the sizes of the RFID transmitters. Additionally, the RFID reader 260 may communicate with such RFID transmitters by way of any coupling modes or methods that may be known to those of ordinary skill in the pertinent arts. For example, an RFID transmitter may modulate one or more elements of data stored thereon, and transmit a modulated data signal to a receiving circuit associated with the RFID reader 260. Subsequently, the RFID reader 260 may then demodulate the data signal, and provide a processed set of data derived from the data signal to the server 212, the computer 272, the server 282**, or any another computer device for further processing.

Moreover, the RFID reader 260 may be configured to capture, evaluate, transmit or store any available information regarding signals received from one or more RFID transmitters, including information regarding any attributes of the signals, including but not limited to sensed signal strengths or intensities, angular directions or ranges to the RFID transmitters from which such signals were received, any differences between the strengths, intensities, angular orientations or ranges associated with two or more signals, or information or data included in the signals.

The processor 264 may be any computer system or component that is configured to execute any type of computer-based function or compute any type or form of calculation, including but not limited to any formulas, equations, algorithms or techniques for determining one or more probabilities or performing any number of statistical tests.

The transceiver 266 may be configured to coordinate communications between and among the load sensors 240-1 . . . **240-*a*, the RFID reader 260 or the RFID antennas 262-1 . . . 262-*b*, or with one or more external computer devices or systems, e.g., the computer 272 or the server 282, over the network 290. The transceiver 266 may be configured for communication via one or more wired or wireless means, e.g., wired technologies such as USB, Ethernet or fiber optic cable, or standard wireless protocols such as Bluetooth® or any Wi-Fi protocol, such as over the network 290 or directly. For example, in some implementations, the transceiver 266 may communicate with the load sensors 240-1 . . . 240-*a* or over the network 290** via or within any wireless band, including but not limited to a 5.0 gigahertz (GHz) band, or a 2.4 gigahertz (GHz) band.

Although the system 200 of FIG. 2 includes a single box corresponding to a storage system 220, a pair of boxes corresponding to the load sensors 240-1 . . . **240-*a*, a single box corresponding to a camera 245, a single box corresponding to an RFID reader 260, a pair of boxes corresponding to RFID antennas 262-1 . . . 262-*b*, a single box corresponding to a processor 264, and a single box corresponding to a transceiver 266, those of ordinary skill in the pertinent arts will recognize that the materials handling facility 210 may include any number of the storage systems 220, and each of such storage systems 220 may include any number of load sensors, cameras, RFID readers, RFID antennas, processors or transceivers. Furthermore, each of the storage systems 220 may be homogenous in nature, such that each includes the same number and type of components and surfaces for accommodating items, or heterogeneous in nature, such that one or more of the storage systems 220 includes a number or type of components or a surface for accommodating items that is different from a number or type of load sensors or a surface for accommodating items of one or more other storage systems 220** in accordance with the present disclosure.

Moreover, the materials handling facility 210 or the storage system 220 may also include any number of other auxiliary sensors, components or other features for detecting one or more events or interactions therein, including one or more imaging devices, RFID sensors, LIDAR sensors, or any other type or form of sensors. Information or data captured by a variety of sensors may be independently or collectively evaluated in order to determine a measure of a probability or likelihood that an event has occurred at a specific location, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

The materials handling facility 210 may also include one or more other components or features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as the user 270, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, information or data captured using the load sensors 240-1 . . . **240-*a*, the camera 245 or any other components of the materials handling facility 210 and/or the storage system 220 may be utilized in concert with information or data captured or generated by a locating service having one or more processors or sensors for detecting the presence or absence of one or more actors within the materials handling facility 210, and locating one or more poses, gestures or other actions executed by such actors within the materials handling facility 210. Such a locating service may be provided in the same physical location as the materials handling facility 210** or in one or more alternate or virtual locations, e.g., in a "cloud"-based environment.

For example, a number and positions of actors within the material handling facility 210 (e.g., the user 270) may be identified based on imaging data captured by the camera 245, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility 210, or the identities of the actors, may be determined based on images captured by such cameras (e.g., according to one or more other facial recognition and/or other object recognition techniques). Alternatively, a number and/or a position of one or more actors within the materials handling facility 210 may be determined based on information or data gathered by one or more sensors other than a camera. For example, a materials handling facility 210 may include a scanner, a reader or other device configured to identify actors who enter or exit the materials handling facility 210, e.g., based on information or data provided by an application operating on a mobile device carried by such actors, or in any other manner. In some implementations, the cameras that are used to determine the number and/or the position of the actors within the materials handling facility 210 may be one or more of the same sensors that detected the event. In some implementations, the cameras need not be the same sensors that detected the event.

The user 270 may be any entity or individual that wishes to download, purchase, rent, lease, borrow or otherwise obtain items (which may include goods, products, services or information of any type or form) from the materials handling facility 210, or any other entity or individual that is located at the materials handling facility 210 for any reason. The user 270 may utilize one or more computing devices 272, including but not limited to a mobile device (e.g., a smartphone, a tablet computer or a wearable computer, or computing devices provided in wristwatches or other wrist-mounted devices, glasses or other head-mounted devices, automobiles or any other appliances or machines), a set-top box, a smart speaker, as well as a laptop computer, a desktop computer, or computing devices provided in wristwatches, televisions, set-top boxes, automobiles or any other appliances or machines. The computing devices 272 utilized by the user 270 may operate or access one or more software applications 274, such as a web browser, a shopping application, a mapping application or an E-mail client, and may be connected to or otherwise communicate with the materials handling facility 210, or any other computer devices by the transmission and receipt of digital data over the network 290, as indicated by line 278.

The data processing system 280 includes one or more physical computer servers 282 having one or more data stores 284 (e.g., databases) and transceivers 286 associated therewith, as well as provided for any specific or general purpose. For example, the data processing system 280 of FIG. 2 may be independently provided for the exclusive purpose of receiving, analyzing or storing information or data received from the materials handling facility 210 or the user 270, or, alternatively, provided in connection with one or more physical or virtual services that are configured to receive, analyze or store such information or data, as well as one or more other functions. In some implementations, the data processing system 280 may be associated with the materials handling facility 210, or any other physical or virtual facility.

The servers 282, the computer data stores 284 and/or the transceivers 286 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, such as over the network 290. In some implementations, the data processing system 280 may be provided in a physical location. In other such implementations, the data processing system 280 may be provided in one or more alternate or virtual locations, e.g., in a "cloud"-based environment.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "user," or a "data processing system," or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "user," or a "data processing system," or like terms, may be typically performed by a human, but could, alternatively, be performed by an automated agent. The protocols and components for providing communication between the materials handling facility 210, the user 270 and/or the data processing system 280 are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the transceiver 216, the RFID reader 260, the computer 272, the server 282, the data stores 284 or the transceiver 286, and having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
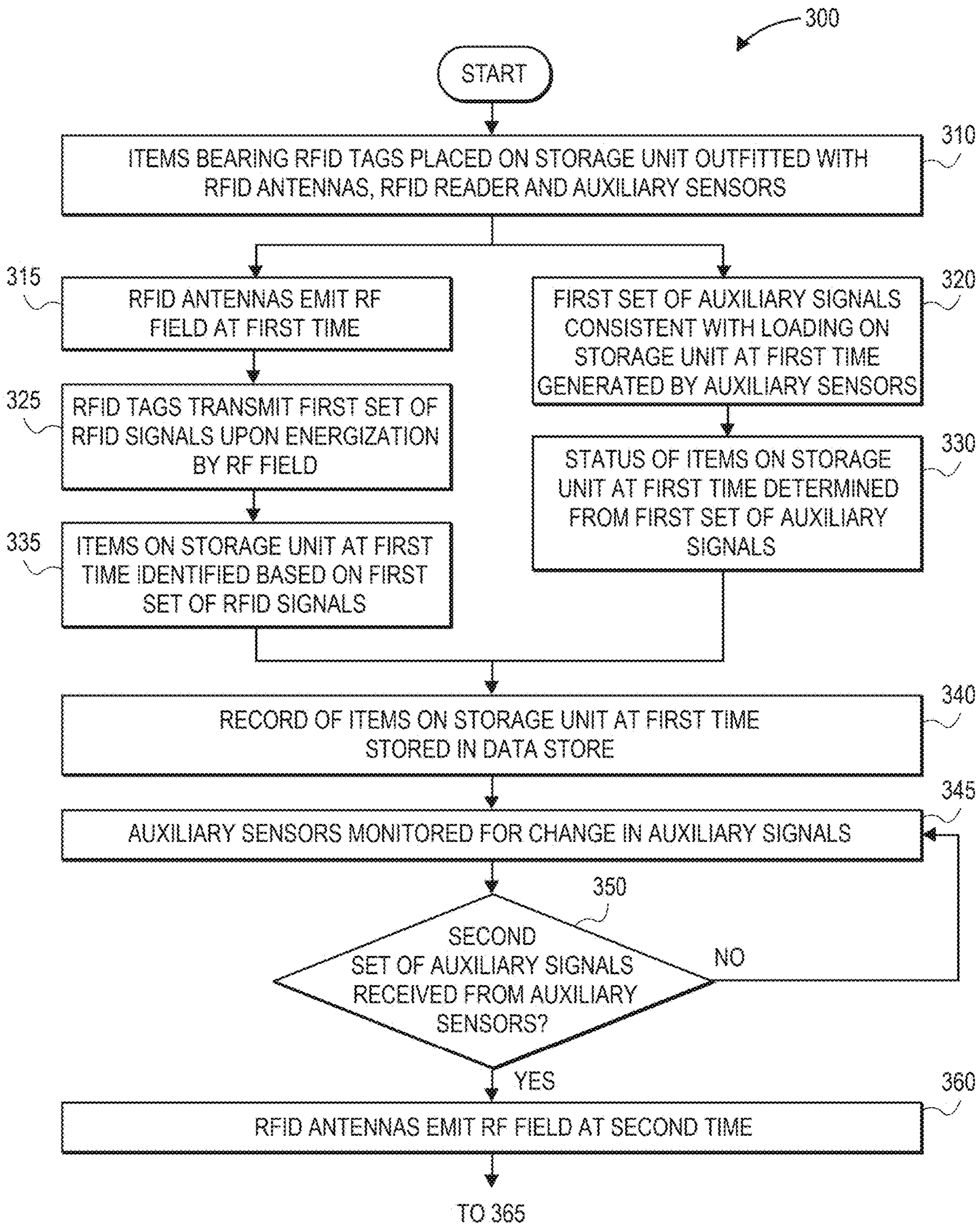
FIGS. 3A and 3B are a flow chart of one process for detecting interactions in accordance with implementations of the present disclosure.
Figure 3B:
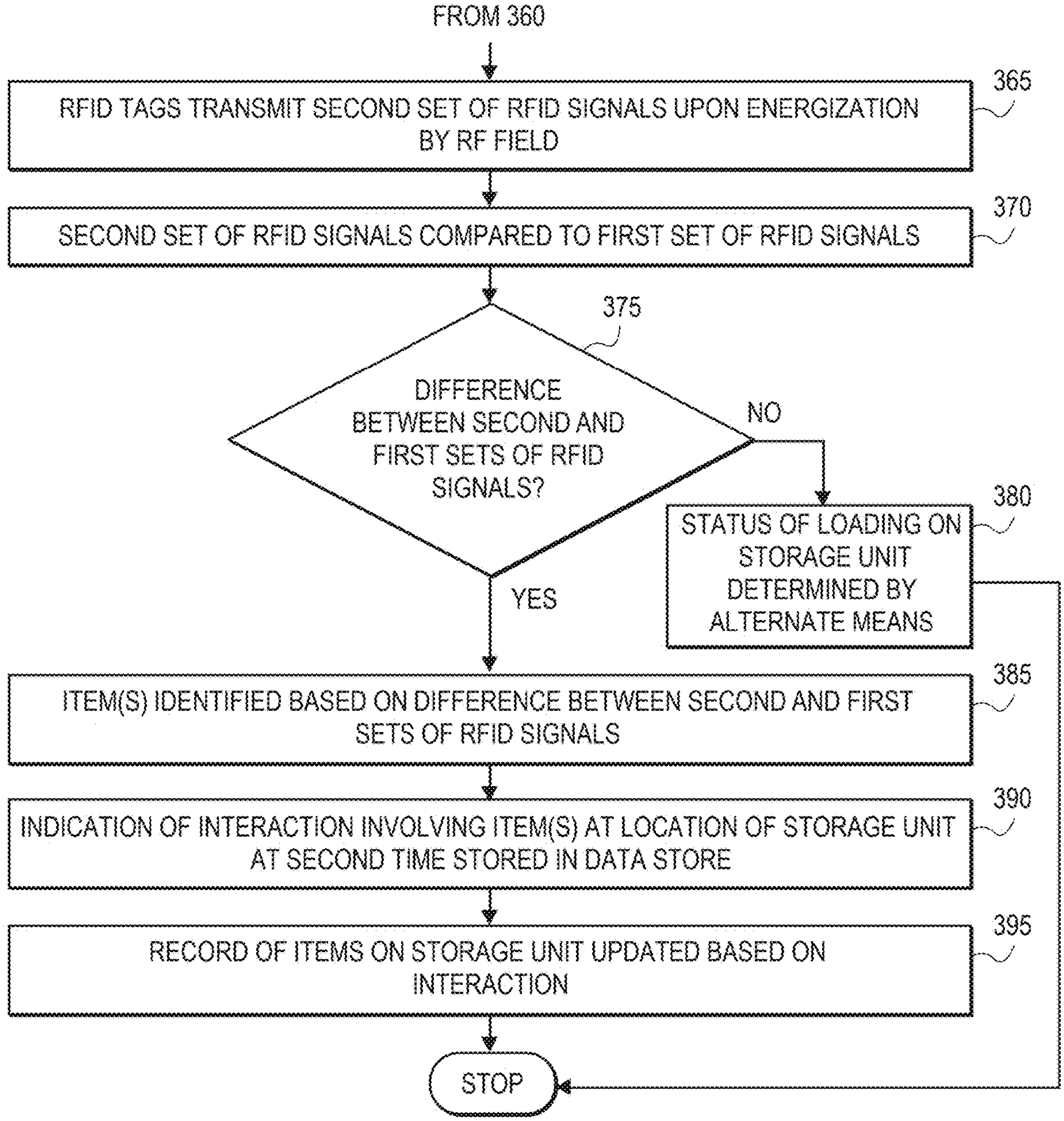

Referring to FIGS. 3A and 3B, a flow chart 300 of one process for detecting interactions in accordance with implementations of the present disclosure is shown. At box 310, items bearing RFID tags (or RFID transmitters) are placed on a storage unit outfitted with RFID antennas and an RFID reader and one or more auxiliary sensors. For example, as is shown in FIG. 1D, a storage unit (or storage system) may include a plurality of RFID antennas that are provided on or within a platform or other like system having a surface configured to receive one or more items thereon. The RFID antennas and the auxiliary sensors may be in communication with the RFID reader, or with one or more processors or transceivers associated with the platform, or in any other location.

At box 315, the RFID antennas emit an RF field at a first time. For example, the RFID antennas may be programmed or configured to emit the RF field at regular intervals or times, or at random intervals or times, or at any other intervals or times. Alternatively, or additionally, the emission of the RF field by the RFID antennas may be triggered by a change in loading on the storage unit, as determined by one or more of the load sensors, or on any other basis. Moreover, a strength or an intensity of an RF field emitted by the RFID antennas may be selected to increase a probability that the RF field is sensed by the RFID tags provided on the items on the storage unit, and not by any other RFID tags in any other location. At box 325, the RFID tags provided on the items on the storage unit transmit a first set of RFID signals, each including information or data programmed into a chip or other memory component provided on such tags. The information or data may identify each of the respective items, or a type of each of the items, as well as any attribute of the items, such as weights of the items. At box 335, the items on the storage unit at the first time are identified based on the first set of RFID signals.

In parallel, at box 320, a first set of auxiliary signals consistent with the loading on the storage unit at the first time is generated by the auxiliary sensors. At box 330, a status of the items on the storage unit at the first time is determined from the first set of auxiliary signals. For example, where each of the auxiliary sensors is a load sensor that generates an electrical signal corresponding to a force applied thereto, values of forces sensed by the respective auxiliary sensors may be interpreted from such signals, and the weight of the items on the storage unit at the first time may be determined accordingly by subtracting a weight of a platform or other system on which the items are placed. Where each of the auxiliary sensors is a camera, images captured by the camera may be processed to determine whether any items are placed on the storage unit, or which items are placed on the storage unit. Any other auxiliary sensors may generate auxiliary signals from which a status of the loading at the first time may be determined.

At box 340, a record of the items on the storage unit at the first time is stored in a data store. The record may be an inventory record maintained in a component provided in association with the storage unit, or in a server in communication with the RFID reader, or in any other physical or virtual location.

At box 345, the auxiliary sensors are monitored for changes in the auxiliary signals generated thereby. For example, in some implementations, each of the auxiliary sensors may be a load sensor programmed to transmit a signal representative of a respective loading condition thereon at a regular interval of time, e.g., every ten milliseconds, and having a regular duration, e.g., every two milliseconds. The pulse-sampling rate or frequency may be selected on any basis, including but not limited to an extent of power or energy that is available to the load sensors, a number or a frequency of interactions with the storage unit, or any other factors, including but not limited to a desired level of accuracy or precision in detecting such interactions.

At box 350, whether a second set of auxiliary signals, e.g., a set of auxiliary signals including at least one auxiliary signal that is different from any of the first set of auxiliary signals, is received from the auxiliary sensors at a second time is determined. If a second set of auxiliary signals is not received from the auxiliary sensors, e.g., if each of the auxiliary signals received from the auxiliary sensors is the same as the first set of auxiliary signals, then the process returns to box 345, where the auxiliary sensors are monitored for changes in their respective auxiliary signals.

If a second set of auxiliary signals is received, however, then the process advances to box 360, where the RFID antennas emit an RF field at the second time. For example, in some implementations, the emission of the RF field by the RFID antennas may be triggered by a change in loading on the storage unit, as determined by comparing the second set of auxiliary signals to the first set of auxiliary signals, or on any other basis. Alternatively, or additionally, the RFID antennas may emit the RFID field at a next time following the receipt of the second set of auxiliary signals, such as where the RFID antennas are configured to emit RF fields according to a regular interval.

At box 365, the RFID tags transmit a second set of RFID signals upon being energized by the RF field emitted at box 360, and at box 370, the second set of RFID signals is compared to the first set of RFID signals. For example, because the second set of RFID signals are transmitted by RFID tags provided on items that are placed on the storage unit and within the RF field emitted at box 360, a difference between the second set of RFID signals and the first set of RFID signals, viz, one or more RFID signals that is included in the first set of RFID signals but not in the second set of RFID signals, or one or more RFID signals that is included in the second set of RFID signals, but not in the first set of RFID signals, may be used to identify an item that was located on the storage unit at the first time and was removed at or prior to the second time, or to identify an item that was not located on the storage unit at the first time but was placed thereon at or prior to the second time.

At box 375, whether there is a difference between the second set of RFID signals and the first set of RFID signals is determined. If there is no difference between the second set of RFID signals and the first set of RFID signals, however, then the process advances to box 380, where a status of loading on the storage unit is determined by alternate means, e.g., a visual inspection or audit, and the process ends. For example, where the second set of RFID signals is the same as the first set of RFID signals, but the second set of auxiliary signals is different from the first set of auxiliary signals, the mismatch requires an alternative determination of the status of loading on the storage unit, in order to avoid a "false positive" or a "false negative."

If the second set of RFID signals is different from the first set of RFID signals, however, such that at least one of the RFID signals included in the second set of RFID signals is not included in the first set of RFID signals, or vice versa, then the process advances to box 385, where one or more items are identified based on the difference between the second set of RFID signals and the first set of RFID signals. For example, where each of the second set of RFID signals is unique to one of the items on the storage unit at the second time, and where each of the first set of RFID signals is unique to one of the items on the storage unit at the first time, then a difference between the RFID signals implies that items have been added to the storage unit, or removed from the storage unit, between the first time and the second time, and the items that have been added or removed may be identified based on the RFID signals that are newly present, or newly absent, at the second time.

At box 390, an indication of an interaction with the storage unit involving the one or more items identified at box 385 at the second time is stored in a data store. At box 395, a record of the items on the storage unit is updated to reflect a change resulting from the interaction, e.g., the addition of the items identified at box 385 to the storage unit or the removal of the items identified at box 385 therefrom, and the process ends. Alternatively, or additionally, such as where an identity or an identifier of an actor within a vicinity of the storage unit is known, the interaction with the storage unit that resulted in a change in a number of items thereon may be associated with the actor, e.g., by updating a data file or record regarding items associated with the actor to indicate that the one of the items involved in the interaction is now associated with the actor, or is no longer associated with the actor.

Figure 4A:
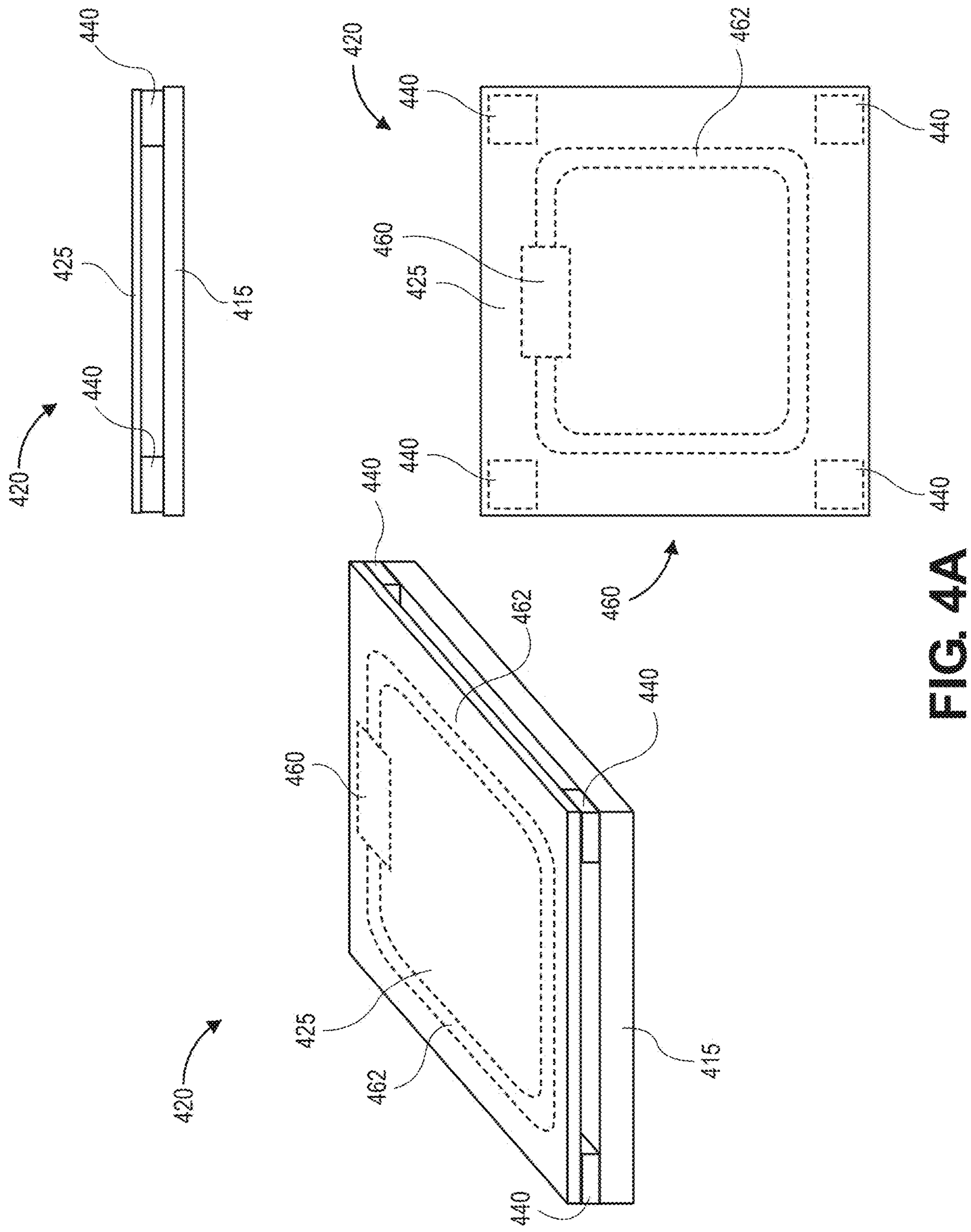
FIGS. 4A through 4C are views of aspects of one system for detecting interactions in accordance with implementations of the present disclosure.
Figure 4B:
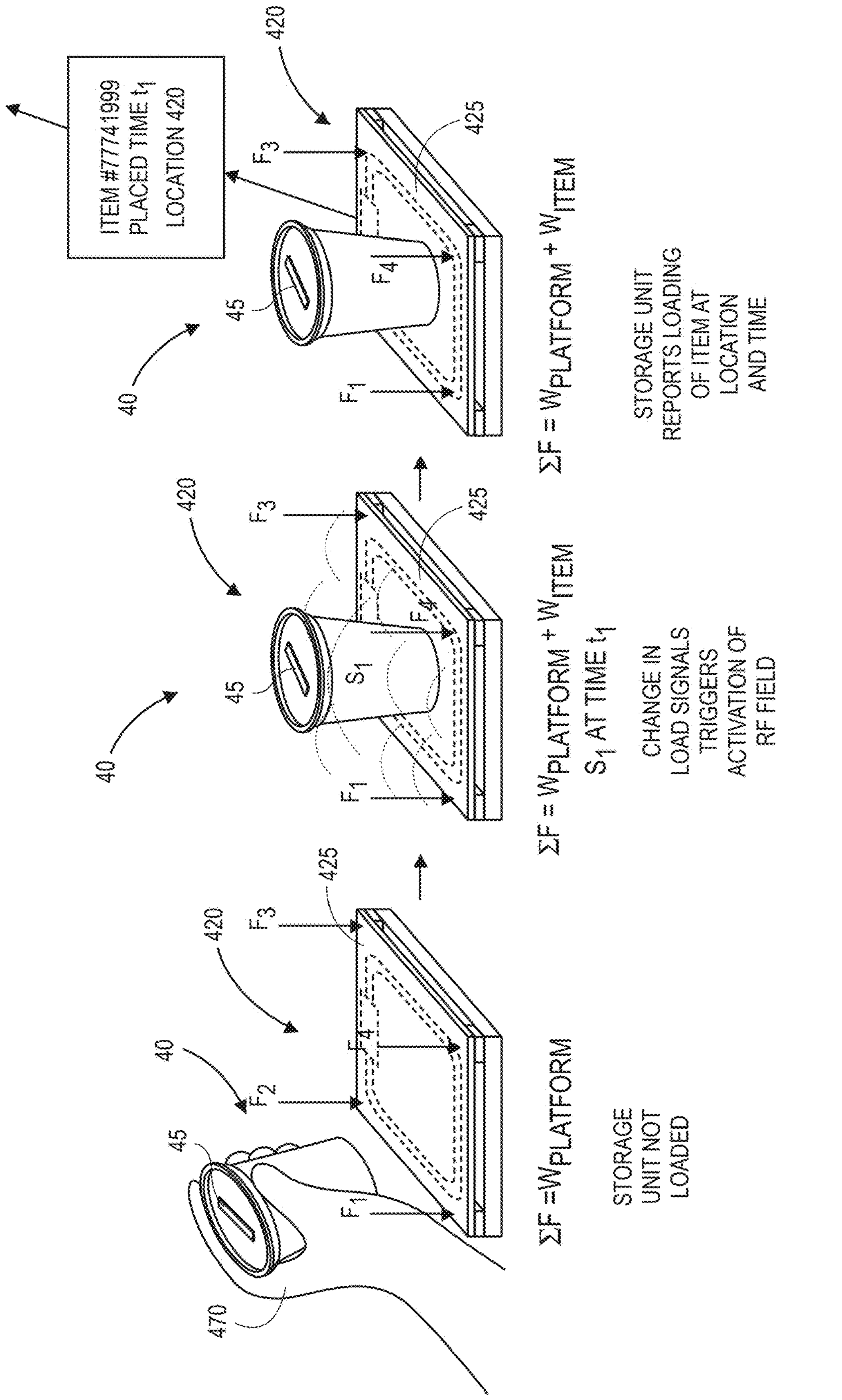
Figure 4C:
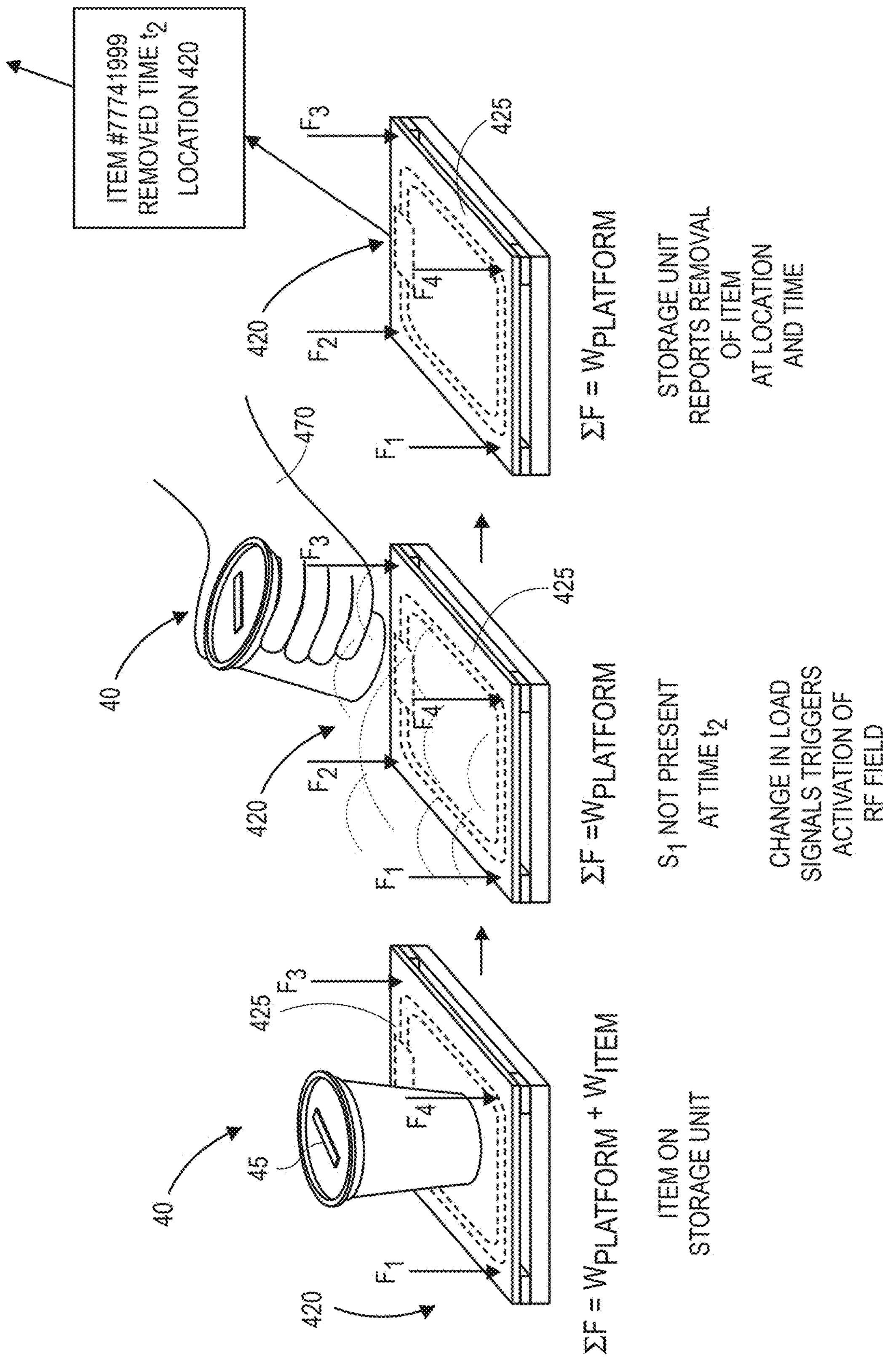

As is discussed above, storage units or systems that feature platforms or other surfaces that are associated with RFID antennas and load sensors associated therewith, along with an RFID reader in communication with the RFID antennas and load sensors, may be used to detect interactions with items based on signals generated or received by the RFID antennas and the load sensors. Referring to FIGS. 4A through 4C, views of aspects of one system for detecting interactions in accordance with implementations of the present disclosure are shown. Except where otherwise noted, reference numerals preceded by the number "4" shown in FIGS. 4A through 4C indicate components or features that are similar to components or features having reference numerals preceded by the number "2" shown in FIG. 2, or by the number "1" shown in FIGS. 1A through II.

FIG. 4A shows a perspective view, a side view and a top view of one storage unit 420 of the present disclosure. As is shown in FIG. 4A, the storage unit 420 includes a table 415, a plurality of auxiliary sensors (e.g., load sensors, or weight sensors) 440 provided on the table 415, within a vicinity of corners of the table 415, and a platform 425 resting on the auxiliary sensors 440. The platform 425 includes an RFID reader 460 (e.g., a printed circuit board assembly) in communication with an RFID antenna 462 embedded within an upper surface of the platform 425. Additionally, the auxiliary sensors 440 and the RFID antenna 462 may be in communication with the RFID reader 460 or any processors, transceivers or other components provided within the platform 425. The RFID reader 460 may be configured to receive load signals generated by the auxiliary sensors 440 in response to loading conditions on the platform 425, and to receive RFID signals captured by the RFID antenna 462 that are transmitted by one or more RFID transmitters within an RF field generated by one or more of the RFID antenna 462. The RFID reader 460 may be further configured to interpret the load signals and the RFID signals, to determine whether an interaction involving one or more items has occurred based on the interpreted signals, and to transmit one or more sets of data (e.g., data structures) regarding the contents of the platform 425, or whether any interactions involving such contents have occurred, to an external computer device or system (not shown). Alternatively, in some implementations, the RFID reader 460 and any associated components may be provided external to the platform 425, such as within a space between a lower surface of the platform 425 and an upper surface of the table 415, or in any other location.

As is shown in FIG. 4B, the storage unit 420 is initially in an unloaded state, such that a sum of live forces ΣF acting on the platform 425 as determined by load signals received from the auxiliary sensors 440 is equal to a weight of the platform 425, or WPLATFORM. With the storage unit 420 in the unloaded state, an actor 470 (e.g., an associate, a customer, a user or a worker) places an item 40 bearing an RFID transmitter 45 on the platform 425. The item 40 may include any type or form of product, such as meats, produce, beans or grains that may be sold in variable weights, and provided within a container of any shape, size or volume. The RFID transmitter 45 may be programmed with any relevant information or data regarding the item 40 (e.g., contents of the container), including but not limited to a type or a category of the item 40, mass or weight of the item 40, a unit price of the item 40, an expiration date of the item 40, a location of origin of the item 40, or any other information or data. In some implementations, the RFID transmitter 45 may be provided on or within a printed label that may be affixed to an outer surface of the item 40 and may further include any type or form of information or data printed thereon, including but not limited to alphanumeric characters, bar codes, or other markings.

As is further shown in FIG. 4B, with the item 40 on the platform 425, a sum of live forces ΣF acting on the platform 425, as determined by load signals received from the auxiliary sensors 440, is equal to a sum of the weight $w_{PLATFORM}$ of the platform 425 and a weight $W_{ITEM}$ of the item 40. In response to determining that loading on the platform 425 has changed, based on load signals received from the auxiliary sensors 440, the RFID antenna 462 may be energized and caused to emit an RF field from the platform 425, e.g., in a direction of an upper surface of the platform 425. With the RFID transmitter 45 within the RF field emitted by the RFID antenna 462, the RFID transmitter transmits an RFID signal including the information or data programmed thereon, and the RFID signal is received by the RFID antenna 462.

As is also shown in FIG. 4B, upon receiving the RFID signal from the RFID transmitter 45, and determining that the loading on the platform 425 has increased by the weight $W_{ITEM}$ of the item 40, the RFID reader 460 transmits information or data regarding an interaction with the storage unit 420, viz., the placement of the item 40 on the platform 425. The information or data may include, but need not be limited to, an identifier of a type of the item 40, which may be indicated by the RFID signal, as well as the weight $W_{ITEM}$ of the item 40, a time $t_1$ at which the item 40 was detected thereon and a location of the storage unit 420, or any other information or data regarding the interaction. For example, the time $t_1$ may be determined based on a time at which the increase in loading on the platform 425 by the weight $W_{ITEM}$ was detected, a time at which the RFID signal was first received, or on any other basis.

Moreover, in some implementations, the RFID reader 460 may further execute any number of computer-related functions to confirm that the increase in loading on the platform 425 by the weight $W_{ITEM}$ and the presence of the RFID signal are consistent with the same interaction prior to transmitting the information or data. For example, the RFID reader 460 may identify an item bearing an RFID transmitter from which the RFID signal was transmitted, viz., the item 40, and confirm that the item has a mass or a weight consistent with the increase in loading on the platform, viz., the weight $W_{ITEM}$. Upon confirming that the increase in loading on the platform 425 by the weight $W_{ITEM}$ is consistent with the receipt of the RFID signal, the RFID reader 460 may transmit the information or data regarding the interaction with the platform involving the item 40.

As is shown in FIG. 4C, the storage unit 420 is initially in a loaded state, with the item 40 thereon, such that a sum of live forces ΣF acting on the platform 425 as determined by load signals received from the auxiliary sensors 440 is equal to the weight $w_{PLATFORM}$ of the platform 425 and the weight $W_{ITEM}$ of the item 40. With the storage unit 420 in the loaded state, the actor 470 removes the item 40 from the platform 425.

As is further shown in FIG. 4C, with the item 40 removed from the platform 425, a sum of live forces ΣF acting on the platform 425, as determined by load signals received from the auxiliary sensors 440, drops to the weight $w_{PLATFORM}$ of the platform 425. In response to determining that loading on the platform 425 has changed, based on load signals received from the auxiliary sensors 440, the RFID antenna 462 may be energized and caused to emit an RF field from the platform 425, e.g., in a direction of an upper surface of the platform 425. When the RFID reader 460 does not receive the RFID signal following the emission of the RF field, the RFID reader 460 determines that the item 40 is no longer on the platform 425.

As is also shown in FIG. 4C, upon determining that the RFID signal was not received, and upon determining that the loading on the platform 425 has decreased to the weight $w_{PLATFORM}$ of the platform 425, e.g., by the weight $W_{ITEM}$ of the item 40, the RFID reader 460 transmits any type or form of information or data regarding an interaction with the storage unit 420, viz., the removal of the item 40 from the platform 425. For example, the information or data may include, but need not be limited to, the identifier of a type of the item 40, the weight $W_{ITEM}$ of the item 40, a time 12 at which the item 40 was detected thereon and the location of the storage unit 420, or any other information or data regarding the interaction. The time 12 may be determined in any manner and on any basis, such as a time at which the decrease in loading on the platform 425 by the weight $W_{ITEM}$ was detected, or a time at which the RFID signal was determined to not have been received, e.g., a time at which the RF field was emitted by the RFID antenna 462, or on any other basis.

Although the storage unit 420 is shown in FIG. 4B and FIG. 4C as having a single item 40 placed thereon and removed therefrom, the storage units of the present disclosure may be used to identify and track any number of interactions involving any number of items bearing RFID transmitters (or tags), in accordance with implementations of the present disclosure.

Referring to FIGS. 5A through 5E, views of aspects of one system for detecting interactions in accordance with implementations of the present disclosure are shown. Except where otherwise noted, reference numerals preceded by the number "5" shown in FIGS. 5A through 5E indicate components or features that are similar to components or features having reference numerals preceded by the number "4" shown in FIGS. 4A through 4C, by the number "2" shown in FIG. 2, or by the number "1" shown in FIGS. 1A through 1I.

Figure 5A:
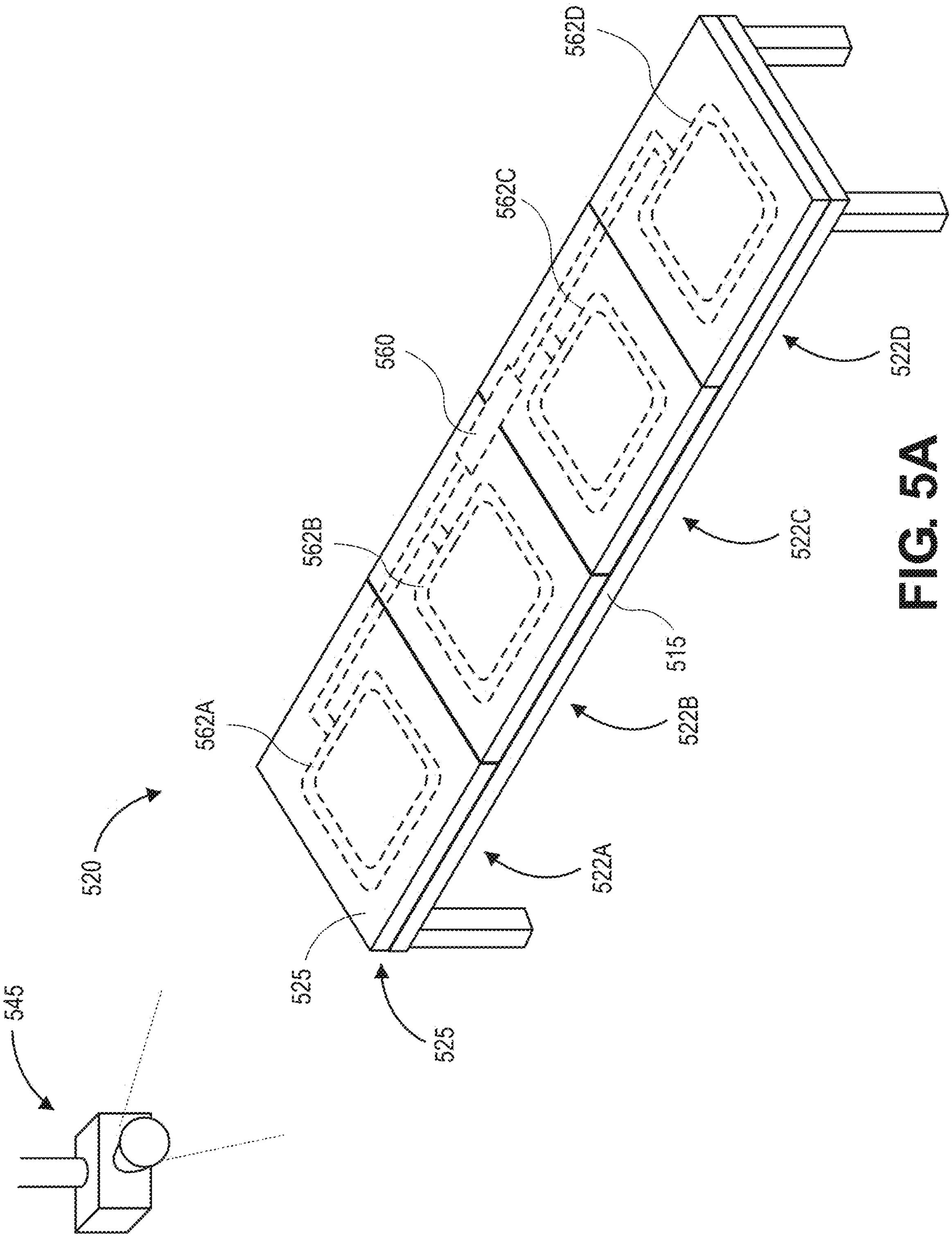
FIGS. 5A through 5E are views of aspects of one system for detecting interactions in accordance with implementations of the present disclosure.

As is shown in FIG. 5A, a storage unit 520 includes a platform 525 provided on a table 515 or other system, and a camera 545 (or other auxiliary sensor) that includes at least a portion of the platform 525 within a field of view. The platform 525 includes a plurality of locations or regions 522A, 522B, 522C, 522D thereon, and plurality of RFID antennas 562A, 562B, 562C, 562D embedded therein. Each of the RFID antennas 562A, 562B, 562C, 562D may be associated with one of the locations or regions 522A, 522B, 522C, 522D, which may but need not be demarcated with one or more visible lines, markings or other designations.

The platform 525 further includes an RFID reader 560 in communication with each of the RFID antennas 562A, 562B, 562C, 562D, along with one or more processors, transceivers or other components (not shown).

Figure 5B:
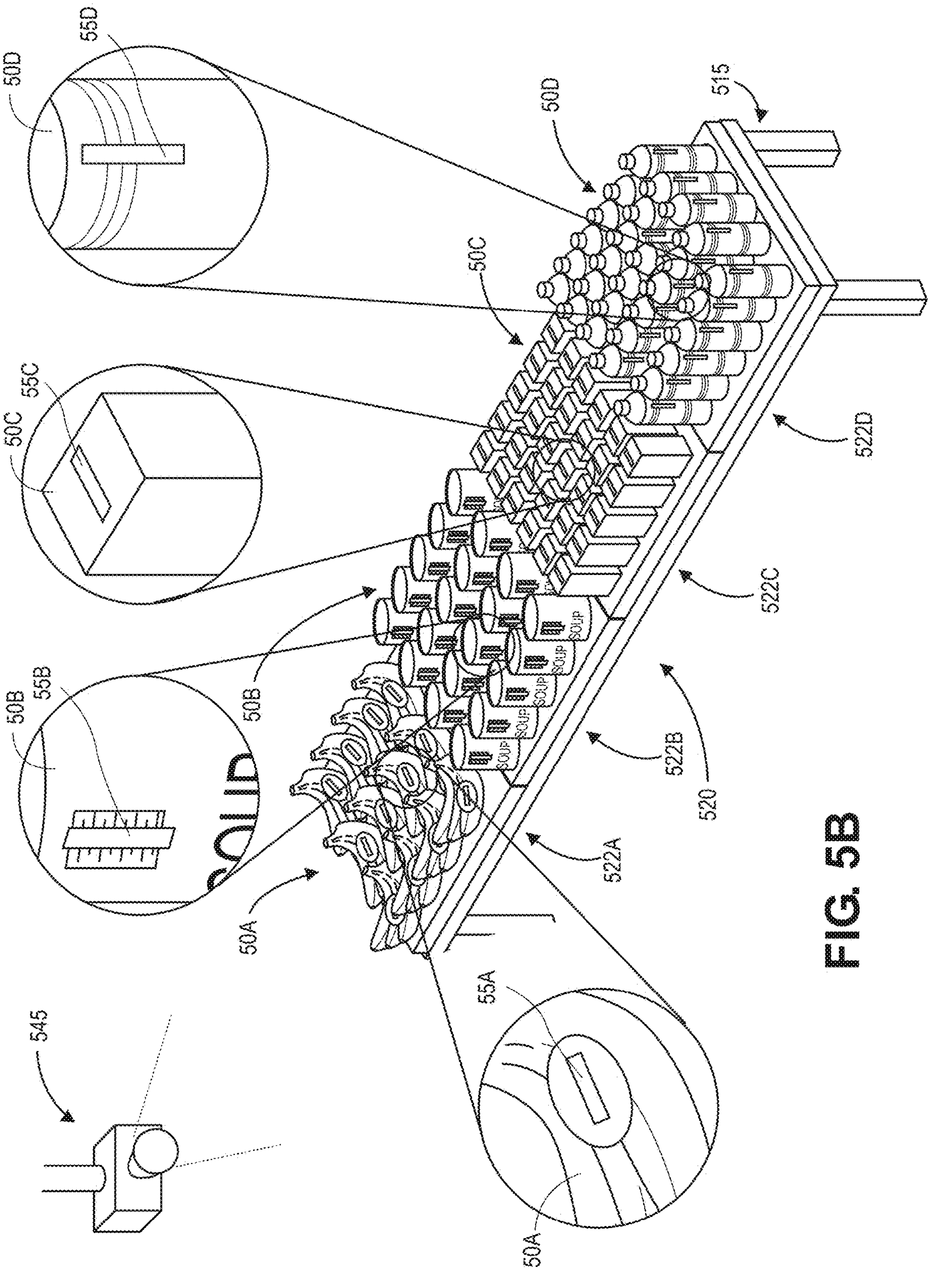

As is shown in FIG. 5B, each of the locations or regions 522A, 522B, 522C, 522D has a set of items 50A, 50B, 50C, 50D of unique kinds or types (viz., produce, canned goods, boxed goods, bottled goods) provided thereon. As is also shown in FIG. 5B, each of the items in the sets 50A, 50B, 50C, 50D bears an RFID transmitter 55A, 55B, 55C, 55D thereon. The RFID transmitters 55A, 55B, 55C, 55D may have information or data regarding the respective items of the sets 50A, 50B, 50C, 50D programmed or stored thereon, and the RFID reader 560 may be configured to receive and interpret RFID signals including the information or data when the items of the sets 50A, 50B, 50C, 50D are located within an RF field.

Figure 5C:
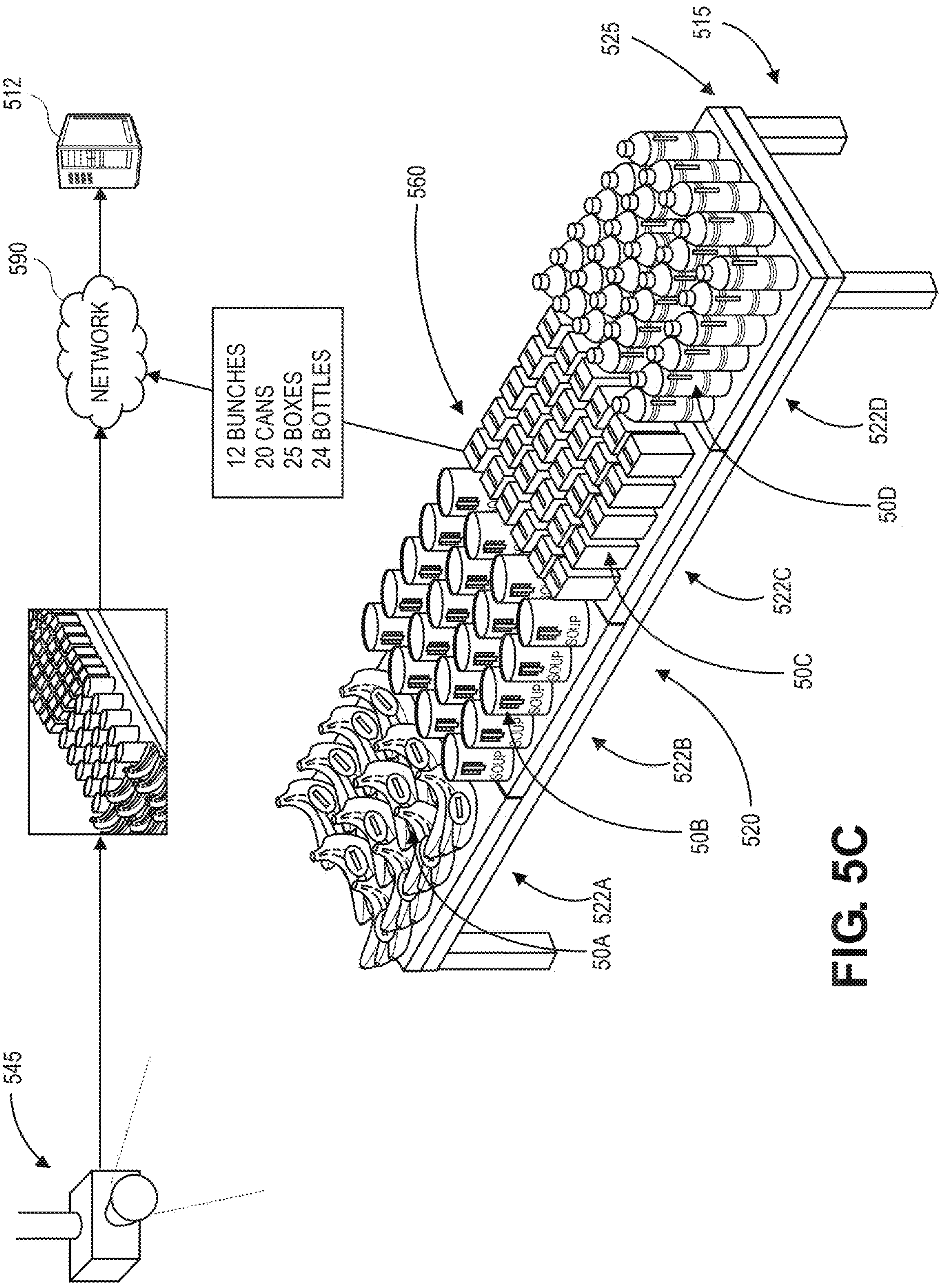

As is shown in FIG. 5C, the RFID reader 560 within the platform 525 receives RFID signals captured by the respective RFID antennas 562A, 562B, 562C, 562D, and interprets the RFID signals to determine information or data regarding the items of the respective sets 50A, 50B, 50C, 50D located in the respective locations or regions 522A, 522B, 522C, 522D. For example, as is shown in FIG. 5C, the platform 525 transmits one or more messages or other information or data to a server 512 over a network 590 reporting that twelve RFID signals are received from the items of the set 50A by the RFID antenna 562A. Likewise, the platform 525 transmits one or more messages or other information or data to the server 512 reporting that twenty RFID signals are received from the items of the set 50B by the RFID antenna 562B, that twenty-five RFID signals are received from the items of the set 50C by the RFID antenna 562C, and that twenty-four RFID signals are received from items of the set 50D by the RFID antenna 562D. Additionally, the camera 545 may capture one or more images of the storage unit 520, and transmit the one or more images to the server 512 over the network 590.

The server 512 may store or update one or more records identifying a status of the inventory on the storage unit 520, or the respective locations or regions 522A, 522B, 522C, 522D, as determined based on the RFID signals received from the items of the sets 50A, 50B, 50C, 50D, or the images captured by the camera 545, or in any other manner.

Figure 5D:
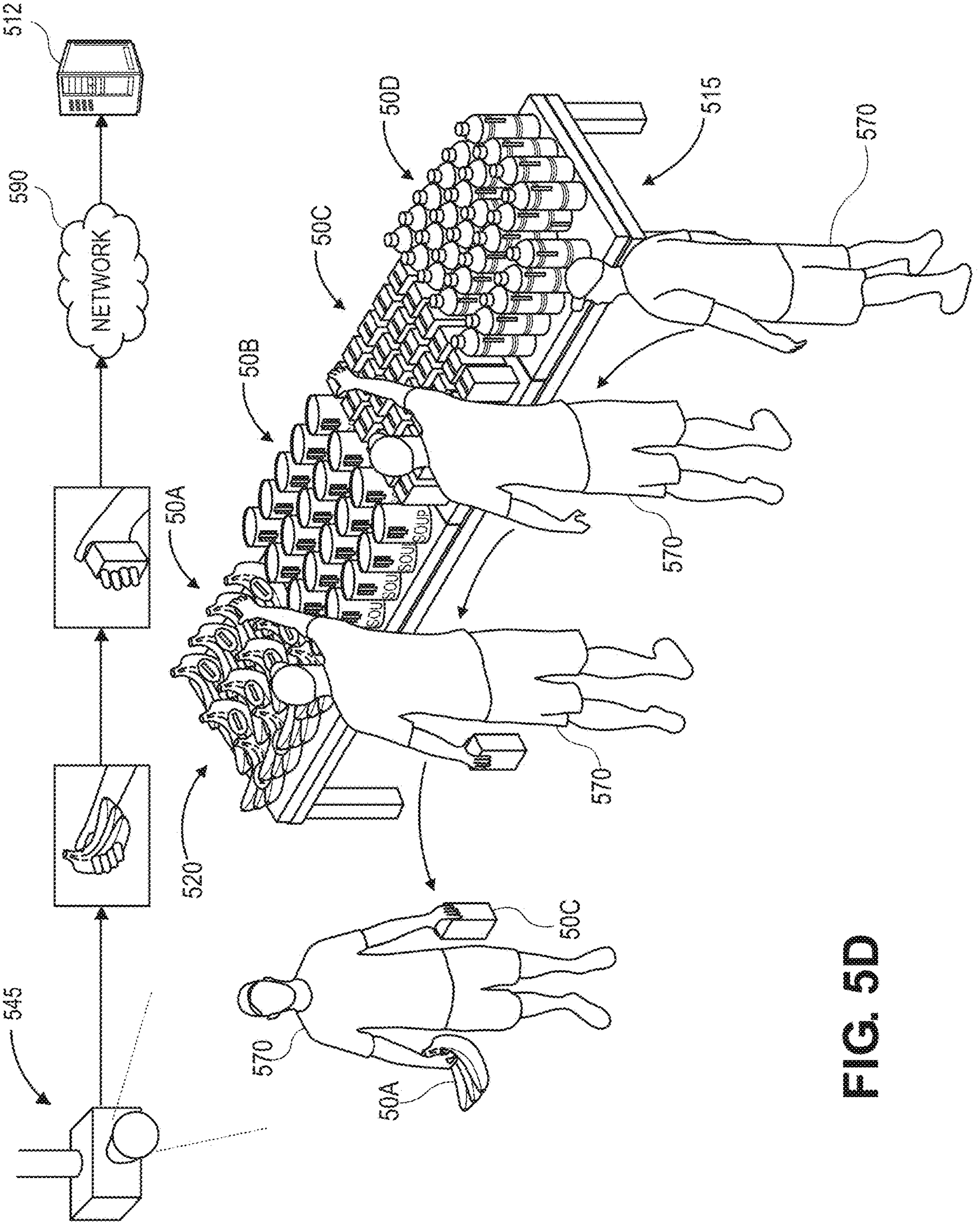

As is shown in FIG. 5D, an actor 570 (e.g., an associate, a customer, a user or a worker) executes interactions with the storage unit 520, e.g., by taking one of the items of the set 50A from the location or region 522A and one of the items of the set 50C from the location or region 522C. The camera 545 captures images of the actor 570, and transmits such images to the server 512 over the network 590. In some implementations, the images may be processed by one or more processor units operating on the camera 545, or by the server 512, to determine that the actor 570 has executed one or more poses, gestures or other actions with the storage unit 520.

Figure 5E:
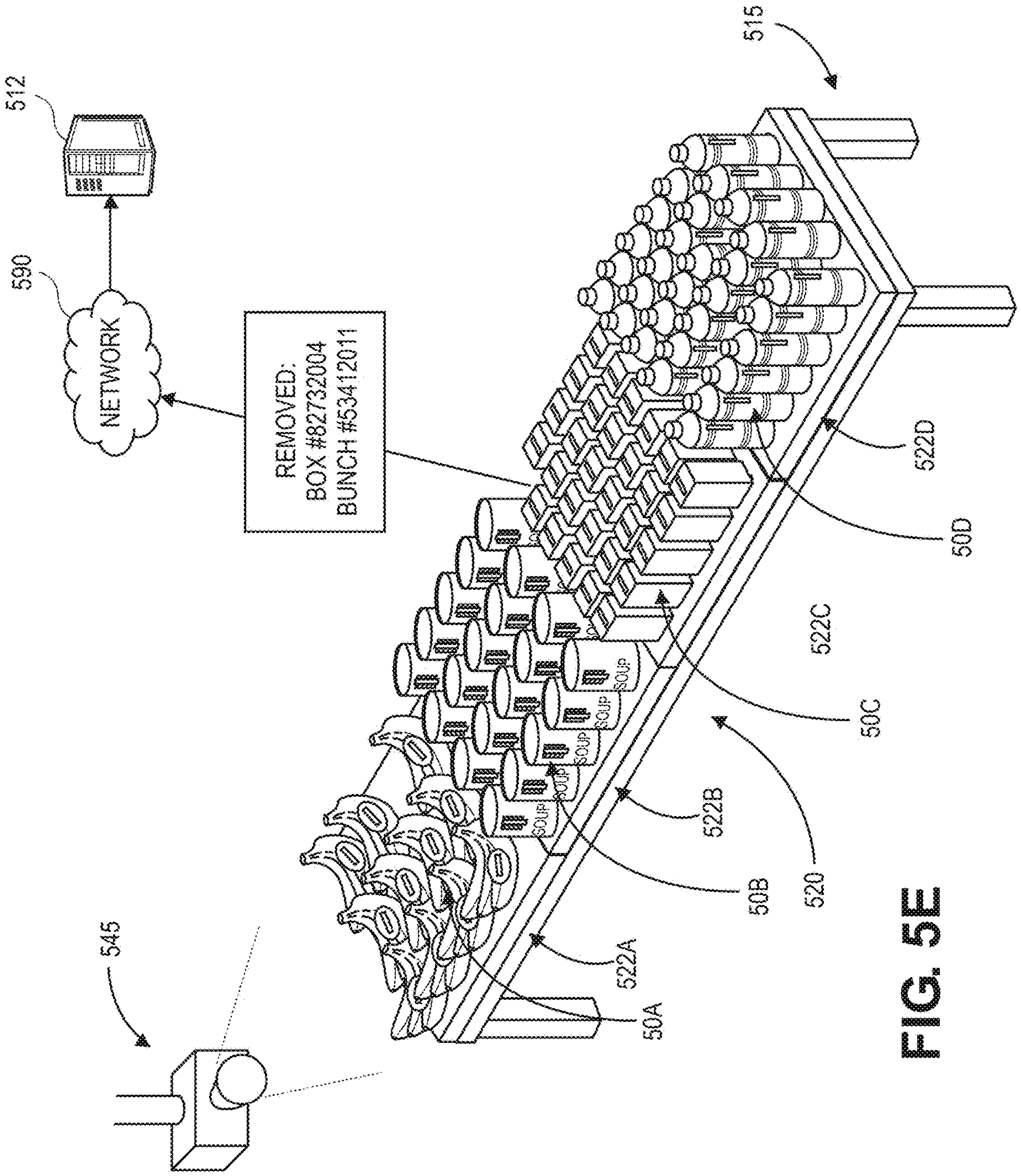

In accordance with implementations of the present disclosure, the interactions by the actor 570 with the storage unit 520 may be identified and tracked based on RFID signals received by the RFID antennas 562A, 562C associated with the respective locations or regions 522A, 522C. As is shown in FIG. 5E, the platform 522A transmits one or more messages or other information or data to the server 512 identifying one of the items that has been removed from the set 50C on the location or region 522C (viz., box no. 82732004), and another of the items that has been removed from the set 50A on the location or region 522A (viz., bunch no. 53412011), based on the absence of RFID signals that are no longer received from such items. Alternatively, or additionally, the removal of the items from the sets 50A, 50C may be confirmed based on images captured using the camera 545, or based on information or data determined by any other auxiliary sensors, e.g., differences in weight determined by load sensors, in accordance with implementations of the present disclosure.

The server 512 may store or update one or more records identifying a status of the inventory on the storage unit 520, or on the respective locations or regions 522A, 522B, 522C, 522D, based on the messages or information or data received from the platform 525.

Moreover, the removals of one of the items of the set 50A and the one of the items of the set 50C as shown in FIG. 5D may be confirmed based on both the RFID signals received by the respective RFID antennas 562A, 562C, and by any images captured by the camera 545, or based on any other auxiliary signals generated by other auxiliary sensors (not shown). For example, where an RFID signal that was known to have been transmitted by an item of the set 50A on the location or region 522A, as is shown in FIG. 5C, but is no longer received by the RFID antenna 562A, and the actor 570 is detected executing one or more gestures with the location or region 522A of the storage unit 520, an interaction with the platform 522A involving a removal of an item of the set 50A may be confirmed accordingly, i.e., as not a "false positive." Likewise, where an RFID signal that was known to have been transmitted by an item of the set 50C on the platform 50C, as is shown in FIG. 5C, but is no longer received by the RFID antenna 562C, as is shown in FIG. 5E, and the actor 570 is detected executing one or more gestures with the location or region 522C of the storage unit 520, an interaction with the platform 522C involving a removal of an item of the set 50C may be confirmed accordingly.

Furthermore, where an identity or an identifier of the actor 570 is known, the removals of the items of the sets 50A, 50C from the locations or regions 552A, 552C of the storage unit 520 as shown in FIG. 5D may be associated with the actor 570.

Storage units of the present disclosure may be provided in any alignment or orientation, and in any environment, including but not limited to a horizontal alignment or orientation, such as is shown in FIGS. 5A through 5E, and also a vertical alignment or orientation, or any other alignment or orientation. Moreover, the strengths or intensities of RF fields emitted by a platform in general, or a single RFID antenna in particular, may be selected to increase a probability (or likelihood) that the RF fields are sensed only by RFID transmitters associated with items that are located on a particular platform, or located within a vicinity of a particular RFID antenna.

Figure 6A:
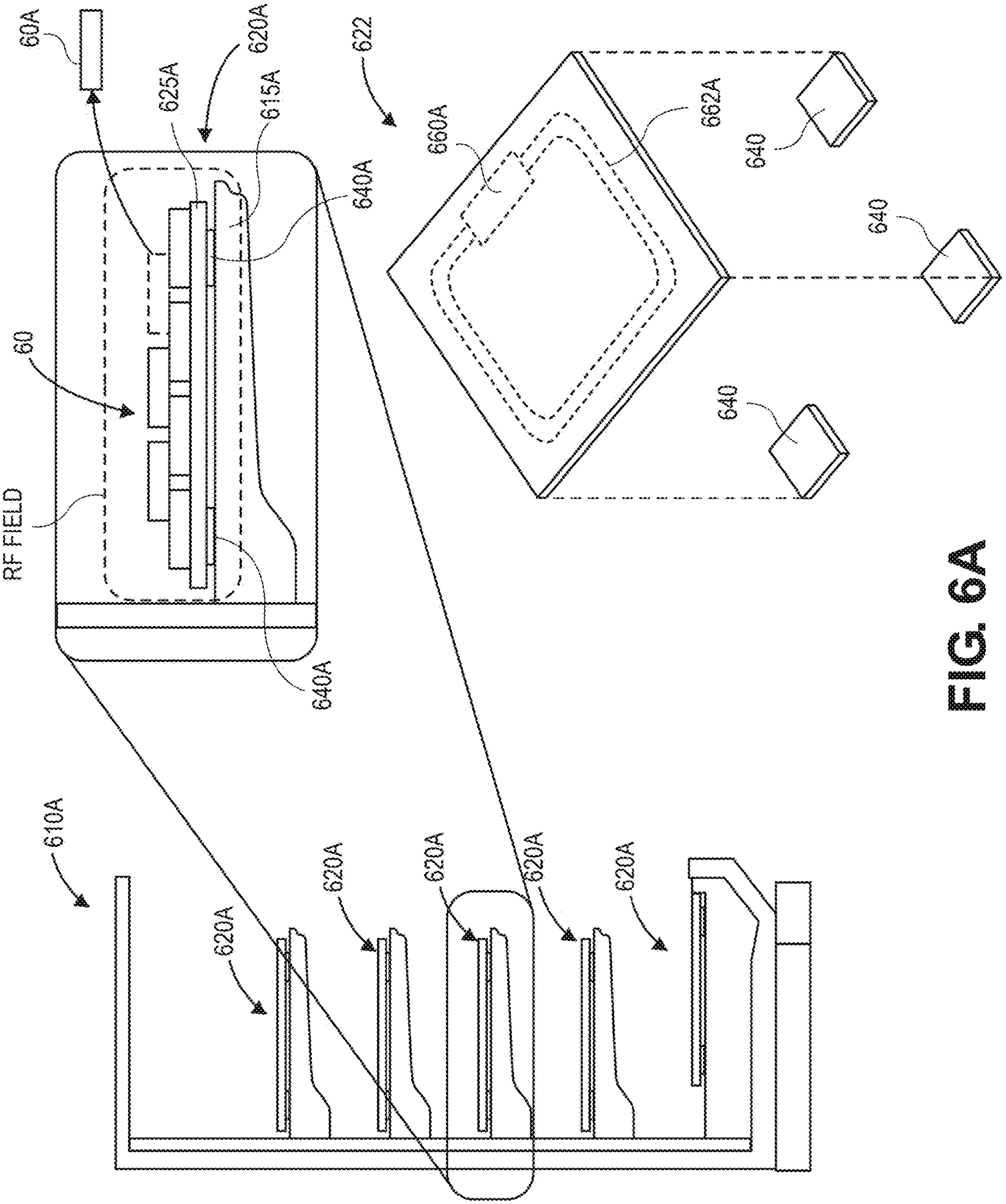
FIGS. 6A and 6B are views of aspects of systems for detecting interactions in accordance with implementations of the present disclosure.
Figure 6B:
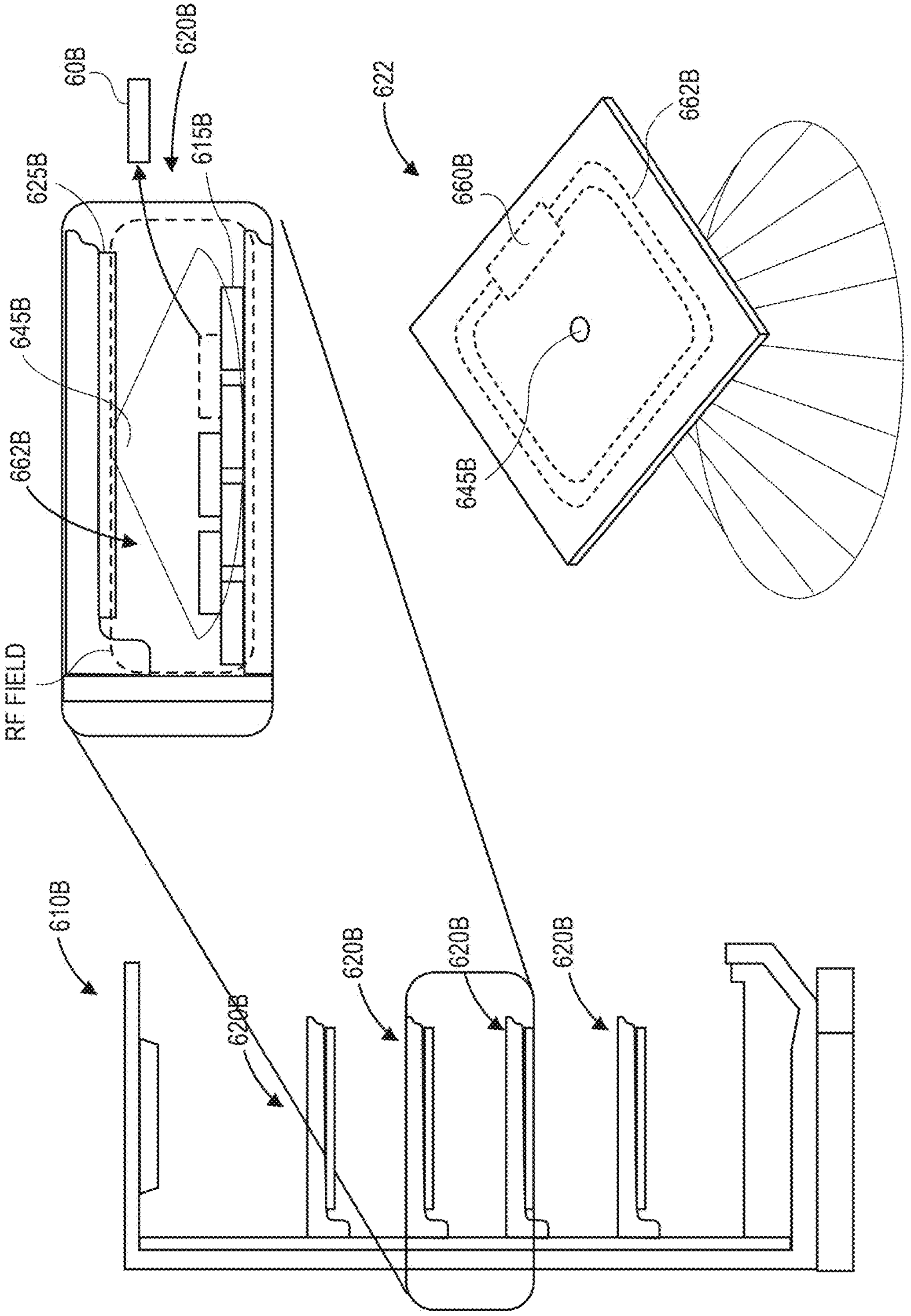

Referring to FIGS. 6A and 6B, views of aspects of systems for detecting interactions in accordance with implementations of the present disclosure are shown. Except where otherwise noted, reference numerals preceded by the number "6" shown in FIG. 6A or FIG. 6B indicate components or features that are similar to components or features having reference numerals preceded by the number "5" shown in FIGS. 5A through 5E, by the number "4" shown in FIGS. 4A through 4C, by the number "2" shown in FIG. 2, or by the number "1" shown in FIGS. 1A through 1I.

As is shown in FIG. 6A, a rack 610A (e.g., a refrigerator case or like system) includes a plurality of storage units 620A aligned substantially vertically within the rack 610A.

Each of the storage units 620A includes a shelf 615A that is mounted to the rack 610A in a cantilevered manner and extends outward therefrom, or another portion of the rack 610A, as well as a platform 625A provided on a plurality of load sensors 640A resting on the shelf 615A or other portion of the rack 610A. The platform 625A further includes an RFID reader 660A embedded within the platform 625A, and an RFID antenna 662A distributed within the platform 625A. The plurality of load sensors 640A beneath the platform 625A may be located within a vicinity of each of the corners of the platform 625A.

As is also shown in FIG. 6A, a strength or an intensity of an RF field emitted by the RFID antennas 662A of each of the platforms 625A may be selected to increase a probability that the RF field is sensed by RF transmitters of each of a plurality of items 60A on the respective platforms 625A. Likewise, a strength or an intensity of an RF field emitted by the RFID antennas 662A of each of the platforms 625A may also be selected to increase a probability that the RF field is not sensed by items 60A that are removed from the respective platforms 625A, or are moved a sufficient distance from such platforms 625A.

As is shown in FIG. 6B, a rack 610B (e.g., a refrigerator case or like system) includes a plurality of storage units 620B aligned substantially vertically within the rack 610B.

Each of the storage units 620B includes a shelf 615B that is mounted to the rack 610B in a cantilevered manner and extends outward therefrom, or another portion of the rack 610B, as well as a platform 625B suspended above the shelf 615B or other portion of the rack 610B. The platform 625B includes an RFID reader 660B embedded within the platform 660B, and an RFID antenna 662B distributed within the platform 625B. The platform 625B further includes a proximity sensor 645B that is configured to emit energy (e.g., acoustic energy, light energy, infrared energy, or the like) below the platform 625B, and to detect the presence of one or more objects, or motion of such objects, based on changes in reflections of the energy. Alternatively, the proximity sensor 645B may operate in any other manner, or may be any other type or form of sensor, e.g., cameras, motion sensors, time-of-flight sensors, or others.

As is also shown in FIG. 6B, a strength or an intensity of an RF field emitted by the RFID antennas 662B of each of the platforms 625B may be selected to increase a probability that the RF field is sensed by RF transmitters of each of a plurality of items 60B on the respective platforms 625B. Likewise, a strength or an intensity of an RF field emitted by the RFID antennas 662B of each of the platforms 625B may also be selected to increase a probability that the RF field is not sensed by items 60 that are removed from the respective platforms 625B, or are moved a sufficient distance from such platforms 625B.

Figure 7A:
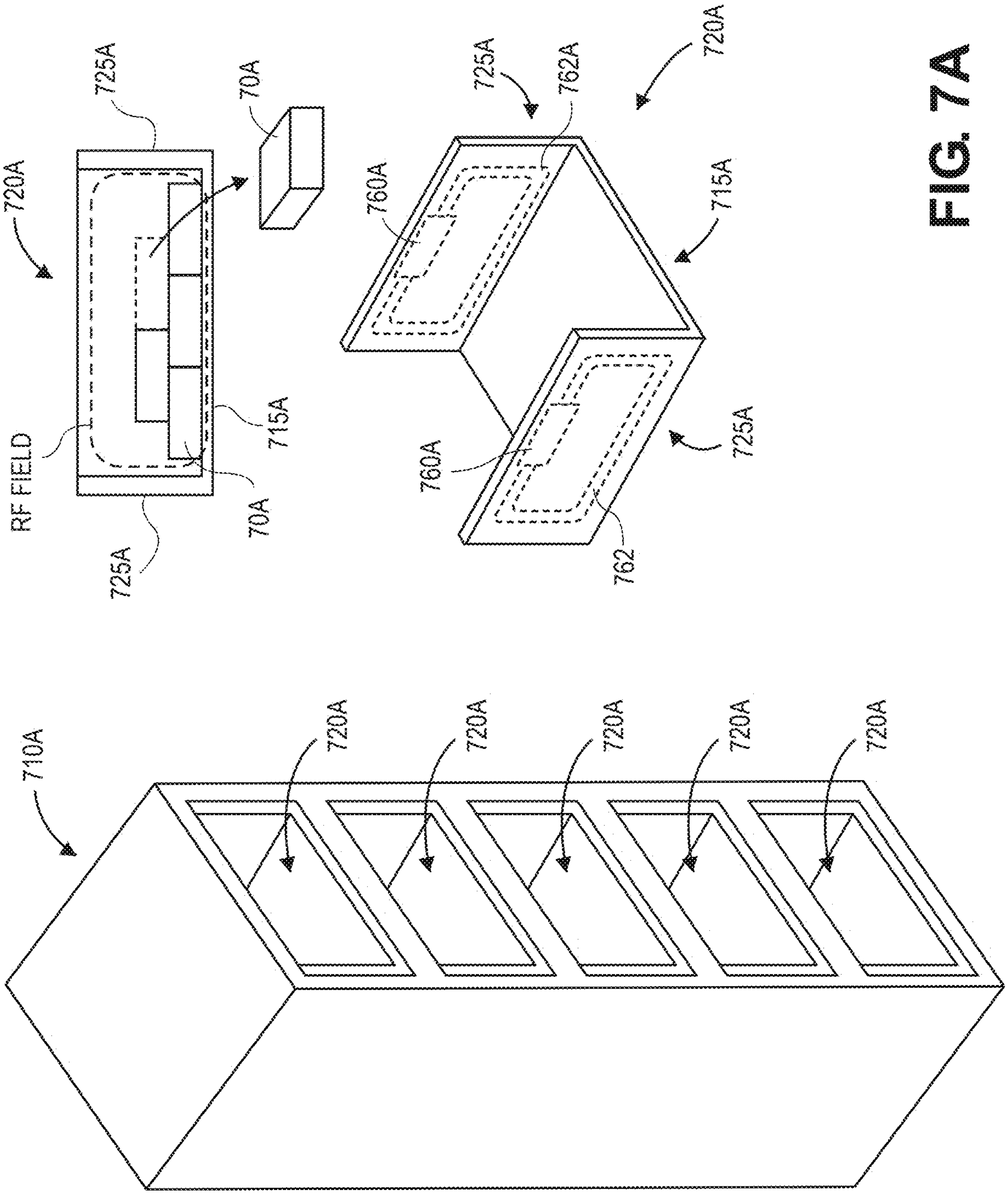
FIGS. 7A and 7B are views of aspects of systems for detecting interactions in accordance with implementations of the present disclosure.
Figure 7B:
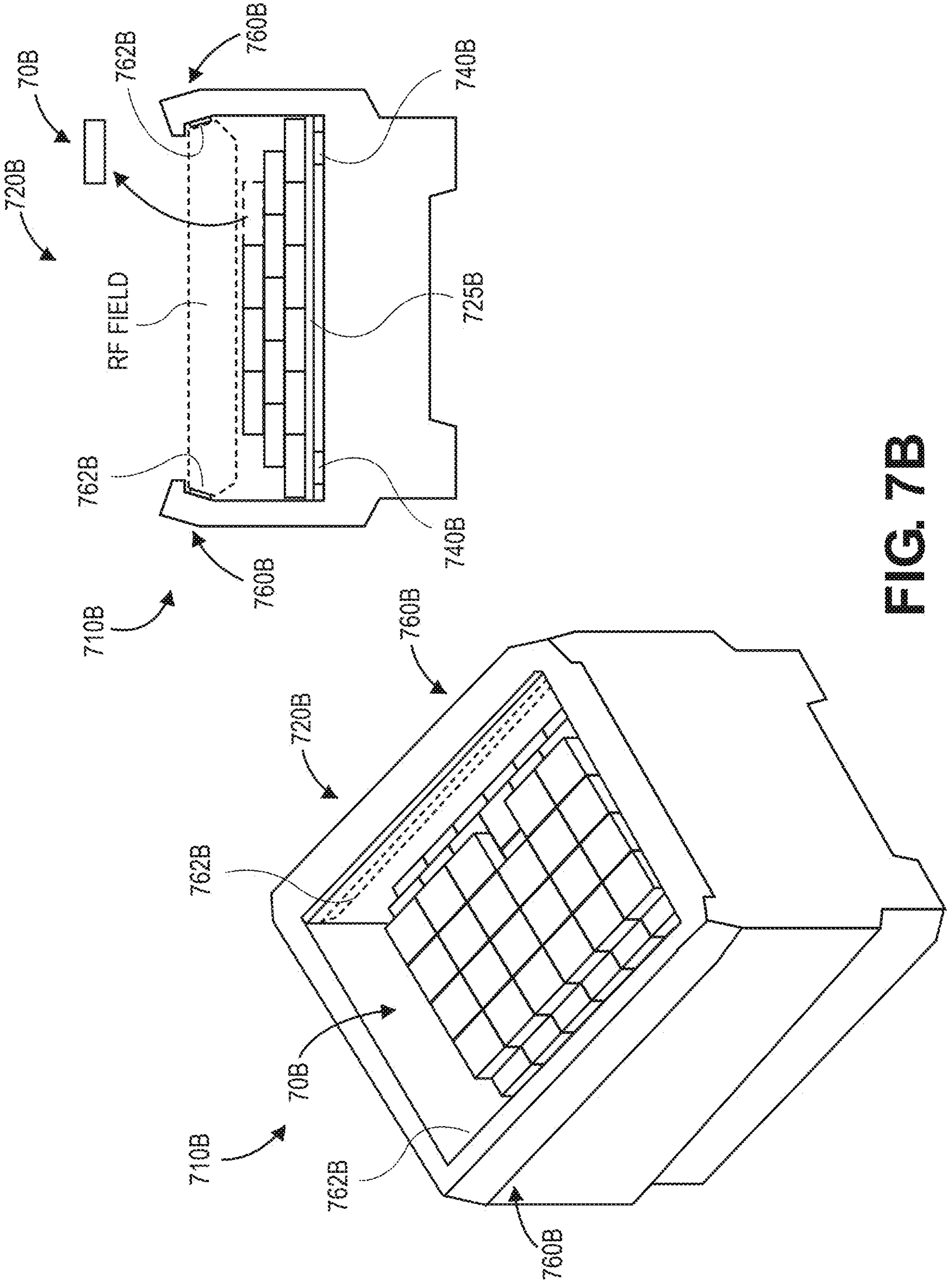

Referring to FIGS. 7A and 7B, views of aspects of one system for detecting interactions in accordance with implementations of the present disclosure are shown. Except where otherwise noted, reference numerals preceded by the number "7" shown in FIG. 7A or FIG. 7B indicate components or features that are similar to components or features having reference numerals preceded by the number "6" shown in FIG. 6A or FIG. 6B, by the number "5" shown in FIGS. 5A through 5E, by the number "4" shown in FIGS. 4A through 4C, by the number "2" shown in FIG. 2, or by the number "1" shown in FIGS. 1A through 1I.

As is shown in FIG. 7A, a rack 710A or like system includes a plurality of storage units 720A aligned substantially vertically within the rack 710A.

Each of the storage units 720A includes a shelf or other loading surface 715A within an opening of the rack 710A, as well as a pair of platforms 725A provided on either side of the opening. The platforms 725A further include RFID readers 760A embedded within the platforms 725A, and RFID antennas 762A distributed within the platforms 725A. The shelf 715A may further include any number of auxiliary sensors (not shown), including but not limited to load sensors, cameras, proximity sensors, motion sensors, time-of-flight sensors, or others.

As is also shown in FIG. 7A, strengths or intensities of RF fields emitted by the RFID antennas 762A of each of the platforms 725A may be selected to increase a probability that the RF field is sensed by RF transmitters of each of a plurality of items 70A on the shelves 715A between the platforms 725A. Likewise, strengths or intensities of RF fields emitted by the RFID antennas 762A of each of the platforms 725A may be selected to increase a probability that the RF field is not sensed by items 70A that are removed from the shelves 715A, and are no longer between the platforms 725A.

As is shown in FIG. 7B, a cooler 710B or like system includes a storage unit 720B and a plurality of items 70B provided therein. The storage unit 720B includes a pair of RFID readers 760B aligned along a longitudinal axis of the storage unit 720B, on either side of the cooler 710B, and each of the sides of the cooler 710B includes one or more RFID antennas 762B in communication with one of the RFID readers 760B that are embedded within or aligned along such sides. The cooler 710B may further include any number of compressors, condensers, evaporators, thermostats or any other systems for maintaining an interior space of the cooler 710B at a desired temperature, or within a desired range of temperatures.

As is also shown in FIG. 7B, the storage unit 720B within the cooler 710B includes a platform 725B resting on a plurality of auxiliary sensors 740B (viz., load sensors). The cooler 710B may be configured or designated to receive any number of items 70B bearing RFID transmitters, of any type or kind, including but not limited to foods or other items that are preferably maintained at temperatures that are below freezing or otherwise lower than ambient temperatures in a facility where the cooler 710B is provided. Alternatively, a system for maintaining items such as foods at elevated temperatures, e.g., a warmer, may be constructed or configured in a manner similar to the cooler 710B, and may include the platform 725B, the auxiliary sensors 740B, the RFID readers 760B, the RFID antennas 762B or any other auxiliary sensors or other systems, as well as any heating or warming elements that are powered by any source.

As is further shown in FIG. 7B, when one of the items 70B is removed from the storage unit 720B, the one of the items 70B is within an RF field that is generated by the RFID antennas 762B and substantially covers an opening of the storage unit 720B, at an open end of the cooler 710B. An RFID transmitter provided on the one of the items 70B transmits an RFID signal that includes information or data regarding the one of the items 70B, viz., an identifier, a type, a weight (or mass) of the one of the items 70B, and the RFID signal may be captured by either or both of the RFID readers 760B. Subsequently, or concurrently, the RFID readers 760B may transmit information or data regarding the one of the items 70B, e.g., contents of the RFID signal received from the one of the items 70B, to a server or other computer system over a network. The emission of the RF field by the RFID antennas 762B may be triggered in any manner and on any basis. For example, the RFID antennas 762B may be configured to emit the RF field continuously, or at any regular or randomly scheduled time, or upon the occurrence of one or more events, as detected based on information or data captured by one or more auxiliary sensors, e.g., the auxiliary sensors 740B, or any others (not shown).

Figure 8B:
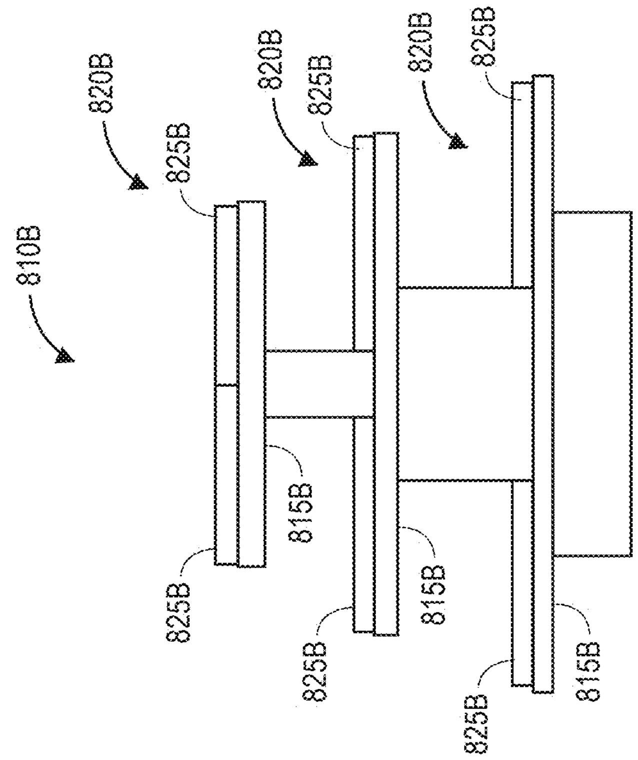
FIGS. 8A and 8B are views of aspects of systems for detecting interactions in accordance with implementations of the present disclosure.
Figure 8A:
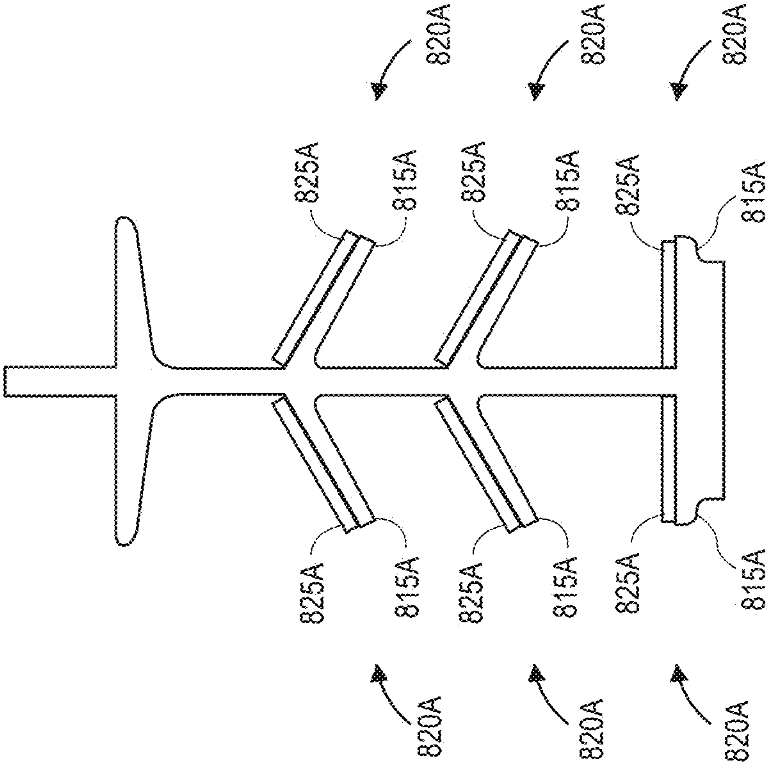

The storage units of the present disclosure may be outfitted with any number of platforms having any number of RFID antennas and/or auxiliary sensors associated with such platforms. The platforms may be aligned any locations, angles or orientations with respect to one another, or with respect to the RFID antennas or auxiliary sensors, or other aspects of the storage units. Referring to FIGS. 8A and 8B, views of aspects of systems for detecting interactions in accordance with implementations of the present disclosure are shown. Except where otherwise noted, reference numerals preceded by the number "8" shown in FIG. 8A or FIG. 8B indicate components or features that are similar to components or features having reference numerals preceded by the number "7" shown in FIG. 7A or FIG. 7B, by the number "6" shown in FIG. 6A or FIG. 6B, by the number "5" shown in FIGS. 5A through 5E, by the number "4" shown in FIGS. 4A through 4C, by the number "2" shown in FIG. 2, or by the number "1" shown in FIGS. 1A through 1I.

As is shown in FIG. 8A, a gondola 810A (or rack, table, or other system) includes a plurality of storage units 820A aligned at various angles with respect to the gondola 810A. For example, as is shown in FIG. 8A, the gondola 810A includes two pairs of shelves 815A that extend outward from a central stanchion, column or other support at common heights, and are angled downward with respect to horizontal, and one pair of shelves 815A that extend outward from a bottom of the central stanchion, column or other support at a common height, and are aligned horizontally. Each of the shelves 815A includes a platform 825A thereon. The platforms 825A may each include one or more RFID readers, RFID antennas, auxiliary sensors or other components (e.g., processors, transceivers, power supplies, or others) either within such platforms 825A, or external to such platforms 825A. Each of the storage units 820A may be configured or designated to receive any number of items bearing RFID transmitters, of any type or kind.

As is shown in FIG. 8B, a multi-tiered table 810B (or rack, or other system) includes a plurality of storage units 820B aligned in parallel and at various levels. For example, as is shown in FIG. 8B, the multi-tiered table 810B includes three pairs of shelves 815B that extend radially outward from a center of the multi-tiered table 810B at common heights, and are aligned horizontally. Each of the shelves 815B includes a platform 825B thereon. The platforms 825B may each include one or more RFID readers, RFID antennas, auxiliary sensors or other components (e.g., processors, transceivers, power supplies, or others) either within such platforms 825B, or external to such platforms 825B. Each of the storage units 820B may be configured or designated to receive any number of items bearing RFID transmitters, of any type or kind.

In some implementations, the storage units of the present disclosure may be configured to detect interactions with the storage units based on RFID signals that are generated when an item bearing an RFID transmitter passes through an RF field. For example, the storage units may be equipped with RFID antennas that are aligned along or near edges of platforms or other assemblies, and configured to emit RF fields in spaces through which items may pass when being removed from the platforms or placed onto the platforms. When an RFID signal is received from an RFID transmitter associated with an item passing through an RF field generated at or near an edge of a platform, the item may be identified based on the RFID signal, and compared to a record of items that are known to be located on the platform. If the item was not included in the record prior to receiving the RFID signal, the item may be presumed to have been placed on the platform after passing through the RF field, and an identifier of the item may be added to the record. Conversely, if the item was included in the record prior to receiving the RFID signal, the item may be presumed to have been removed from the platform prior to passing through the RF field, and an identifier of the item may be removed from the record.

Figure 9:
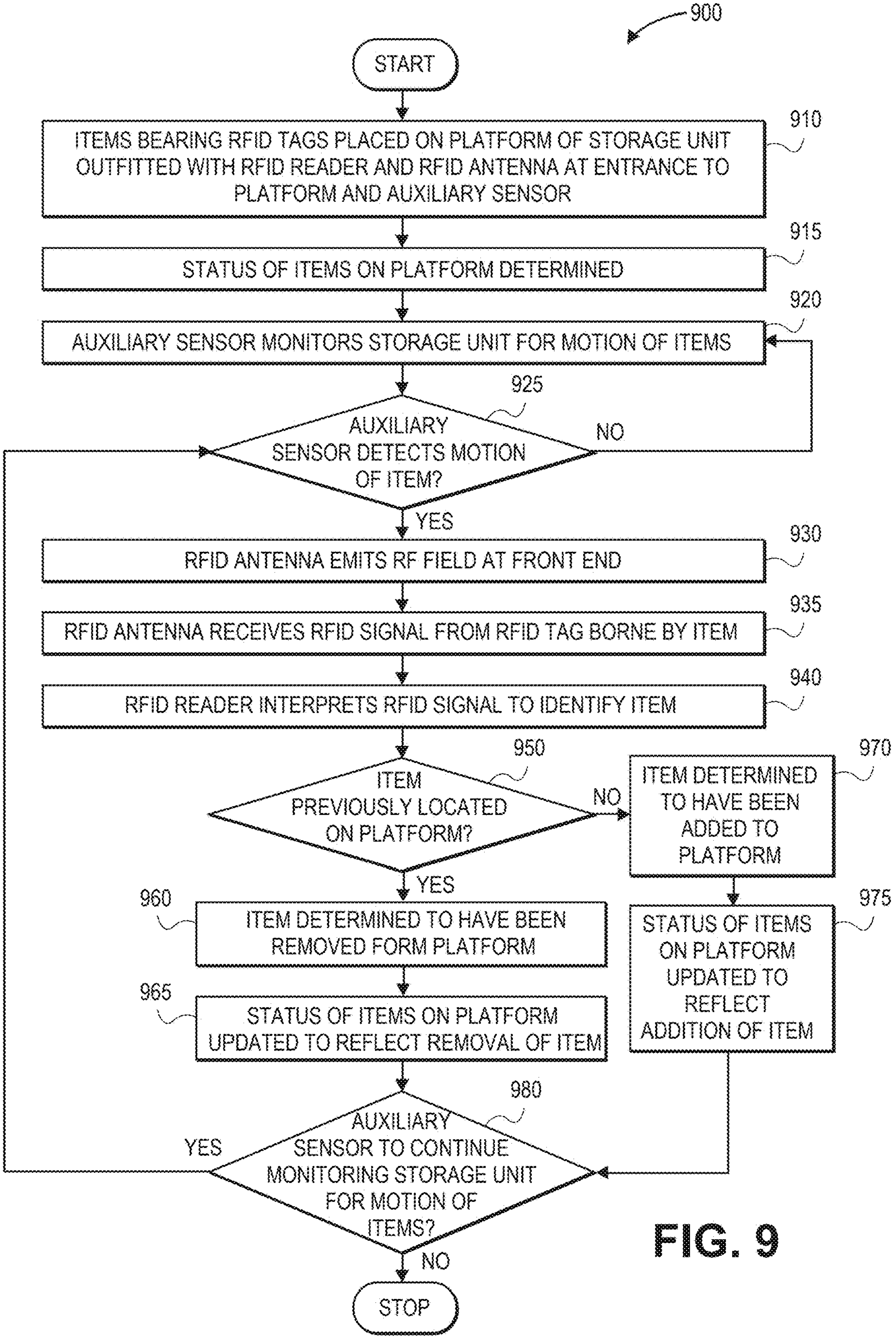
FIG. 9 is a flow chart of one process for detecting interactions in accordance with implementations of the present disclosure.

Referring to FIG. 9, a flow chart 900 of one process for detecting interactions in accordance with implementations of the present disclosure is shown. At box 910, a plurality of items bearing RFID tags (or RFID transmitters) are placed on a storage unit outfitted with an RFID reader and an RFID antenna provided at a front end of (or another entrance to or access point of) the platform, along with an auxiliary sensor, such as is shown in FIGS. 8A and 8B. The auxiliary sensor may be a load sensor, a camera, or any other sensor configured to capture information or data regarding items on the platform, or to detect motion or other activity of any kind relating to such items.

At box 915, a status of the items on the platform is determined. For example, the status may be determined based on a set of auxiliary signals received, captured or otherwise generated by the auxiliary sensor, e.g., load signals, images or other information or data, or based on any number of RFID signals transmitted by RFID transmitters associated with items that are within one or more RF fields on the platform. At box 920, the auxiliary sensor monitors the storage unit for motion of one or more items, e.g., the removal of items from the platform or the addition of items to the platform. For example, where the auxiliary sensor includes one or more load sensors, the auxiliary sensor may monitor a force on the platform, and determine whether the force has changed, e.g., increased or decreased, by the removal or addition of items to the platform. Where the auxiliary sensor includes one or more cameras, motion of the items may be detected based on imaging data captured by the cameras, or by changes in the imaging data.

At box 925, whether the auxiliary sensor has detected motion of one or more of the items is determined. If the auxiliary sensor has not detected motion of one or more of the items, then the process returns to box 920, where the auxiliary sensor continues to monitor the storage unit for motion of one or more items.

If the auxiliary sensor has detected motion of one or more of the items, however, then the process advances to box 930, where the RFID antenna emits an RF field at the front end of the platform. The emission of the RF field by the RFID antenna may be triggered by a change in loading on the storage unit, as determined by one or more of the load sensors, or on any other basis. Alternatively, or additionally, the RFID antenna may be programmed or configured to emit the RF field at regular intervals or times, or at random intervals or times, or at any other intervals or times. Moreover, a strength or an intensity of an RF field emitted by the RFID antenna may be selected to increase a probability that the RF field is sensed by the RFID tags provided on the items near the front end of the platform, and not by any other RFID tags in any other location.

At box 935, the RFID antenna receives an RFID signal from an RFID tag associated with an item within a vicinity of the front end of the platform, e.g., passing over or near the front end of the platform. The RFID signal may include information or data programmed into a chip or other memory component provided on the RFID tag that identifies the item, or a type of the item, as well as any attribute of the item, e.g., a weight of the item. At box 940, the RFID reader interprets the RFID signal to identify the item.

At box 950, whether the item was previously located on the platform is determined based on the status of the items determined at box 920. If the item was previously located on the platform, then the process advances to box 960, where the item is determined to have been removed from the platform. For example, where the item is listed in a record of the items on the storage unit, e.g., generated based on the status determined at box 920, then the receipt of the RFID signal by the RFID antenna at the front end of the platform implies that the item passed through the RF field, e.g., from back to front, or from a location on the platform to a location outside of the storage unit. At box 965, the status of the items on the platform is updated to reflect the removal of the item from the platform.

If the item was not previously located on the platform, however, then the process advances to box 970, where the item is determined to have been added to the platform. For example, where the item is not listed in a record of the items on the storage unit, e.g., generated based on the status determined at box 920, then the receipt of the RFID signal by the RFID antenna at the front end of the platform implies that the item passed through the RF field, e.g., from front to back, or from a location outside of the storage unit to a location on the platform. At box 975, the status of the items on the platform is updated to reflect the addition of the item to the platform.

After the status of the items on the platform has been updated, either to reflect the removal of the item at box 965, or the addition of the item to the platform 975, then the process advances to box 980, where whether the auxiliary sensor is to continue monitoring the storage unit for the motion of items is determined. If the continued monitoring of the storage unit by the auxiliary sensor is desired, then the process returns to box 925, where whether the auxiliary sensor has detected motion of any of the items is determined. If the continued monitoring of the storage unit by the auxiliary sensor is no longer desired, then the process ends.

Referring to FIGS. 10A through 10D, views of aspects of systems for detecting interactions in accordance with implementations of the present disclosure are shown. Except where otherwise noted, reference numerals preceded by the number "10" shown in FIG. 10A through FIG. 10D indicate components or features that are similar to components or features having reference numerals preceded by the number "8" shown in FIG. 8A or FIG. 8B, by the number "7" shown in FIG. 7A or FIG. 7B, by the number "6" shown in FIG. 6A or FIG. 6B, by the number "5" shown in FIGS. 5A through 5E, by the number "4" shown in FIGS. 4A through 4C, by the number "2" shown in FIG. 2, or by the number "1" shown in FIGS. 1A through 1I.

Figure 10A:
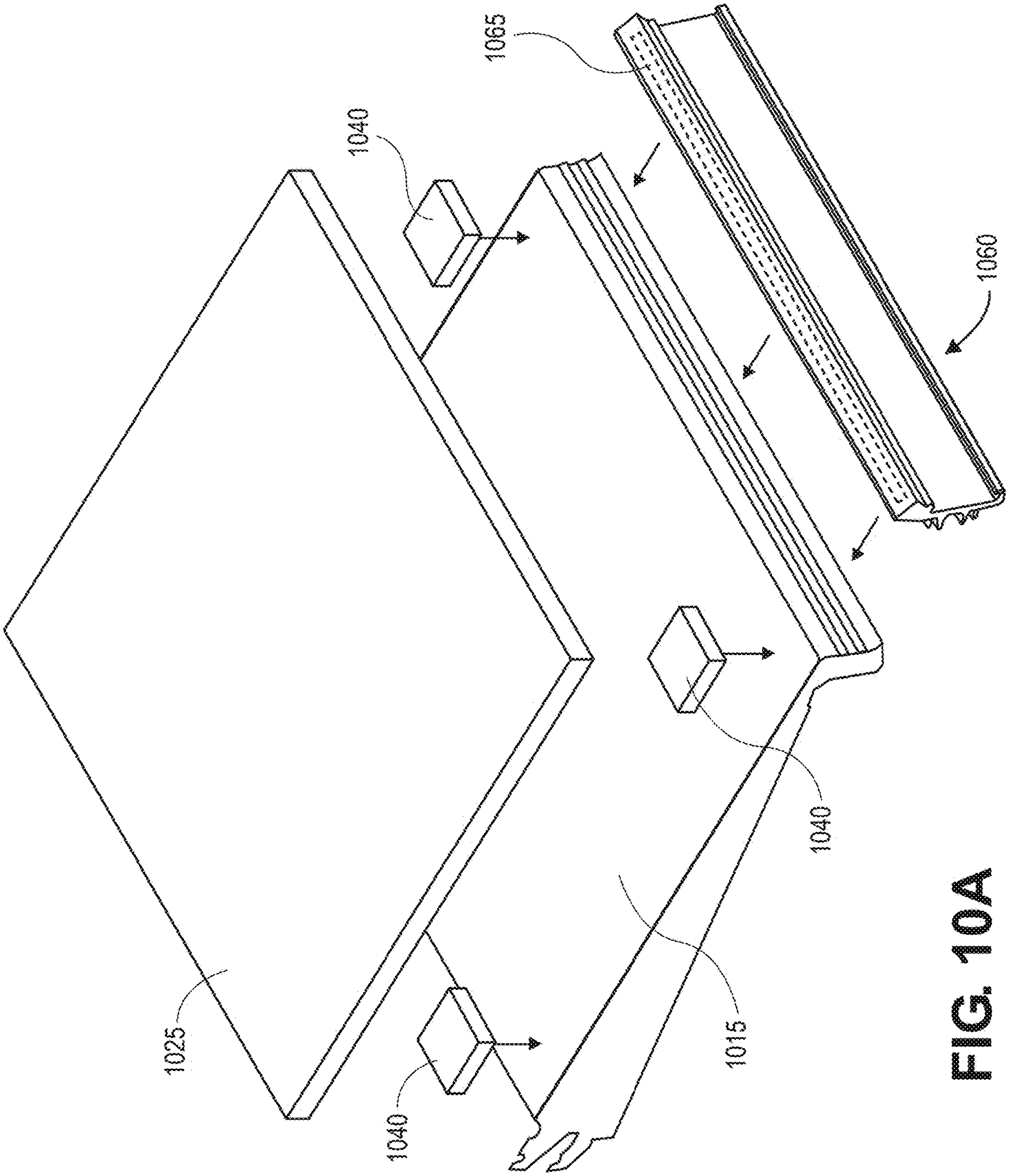
FIGS. 10A through 10D are views of aspects of one system for detecting interactions in accordance with implementations of the present disclosure.
Figure 10B:
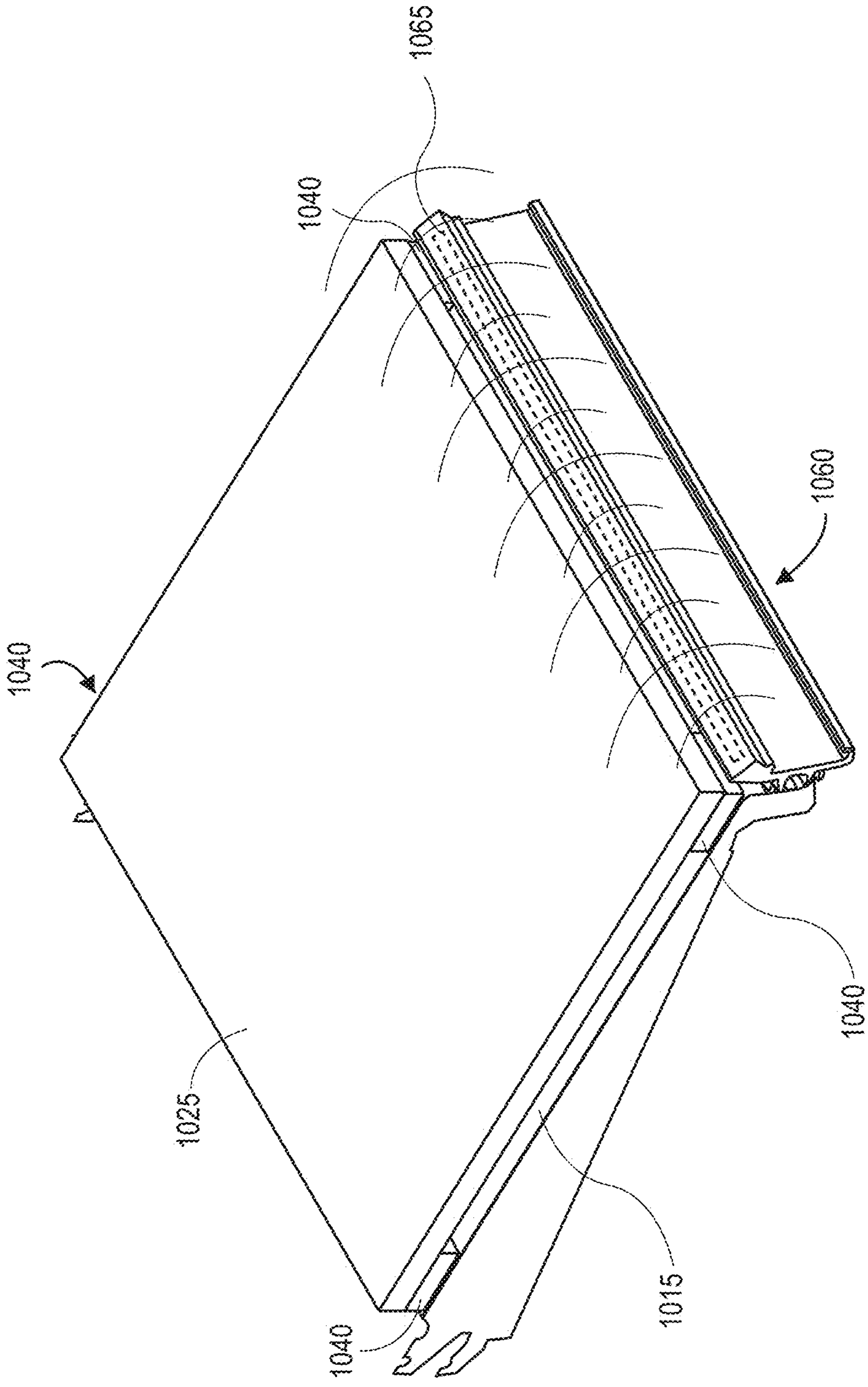

As is shown in FIGS. 10A and 10B, a storage unit 1020 is formed by placing a plurality of load sensors 1040 onto a shelf 1015, mounting an RFID assembly 1060 to a front end of (or entrance or access point to) the shelf 1015, and resting a platform 1025 atop the load sensors 1040 on the shelf 1015. The shelf 1015 may include hooks or other extensions for mounting the shelf 1015 to a rack or other like structure, and may be formed from any suitable materials (e.g., woods, metals, plastics, or others). The load sensors 1040 may be any devices or systems for determining dead and/or live loading applied to the load sensors 1040, e.g., by a platform or other object and any items thereon, and may include one or more capacitive sensors, force-sensing resistors, strain gages, load cells, piezoelectric sensors, inductive weight sensors, or any other type or form of device or system for generating load signals in response to loading on the platform 1025, or unloading from the platform 1025. The load sensors 1040 may be placed in any location on the shelf 1015, and are preferably distributed evenly on the shelf 1015, e.g., near corners of the shelf 1015, and at common or similar distances from edges of the shelf 1015.

The RFID assembly 1060 may be any system including an RFID reader and one or more processors, transceivers, power supplies, memory components, or components for emitting RF fields and receiving RFID signals. In some embodiments, such components may be provided on a printed circuit board assembly within the housing. Additionally, the RFID assembly 1060 further includes an RFID antenna 1065 provided on an upper surface of the housing. The RFID antenna 1065 may be energized to emit an RF field and to receive RFID signals from RFID transmitters within the RF field. The intensity of the RF fields emitted by the RFID antenna 1065 may be selected on any basis.

Alternatively, or additionally, the storage unit 1020 may include any number of other auxiliary sensors other than the load sensors 1040. In some implementations, the storage unit 1020 may include one or more cameras, proximity sensors, motion sensors, time-of-flight sensors, or other auxiliary sensors, in addition to the load sensors 1040. For example, the RFID assembly 1060, or any other assemblies or systems, may include one or more motion sensors or other components that are aligned or configured to detect motion passing over the front end of (or entrance or access point to) the shelf 1015, or in any other location.

Figure 10C:
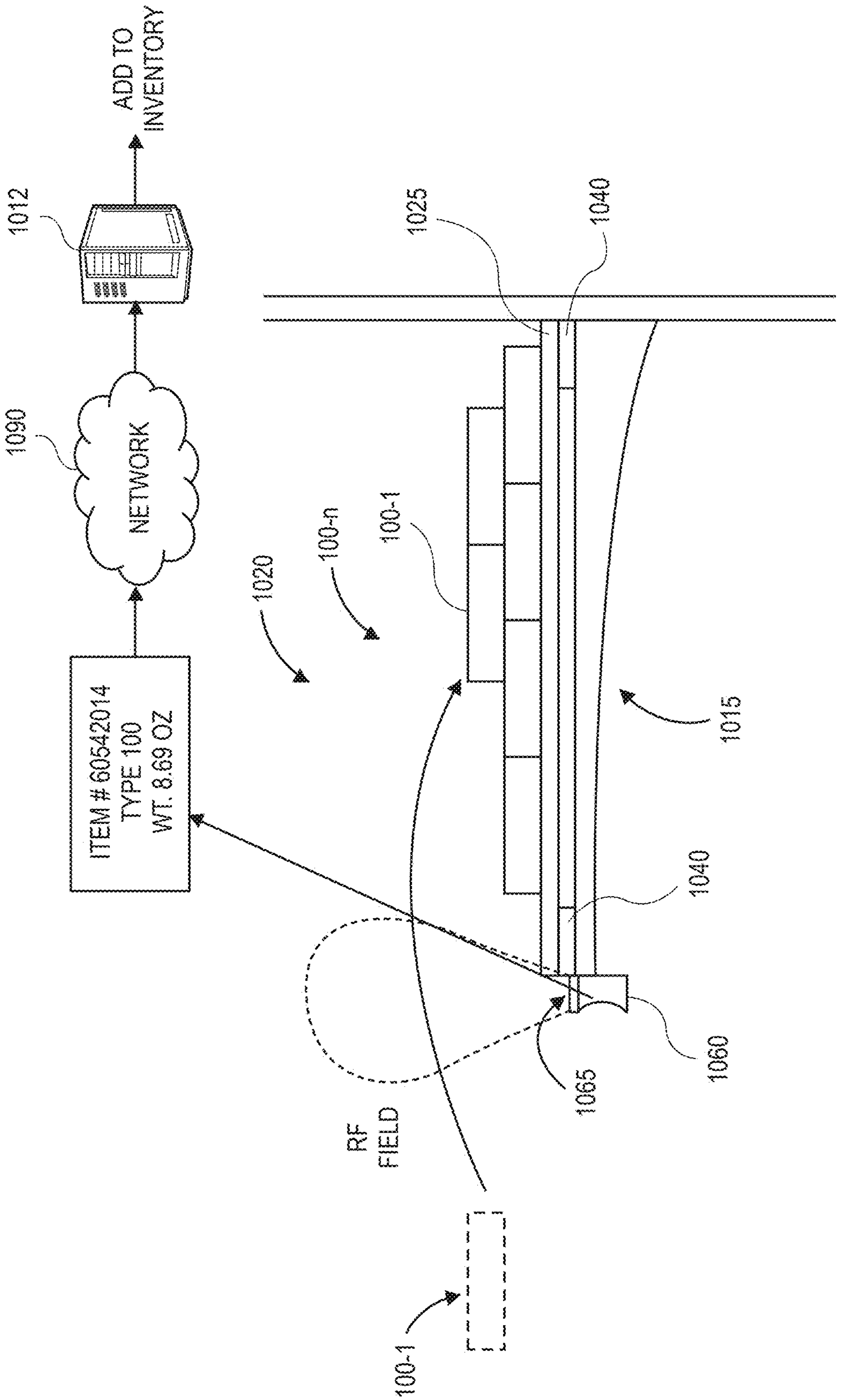

As is shown in FIG. 10C, a plurality of items 100-*n* may be placed on the platform 1025, and a record or other file indicative of a status of the items 100-*n* on the platform 1025 may be stored in one or more computer systems, e.g., a server 1012 connected to the RFID assembly 1060 over a network 1090. For example, the server 1012 may be programmed with information or data regarding each of the items 100-*n* thereon, including identifiers, types, or weights (or masses) of the items 100-*n*, as well as prices, expiration dates, locations of origin, or any other information or data regarding the items 100-*n*.

As is also shown in FIG. 10C, when an item 100-1 passes through an RF field that is generated by the RFID antenna 1065 and extends vertically upward from the RFID assembly 1060, at the front end of the shelf 1015 and normal to the shelf 1015, an RFID transmitter provided on the item 100-1 transmits an RFID signal that includes information or data regarding the item 100-1, viz., an identifier of the item 100-1, a type of the item 100-1, and a weight (or mass) of the item 100-1 to the RFID assembly 1060. The RFID assembly 1060 then transmits information or data regarding the item 100-1, e.g., contents of the RFID signal received from the item 100-1, to the server 1012 over the network 1090. The server 1012 may then determine whether the item 100-1 was included among the items on the platform 1025 prior to receiving the information or data from the RFID assembly 1060, e.g., by resort to one or more files or records. Upon determining that the item 100-1 was not previously located on the platform 1025, the record or other file indicative of the status of the items 100-*n* on the platform 1025 may be updated to reflect the addition of the item 100-1.

The emission of the RF field by the RFID assembly 1060 may be triggered in any manner and on any basis. For example, the RFID assembly 1060 may be configured to emit the RF field continuously, or at any regular or randomly scheduled time, or upon the occurrence of one or more events, as detected based on information or data captured by one or more auxiliary sensors, e.g., the load sensors 1040, or any others (not shown).

Figure 10D:
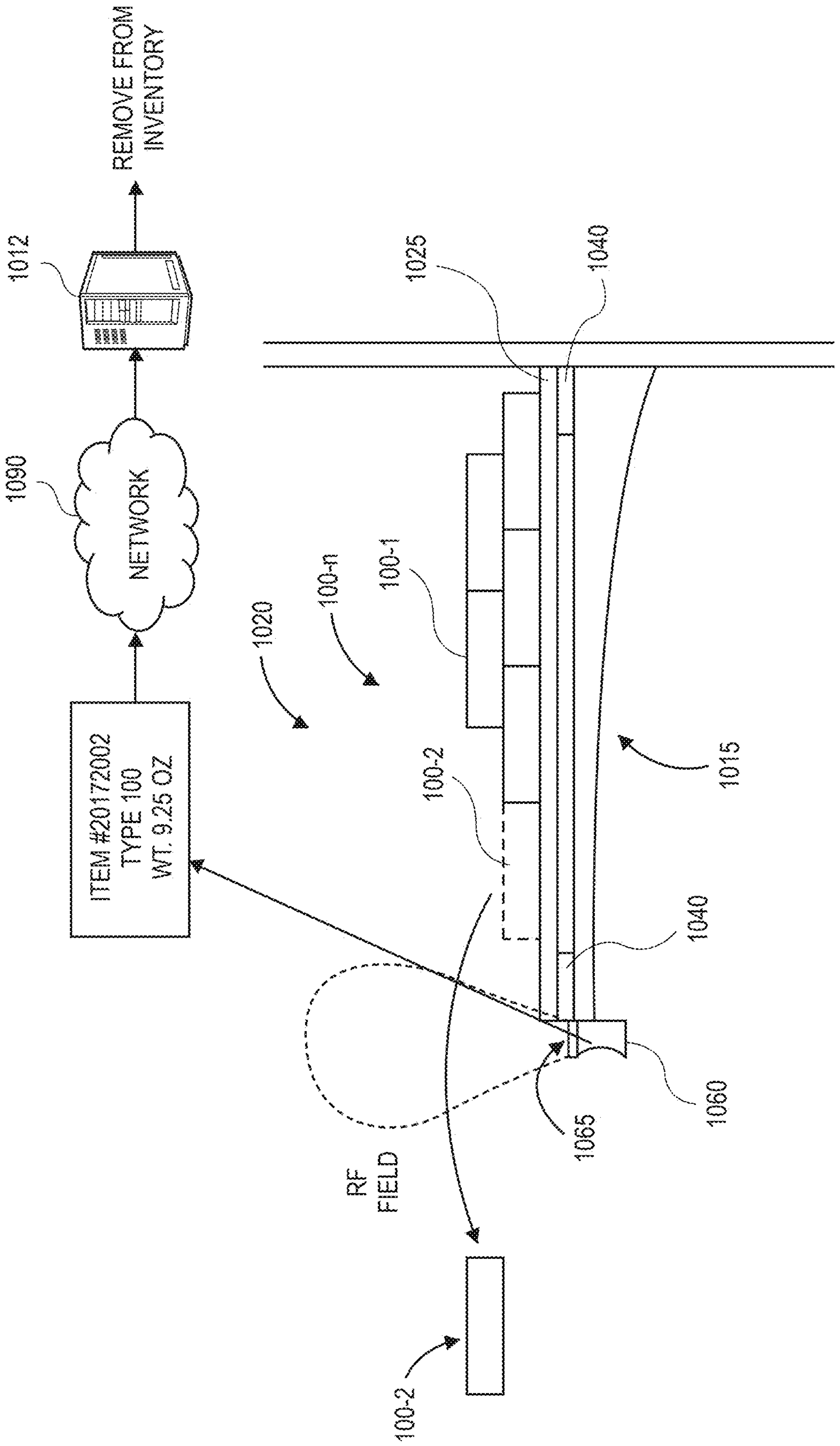

As is shown in FIG. 10D, when an item 100-2 passes through an RF field that is generated by the RFID antenna 1065 and vertically upward from the RFID assembly 1060, at the front end of the shelf 1015 and normal to the shelf 1015, an RFID transmitter provided on the item 100-2 transmits an RFID signal that includes information or data regarding the item 100-2, viz., an identifier of the item 100-2, a type of the item 100-2, and a weight (or mass) of the item 100-2 to the RFID assembly 1060. The RFID assembly 1060 then transmits information or data regarding the item 100-2, e.g., contents of the RFID signal received from the item 100-2, to the server 1012 over the network 1090. The server 1012 may then determine whether the item 100-2 was included among the items on the platform 1025 prior to receiving the information or data from the RFID assembly 1060. Upon determining that the item 100-2 was previously located on the platform 1025, the record or other file indicative of the status of the items 100-*n* on the platform 1025 may be updated to reflect the removal of the item 100-2 from the platform 1025.

Updating records of items located on storage units based on RFID signals received as such items pass through RF fields, such as is shown in FIG. 10C or FIG. 10D, may be repeated for any number of items passing through such fields, in either direction. The storage units of the present disclosure are not limited to additions or removals of single items, such as is shown in FIG. 10C or FIG. 10D.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Although some of the implementations of storage systems disclosed herein may be implemented within a fulfillment center or another materials handling facility, those of ordinary skill in the pertinent arts will recognize that the systems and methods of the present disclosure are not so limited, and may be utilized in connection with the placement, storage or distribution of items from storage systems provided in any environment or for any purpose.

Moreover, those of ordinary skill in the pertinent arts will further recognize that any type, form or number of storage systems may be provided singly or in tandem for the purpose of supporting one or more items thereon. As is discussed above, used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Likewise, the systems and methods of the present disclosure may also be utilized outside of a traditional materials handling facility environment. For example, when utilized in a home, a plurality of storage systems in accordance with the present disclosure may be installed in a kitchen, a pantry, a garage, a shed or a work area, to support items thereon and track their respective arrivals or departures.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes shown in the flow charts of FIGS. 3A and 3B or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A retail establishment comprising:
a computer system;
a camera in communication with the computer system; and
a station comprising:
a platform having at least one surface for accommodating items thereon, wherein the platform further comprises a plurality of RFID antennas provided in association with the platform, and wherein each of the plurality of RFID antennas is configured to emit an RF field and to receive RFID signals;
a rack, wherein at least a portion of the rack extends above the platform;
an RFID reader;
at least one computer processor; and
at least one transceiver in communication with the RFID reader and the computer system,
wherein the computer system is programmed with one or more sets of instructions that, when executed, cause the computer system to at least:
receive, from the camera, at least one image;
identify a customer based at least in part on the at least one image;
receive, from the platform by way of the at least one transceiver, a first set of data transmitted at approximately a first time, wherein the first set of data comprises at least a first set of RFID signals transmitted by a first set of RFID transmitters;
identify a first set of items based at least in part on the first set of data; and
in response to identifying the first set of items,
store at least one indication that the customer executed an interaction involving at least the first set of items; and
transmit a second set of data to a computer device associated with the customer, wherein the second set of data identifies the first set of items.

2. The retail establishment of claim 1, wherein the one or more sets of instructions, when executed, further cause the computer system to at least:
receive, from the platform by way of the at least one transceiver, a third set of data transmitted at approximately a second time, wherein the second time precedes the first time, and wherein the third set of data does not include any of the first set of RFID signals,
wherein the first set of items is identified based at least in part on the first set of data and the third set of data.

3. The retail establishment of claim 1, wherein the station further comprises a plurality of load sensors in communication with the at least one transceiver,
wherein the platform rests on each of the plurality of load sensors,
wherein each of the load sensors is configured to generate a load signal indicative of a force applied to one of the load sensors, and
wherein the one or more sets of instructions, when executed, further cause the computer system to at least:
receive, from the load sensors, a first set of load signals generated in response to loads supplied to the plurality of load sensors at approximately the first time; and
determine a first weight on the platform at the first time based at least in part on the first set of load signals,
wherein the first set of items is identified based at least in part on the first weight.

4. The retail establishment of claim 3, wherein the one or more sets of instructions, when executed, further cause the computer system to at least:
receive, from the load sensors, a second set of load signals generated in response to loads supplied to the plurality of load sensors at a second time, wherein the second time precedes the first time; and
determine a second weight on the platform at the first time based at least in part on the second set of load signals,
wherein the first set of items is identified based at least in part on a difference between the second weight and the first weight.

5. The retail establishment of claim 1, wherein the station is a checkout station.

6. A method comprising:
receiving, by a first computer system associated with a materials handling facility, a first set of data from an RFID reader of a station at a first time, wherein the RFID reader is in communication with at least one RFID antenna provided in association with at least one surface of the station, and wherein the first set of data identifies at least one of:

a first RFID signal received by the at least one RFID antenna; or a first item bearing a first RFID transmitter that transmitted the first RFID signal;

determining, by the first computer system, that at least the first item is within a vicinity of the at least one surface at approximately the first time based at least in part on the first set of data;

determining, by the first computer system, an identity of a customer within a vicinity of the system;

storing, by the first computer system, an indication that the customer executed a transaction involving at least the first item in at least one data store; and transmit, by the first computer system, information comprising a record of the transaction to a second computer system of the customer, wherein the record identifies a cost of at least the first item.

7. The method of claim 6, further comprising:

receiving, by the first computer system, a second set of data from the RFID reader at a second time, wherein the first set of data does not identify the first RFID signal or the first item, and wherein the second time precedes the first time, wherein that the first item is within a vicinity of the at least one surface at approximately the first time is determined based at least in part on the first set of data and the second set of data.

8. The method of claim 6, further comprising:

receiving, by the first computer system, a second set of data from the RFID reader at a second time, wherein the first set of data identifies the first RFID signal or the first item and a second RFID signal or a second item, and wherein the second time precedes the first time, and wherein the first set of data does not identify the second RFID signal or the second item.

9. The method of claim 6, wherein the station further comprises at least one auxiliary sensor, wherein the method further comprises:

receiving, by the first computer system, a second set of data from the at least one auxiliary sensor at approximately the first time, and wherein that the first item is within the vicinity of the at least one surface at approximately the first time is determined based at least in part on the first set of data and the second set of data.

10. The method of claim 9, wherein the station further comprises a platform including the at least one RFID antenna embedded therein, wherein the at least one surface is a surface of the platform, wherein the at least one auxiliary sensor is a load sensor, wherein the second set of data comprises at least one load signal generated by the load sensor at approximately the first time, and wherein the method further comprises:

determining, by the first computer system, a first weight on the platform based at least in part on the at least one load signal, wherein that the first item is within the vicinity of the at least one surface at approximately the first time is determined based at least in part on the first weight.

11. The method of claim 10, wherein the station further comprises a rack, and wherein at least a portion of a rack extends above the platform.

12. The method of claim 9, further comprising:

receiving, by the first computer system, a third set of data from the at least one auxiliary sensor at a second time, wherein the second set of data comprises at least one load signal generated by the load sensor at approximately the second time;

determining, by the first computer system, a second weight on the platform based at least in part on the at least one load signal, wherein that the first item is within the vicinity of the at least one surface at approximately the first time is determined based at least in part on a difference between the first weight and the second weight.

13. The method of claim 9, wherein the at least one auxiliary sensor comprises a camera, and wherein the second set of data comprises at least one image captured by the camera.

14. The method of claim 6, wherein the first set of data identifies a plurality of RFID signals, wherein each one of the RFID signals was transmitted by an RFID transmitter borne by one of a plurality of items, wherein the first item is one of the plurality of items, wherein determining that at least the first item is within a vicinity of the at least one surface at approximately the first time comprises:

determining that each of the plurality of items is within a vicinity of the at least one surface at approximately the first time based at least in part on the first set of data, wherein the transaction involves each of the plurality of items, and wherein the cost of the transaction includes at least a cost of the plurality of items.

15. The method of claim 6, wherein the station is provided in a materials handling facility having at least one camera, wherein the method further comprises:

receiving, by the first computer system, a plurality of images captured by the at least one camera, and wherein determining the identity of the customer within the vicinity of the station comprises:

detecting, by the first computer system, a person within a portion of at least one of the plurality of images; and determining, by the first computer system, that the person is the customer based at least in part on the plurality of images.

16. The method of claim 6, wherein the station is provided in a materials handling facility having at least one scanner, wherein the method further comprises:

capturing, by the at least one scanner, a second set of data presented by an application operating on the second computer system; and receiving, by the first computer system, the second set of data from the at least one scanner, wherein the identity of the customer within the vicinity of the station is determined based at least in part on the second set of data.

17. A station comprising:

at least one surface for accommodating items thereon;

at least one RFID antenna provided in association with the at least one surface, wherein the at least one RFID antenna is configured to emit an RF field and to receive RFID signals;

an RFID reader in communication with the at least one RFID antenna;

at least one transceiver in communication with the RFID reader and with a first computer system external to the station;

at least one memory component; and at least one computer processor;

wherein the at least one memory component is programmed with one or more sets of instructions that, when executed by the at least one computer processor, cause the station to at least:

determine an identity of a customer;

receive, from the RFID reader, a first set of data representing a first set of RFID signals, wherein the first set of data is received at a first time;

determining that at least one of the first set of RFID signals comprises a first RFID signal associated with a first item based at least in part on the first set of data;

identify the first item based at least in part on the first RFID signal; and in response to identifying the first item, store at least one indication that the customer executed an interaction involving at least the first item;

determine a cost of at least the first item; and charge at least the cost to the customer.

18. The station of claim 17, wherein the first computer system is in communication with at least one camera, wherein the one or more sets of instructions, when executed by the at least one computer processor, further cause the station to at least:

receive information regarding at least one image captured by the camera, and wherein the identity is determined based at least in part on the information regarding the at least one image captured by the camera.

19. The station of claim 17, further comprising a plurality of load sensors provided beneath the at least one surface, wherein the at least one transceiver is in communication with the plurality of load sensors, wherein the one or more sets of instructions, when executed by the at least one computer processor, further cause the station to at least:

receive information regarding a plurality of load signals at approximately the first time, wherein each one of the plurality of load signals represents a load supplied to one of the plurality of load sensors by the at least one surface at the first time, and wherein the first item is identified based at least in part on the first RFID signal and the plurality of load signals.

20. The station of claim 17, wherein the one or more sets of instructions, when executed by the at least one computer processor, further cause the station to at least:

transmit information comprising a record of the transaction to one of the first computer system or a second computer system of the customer, wherein the record identifies the cost of at least the first item.

* * * * *